US010025565B2

(12) United States Patent
Garipov

(10) Patent No.: US 10,025,565 B2
(45) Date of Patent: Jul. 17, 2018

(54) INTEGRATED SOFTWARE DEVELOPMENT ENVIRONMENTS, SYSTEMS, METHODS, AND MEMORY MODELS

(71) Applicant: INTEGRATOR SOFTWARE, San Diego, CA (US)

(72) Inventor: Oleg Garipov, Halifax (CA)

(*) Notice: Subject to any disclaimer, the term of this patent is extended or adjusted under 35 U.S.C. 154(b) by 0 days.

(21) Appl. No.: 15/242,146

(22) Filed: Aug. 19, 2016

(65) Prior Publication Data

US 2017/0052766 A1     Feb. 23, 2017

Related U.S. Application Data

(60) Provisional application No. 62/207,305, filed on Aug. 19, 2015.

(51) Int. Cl.
   *G06F 9/44*     (2018.01)
   *G06F 8/34*     (2018.01)
   *G06F 17/30*    (2006.01)

(52) U.S. Cl.
   CPC .......... *G06F 8/34* (2013.01); *G06F 17/30292* (2013.01); *G06F 17/30342* (2013.01); *G06F 17/30528* (2013.01); *G06F 17/30554* (2013.01); *G06F 17/30598* (2013.01)

(58) Field of Classification Search
   CPC ........................................................ G06F 8/34
   USPC .................. 717/101–109, 116, 120
   See application file for complete search history.

(56) References Cited

U.S. PATENT DOCUMENTS

| 5,544,288 | A | * | 8/1996 | Morgan | G06F 3/0481 |
| | | | | | 345/467 |
| 5,608,898 | A | * | 3/1997 | Turpin | G06F 8/34 |
| 5,680,619 | A | * | 10/1997 | Gudmundson | G06F 17/30014 |
| | | | | | 707/E17.013 |
| 5,850,548 | A | * | 12/1998 | Williams | G06F 8/34 |
| | | | | | 715/961 |
| 6,931,418 | B1 | * | 8/2005 | Barnes | G06F 17/30333 |
| | | | | | 707/600 |
| 7,225,199 | B1 | * | 5/2007 | Green | G06F 17/2785 |

(Continued)

OTHER PUBLICATIONS

Navathe, "Evolution of Data Modeling for Databases", Communications of the ACM, vol. 35, No. 9, pp. 112-123, 1992.*

(Continued)

*Primary Examiner* — Anil Khatri
(74) *Attorney, Agent, or Firm* — Fish IP Law, LLC

(57) ABSTRACT

A data schema stores both data and metadata as data in a hierarchical, extensible schema made of three classes of objects. The data schema includes algorithms that generate the data schema and provide the functionality. Container object hold master objects, which represent items in a collection. Master objects hold label-value pairs, having a label portion that provides metadata, and having a value portion that holds the data. The label portion references a second label-value pair, in which the value portion holds the metadata as data, which is retrieved at runtime. Label-value pairs may reference a child container object in master objects to create a hierarchy. The schema can retrieve data and data structures from other databases; multiple databases of different formats can be joined. Software can be stored as data and shown as active flowcharts. A graphical interface can be generated in multiple display modes, including in websites.

33 Claims, 38 Drawing Sheets

(56) References Cited

U.S. PATENT DOCUMENTS

| | | | | |
|---|---|---|---|---|
| 7,334,216 | B2* | 2/2008 | Molina-Moreno | G06F 8/35 |
| | | | | 717/105 |
| 7,516,439 | B2* | 4/2009 | Robinson | G06F 8/00 |
| | | | | 707/999.101 |
| 7,596,559 | B2* | 9/2009 | Popa | G06F 17/30914 |
| 7,603,651 | B2* | 10/2009 | De Brabander | G06F 8/34 |
| | | | | 704/9 |
| 7,899,850 | B2* | 3/2011 | Slik | G06F 17/3007 |
| | | | | 707/822 |
| 8,051,102 | B2* | 11/2011 | Everett | G06F 17/30595 |
| | | | | 707/793 |
| 8,180,745 | B2* | 5/2012 | Suvernev | G06F 17/30445 |
| | | | | 707/696 |
| 8,234,312 | B2* | 7/2012 | Thomas | G06F 17/30569 |
| | | | | 707/803 |
| 8,478,616 | B2* | 7/2013 | De Klerk | G06F 8/10 |
| | | | | 705/348 |
| 9,043,747 | B2* | 5/2015 | Eksten | G06F 8/70 |
| | | | | 709/219 |
| 9,489,152 | B2* | 11/2016 | Hohensee | G06F 3/12 |
| 2006/0101443 | A1 | 5/2006 | Nasr | |
| 2007/0203923 | A1 | 8/2007 | Thomas | |
| 2010/0077007 | A1 | 3/2010 | White et al. | |
| 2011/0255784 | A1 | 10/2011 | Welling | |
| 2011/0296375 | A1 | 12/2011 | Mooney | |

OTHER PUBLICATIONS

Fadous, "A Hierarchical Method for Synthesizing Relations", ACM, pp. 148-151, 1982.*
Cugnasco et al, "D8-tree: a de-normalized approach for multidimensional data analysis on key-value databases", ACM, pp. 1-10, 2016.*
Discala et al, "Automatic Generation of Normalized Relational Schemas from Nested Key-Value Data", ACM, pp. 295-310, 2016.*
Turk, "Using Normalized Alignment Scores to Detect Incorrectlyv Aligned Segments", ACM, pp. 25-28, 2009.*
Petrovski et a, "Extracting a ribute-Value Pairs from Product Specifications on theWeb", ACM, pp. 558-565, 2017.*
Kaser et al, "Attribute Value Reordering for Efficient Hybrid OLAP", ACM, pp. 1-8, 2003.*
International Search Report International application No. PCT/US2016/04 7871; International filing date Aug. 19, 2016.

* cited by examiner

FIGURE 3

*Person:*

| *first name:* Joe |
| *Phone:* |
| *phone number:* 212-234-5678 |

*Model:*

*Container object:*
  (Container object)
  *master label:* Person •
  *Master object:*
    *Label-value pair:*
      *label:* first name •
      *value:* John
  (Container object)
  *master label:* Phone •
  *Master object:*
    *Label-value pair:*
      *label:* phone number •
      *value:* 212-234-5678

INTEGRATED SOFTWARE DEVELOPMENT ENVIRONMENTS, SYSTEMS, METHODS, AND MEMORY MODELS

This application claims priority to U.S. provisional patent application Ser. No. 62/207,305, filed Aug. 19, 2015.

FIELD OF THE INVENTION

The field of the invention is computer program development technologies.

BACKGROUND

The following description includes information that may be useful in understanding the present invention. It is not an admission that any of the information provided herein is prior art or relevant to the presently claimed invention, or that any publication specifically or implicitly referenced is prior art.

Numerous computer programming environments exist capable of supporting many different programming languages. For example, Microsoft's Visual Studio® integrated development environment (IDE) allows developers to create software application in many different computing languages (e.g., C#, C++, F#, Python, etc.) on the Microsoft .NET® platform. The .NET platform is able to convert a high level language to a low level intermediary language, which then executes within a common run-time framework. Although such development environments are very powerful, they still have significant limitations.

One limitation of known development environments, especially object oriented systems, is that they enforce strict rules on object instantiation. Developers are required to declare classes within source code where each class definition is used to instantiate a specific type of object. Thus, an application can have hundreds or thousands of different types of objects rendering the code quite complex and difficult to maintain or refactor. For example, a "phone object" would be substantially different than a "person object" where both objects would likely require different internal complex management infrastructure for each type of object. Examples of such complexity include how and when objects are displayed, how the display screen is populated, and how changes to data objects and their contents are displayed.

Another limitation often encountered when using complex development environments is the lack of support to display visual representations of the semantics of the programming code. However, some effort has been directed to creating visual editors allowing a developer to visualize their code as a flowchart. For example, there has been some effort focused on creating a visual editor capable of displaying DRAKON format flowcharts and writing code (see URL drakon-editor.sourceforge.net/python/python.html).

Another example includes the flowchart-based programming tool called RAPTOR developed at the United States Air Force Academy (see URL raptor.martincarlisle.com). RAPTOR is a coding tool that binds code with graphical flowchart objects. Such systems allow developers to display source code in a graphical setting, but fail to provide semantic and syntactical information in a unified fashion to ease development of software. Software is not generated into complete files which other programs can call.

Some development environments, such as MS Excel, provide a visual graphical interface which displays the algorithms used alongside the data. However, these development environments have only limited abilities to change the views of the data and algorithms, which can be cumbersome to accomplish and are not saved as views into the current application, but only as instances of the application. Complex algorithms must be broken into executable stages, where each stage is an algebraic or logical construct which generates intermediate values, which are then available to successive stages of computation. Therefore the combination of stages and intermediate data values become bulky and difficult to navigate. Moreover, the use of references to define variables used in computation common to these development environments are either relative, i.e. referring to a bin or series of bins in an established grid, or absolute, where they may attempt to refer to the values required even after they are moved. Adding or removing data may require resetting ranges in the algorithms, charts, or other range-specific functions.

In conventional relational databases in widespread use, the data is housed in storage and inaccessible to the user except through queries. Such queries are available as forms or reports, which are generated by special software and incorporate queries to obtain the data they require. The interaction with the database is handled by "Middleware," as defined in several places on-line. The user can only interact with the data through middleware, and this restricts the functionality available. Changing a view or generating a form typically require software programming for the Extract, Transform, and Load (ETL) packages which constitute the common middleware that accesses relational databases. Although some database packages expose this middleware to provide a user interface, the packages still require extensive programming.

A more ideal development environment, as discussed below in the Applicant's own work, would allow developers to create applications (e.g., software, algorithms, databases, etc.) using a kernel of just a few types of objects that link together to form executable representations of the applications. Further, a more ideal environment would provide the developer access to development tools, algorithm code, algorithm data, debugging information, or other application constructs as well as the data on which the algorithms function, all within a graphical user interface, especially all at the same time during actual run-time.

A further desirable feature of database implementation is the reduction of redundancy and repetition, freeing the database of modification anomalies. See http://en.wikipedia.org/wiki/Database_normalization However, achieving normalization leads to a proliferation of tables, so that better ways of achieving the benefits of normalization are still required.

All publications referenced herein, including U.S. provisional patent application Ser. No. 62/207,305, are incorporated by reference to the same extent as if each individual publication or patent application were specifically and individually indicated to be incorporated by reference. Where a definition or use of a term in an incorporated reference is inconsistent with or contrary to the definition of that term provided herein, the definition of that term provided herein applies and the definition of that term in the reference does not apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for improved program development environments.

SUMMARY OF THE INVENTION

The inventive subject matter provides systems and methods in which a developer can use an integrated development environment to create applications based on three object types, where the data, the metadata, algorithm code, algorithm data, object properties, or other application information are available to the developer in a graphical interface. A preferred embodiment discussed herein is referenced as Integrator™.

One aspect of the inventive subject matter includes a non-transitory memory (e.g., FLASH, RAM, ROM, HDD, etc.) that stores a collection of data in a schema of three basic classes of data objects. The three classes or types of objects are the Container Object, which holds the Master Objects, which in turn hold the Label-Value Pairs. The memory can embody the collection of data by storing the collection within a container object that has a first and a second master object and could possibly have instances of master objects. Each master object can also include one or more label-value pairs, which hold the values of data and their corresponding semantic and syntactic elements. More specifically, a label object within a first master object can have a reference to a value object within a second master object. During run-time the data in the value object of the second master object is available (e.g., modifiable, accessible, displayable, etc.) to a user or developer in association with the value object from the first master object. One should appreciate that each instance of each type of object in the kernel (e.g., container objects, master objects, label object-value object pairs, etc.) has an identical structure to other instances of the same type. For example, container objects are, in fact members of the class "Container" regardless of their semantics and have identical structures, although their content could be different. They are differentiated from each other by a Unique Identifier (UID) assigned by the system software when they are instantiated, by referencing a different label object for their semantic label and by holding a reference to the parent object within which they are instantiated. The only exception is the Root Container object, which stores the entire collection or application and which differs in that its reference to a parent object is null.

A label-value pair within a master object can have a reference to a container object, which then appears as a child container object within the master object. This chain of hierarchical relationships can be extended to any depth. A container object can hold multiple master objects. In this way the data schema is extensible in breadth, to numerous sibling objects, and in depth, with successive layers of container objects nested within master objects. The number of item types is also extensible, so that a container object can hold multiple types of master objects, which may also have sibling objects.

Another aspect of the inventive subject matter can include a computing device having one or more non-transitory memories and a processor which, through execution of processor-executable instruction stored in one of the memories, manages kernel objects (e.g., container objects, master objects, label objects, value objects, label-value pair objects, etc.). The processor can be programmed, according to the instructions, to receive an input label and an input value, representing data and its semantic and syntactic elements. The data could include application code, algorithm code, algorithm data, database elements, video data, audio data, text data, date data, numerical data or other data modalities.

Based on the input label data and input value data, the processor instantiates distinct objects in one or more of the memories according to a kernel scheme. The processor instantiates at least one container object and then instantiates one or more master objects within that container object. Still further, the processor instantiates in the master object one or more label-value pair objects, with each of these objects having a label member (i.e., a label object) associated with the input label and a value member (i.e., a value object) associated with the input value. In especially interesting embodiments, a first one of the label-value objects held by a first master object comprises a value object storing the input value data as its value, and a second one of the label-value pair objects referenced by the label object of the first label-value pair object comprises a value member storing the input label data as its value, and the system is configured to display the data value of the second label-value pairs in the label space of the first label-value pair at runtime.

Database normalization implies that a value used as a label, descriptor, designator or other datum associated with the interpretation of the data itself is only used once. Data provided for interpretation of data, whether by the system of the user, is called "metadata." Otherwise, any changes to the value of this metadata must be changed in multiple locations and any errors of this value in any of its multiple locations would cause a failure of the software operations. By using a reference, from the label portion of a label-value pair to the value portion of another label-value pair, to obtain the metadata value required, the system ensures that there is only one Terminal Value of this metadata for all instances of label-value pairs which require this metadata. Any change to the value of this metadata is then available to the system at run time and only this one current Terminal Value is obtained and used.

Still another aspect of the inventive subject matter relates to a computing device storing metadata relating to data objects within the same hierarchal object schema as the data objects themselves, where metadata means any data about the data values, such as a name, a type or similar syntactic, semantic or pragmatic information. Thus, metadata is stored using the exact same data structures as the data itself. The computing device preferably comprises a non-transitory computer readable storage medium and a processor coupled with the storage medium. The memory can store an object database having a hierarchal object schema, preferably according to the container object, master object, and label-value pair object paradigm discussed above. Each of the data objects comprises a label member and a value member. The data objects can include references to other data objects.

Yet another interesting aspect of the inventive subject matter includes methods related to traversing across multiple data objects linked together according to the disclosed hierarchal data object schema to give rise to desired behaviors. The set of linked data objects, in aggregate, could represent a software application, an algorithm, a database, a user interface, or other type of programming environment construct. The linked data objects can be a set of container objects, master objects, label objects, value objects, or label-value pair objects as described above. Contemplated methods include construction of a database of linked objects in a memory of a computing device where the linked objects form an object hierarchy, possibly according to the schemas described previously. Linkages take the form of references, such that the linked object contains as a value such data as are needed to enable the system software to obtain an address and then traverse the system to this address and retrieve the data at that address. Such data may include further references, such that the system software traverses each successive linkage until it obtains a Terminal Value, which is the datum required.

Each linked object can have as a label object a reference to another object and can have a value member. Such a database of linked objects can be considered to form the structure of a complete application. To begin executing or otherwise processing the object hierarchy, the method includes identifying at least one root object from the linked objects, which root object can be considered a starting point for processing the objects in the hierarchy. The method further includes traversing over target objects in the hierarchy starting with the root object as a current target object. Traversing the hierarchy can further include configuring the processor to execute an action based on the value member of the current target object. Example actions can include following a reference to another object and returning the data which the value object of the reference object holds, performing a step of an algorithm, executing a portion of an application, rendering a portion of a user interface, evaluating a search query, out-putting data, receiving input, instantiating another object in the hierarchy, populating new objects with data or other action. The traversal of the hierarchy continues by selecting a next current target object, and as a function of the action taken and evaluation of the current target object's value member, performing an action. The processor traverses through the entire series of target objects until all object references and actions are accomplished. The algorithms which collectively execute these actions constitute the dynamic aspect of the invention and are part of the method. They share commonalities, such as traversal and retrieval of referenced values. The invention as a whole cannot be separated into a data schema and the functionality of algorithms which that schema enables.

Databases contemplated by the inventive subject matter are typically associated with algorithms, written as software, to retrieve, manage and modify data values, both for management of the data and as part of the business logic for which the database is utilized. In the database paradigm disclosed here, the same kernel structure can also be used to store software code as data. Lines or elements of software are typically stored in a list format, with an implied "next line" command at the end of each line of code. The file containing the lines of code is read into the interpreter and translated into machine-executable commands. However, each line of code can also be regarded as a data value and stored in a data structure. In this case the same data value can be stored in association with other data values related to the specific line of code; such associated data may include a natural language translation of the code; instruction on the graphical depiction of the operator the line represents in a flow chart; data values generated by or used by the line of code; and associated instructions as to how to execute the line of code, such as which database object holds the previous or next line of code. Storing code as data requires software to retrieve the code, place it in order in a conventional file and deliver it to the interpreter at run time.

Interestingly, the disclosed hierarchical object schema and traversal methods give rise to a visual programming environment where a developer can create code and execute code. Contemplated environments include a computing device having a memory, a display and a graphic user interface (GUI) configured to allow a developer to interact with graphical programming blocks. The programming blocks represent, on the database side, rendered versions of the basic kernel data objects (e.g., container objects, master objects, label objects, value objects, label-value pair objects, etc.) in the GUI which display the data on which the programming blocks rely for input and output values and, on the algorithm side, rendered display of the programming blocks themselves as development and executable versions of the application at the same time. Moreover, these graphical programming blocks can contain multiple label-value pairs which have as values attributes of this block, including computer-executable language (a line or snippet of code). Every line of software is stored as a value in a database object, which also stores other values relevant to the display, execution, data used and generated, and directions to preceding and subsequent steps for the line of software. Language variants of a line of code can be stored in the same object—including plain language, metacode, other programming languages, etc.—in separate label-value pairs, and which language is displayed is parameter driven and under user control.

Since both data and the code that operates on that data are contained in the same kernel objects within an application, and since each value object has a label object whose value can be construed to be the name of that value object, when the code uses a variable whose name points to values in the data, the "name" of the variable can be a reference to any label of the value objects desired for the algorithm. When the programmer defines a variable by "pointing" to a label, the system software follows the references from that label to the Terminal Value where the "name" is stored and substitutes the UID or other reference of this Terminal Value into the code. Then, at runtime, as the code is retrieved to be assembled into an executable file, the system software will retrieve this Terminal Value and insert it into the code as the variable name. In this fashion, even when the values used as names (metadata) for the value objects (data) are changed, the code will continue to execute on the same values. In this way, both the data structure and the software algorithms are fully normalized and integrated and up-to-date.

Moreover, as the code stored as data is assembled into an executable file, it can also be enhanced to enable direct display within the GUI of the programming blocks of which block is executing and store values generated in the course of execution in newly generated objects for future reference.

Writing software requires very specific statements and syntax which have to be written correctly, but the number of possible operations is limited to computational steps or evaluation and branching statements such as "Iterate" or "If". As a further refinement, the data schema holds specific software operations depicted graphically and they can be entered from a menu of commands. A menu depicts the input variables and the specific operation available, such as arithmetic or logical operators such as +, -, x, /, √, etc. or <, =, >, etc. The input and output variables are defined by pointing at any instance of the label for the label-value pair whose value is required, as discussed. Operators are chosen from a list. When the operation entry is completed, software stored in the data object for the operation takes the input and writes the appropriate code in the language available; the code is stored in the instance of the software objects being written. As a result, by using a graphical editor to generate a flow chart of the algorithm, the code to execute that algorithm is generated and stored in the same data schema. At runtime the system software will retrieve the code and create an executable file.

In view that the disclosed technologies provide for application development as well as execution of programs, the inventive subject matter can also be considered an execution environment per se. Execution environment systems can include programming object data and an execution engine (e.g., memory, processor, etc.). The programming object database is configured to store many linked programming objects (e.g., container objects, master objects, label objects, value objects, label-value pair objects, etc.), possibly where the programming objects comprise the programming blocks referenced previously. Each of the programming objects can include a subset of executable instructions and object addresses by which a programming object references other programming objects or data objects. The execution engine configures a processor-based device to execute the subset of instructions from the programming objects according to an execution order utilizing the object addresses.

Various objects, features, aspects and advantages of the inventive subject matter will become more apparent from the following detailed description of preferred embodiments of Integrator, along with the corresponding drawing figures, in which like numerals represent like components.

BRIEF DESCRIPTION OF THE DRAWINGS

FIG. 3 is a schematic depicting nesting of data objects graphically in the three basic objects. All labels are populated with their values.

DETAILED DESCRIPTION

Figure 1:
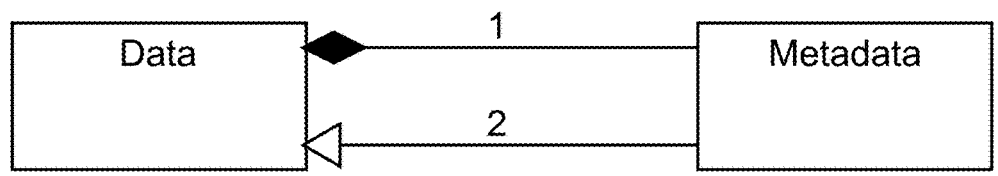
FIG. 1 is a schematic UML diagram of data and metadata, where the metadata is aggregated to the data and the data and metadata are generalized.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following disclosure is directed toward a software development and execution environment named Integrator. Integrator operates on a unique data structure model that gives rise to numerous benefits across software development, application execution, algorithm design and implementation, generating user interfaces, debugging code, database access and development, database searching, and numerous other activities. This document presents Integrator from a semiotics perspective without reference to a computer language because Integrator can function within the context of any computer language and supported run-time. The universality of Integrator must not be confused with some particular terms commonly used in object-oriented programming as described in greater detail below.

There is a distinction between the appearance of a computer application on the screen, print or other output and its underlying structure. Ultimately computer applications are based on strings of binary numbers in memory, whatever form that takes. The original Turing machine, where instructions and data were stored on a single tape, is still a good model. The interaction between a processor and the strings of binary numbers is governed by the instructions, which are also still delivered in machine language written in strings of binary numbers. The way in which these instructions access the data stored in strings and the structure of the strings, i.e. their accompanying strings and the syntactic strings used to locate data is the data schema used; much of the interaction is supplied by the operating system. The higher levels of the various schema are organized logically and conceptually in different ways, and the software instructions written in higher-level languages which implement the particular data schema are particular to that schema. Therefore one describes a database or a development environment as an application, where the data schema, the software needed to operate it and the resulting visual display and interaction with the user are delivered together. Integrator is such a complete application, but with a novel data schema and therefore its own novel software implementation.

Integrator uses the term "container object" to describe an object that holds master objects. Container objects are instantiated as one of the three fundamental object types, and the root container object is the outermost container of an application. Container objects are stored as durable objects in memory, as a component of the database. The common use of "container object" in object-oriented programming is as an abstract data type; this usage may appear similar but the difference is that these conventional containers are used in the code as repositories for collections of data gathered at runtime, but are not as saved parts of the database per se. They are used to speed access to data, but not to save it permanently. Moreover, the typical use of container objects violates the normalization of the data. References to conventional uses of "container" at: http://www.acornarcade.com/articles/Building_the_Dream_1_-_Container_data_structures/index1162.html, http://en.wikipedia.org/wiki/Container_(abstract_data_type), and http://docs.oracle.com/javase/7/docs/api/java/awt/Container.html Note the absence of the word "save" on any of these pages.

The table is a basic concept for data storage and presentation, where typically the rows of a table represent individual sibling items and the columns represent the attributes of those items. Tables become cumbersome when the items on lines are not of the same number, i.e. multiple, solitary or null, or format, so in relational databases subsidiary child tables are used, which link their items to the master table through foreign keys. In spreadsheets, subsidiary tables may be linked by using the Pivot Tables functionality in Excel, for example, but the functionality is tedious to create and cannot be easily altered. In Integrator, child tables are created within the master objects, which are the rows of the master tables, by inserting a child container object. This container object is unique to each master object, and sibling master objects will have their own child container object. So the logic of master tables and slave or child tables is the same in common database types, as dictated by the logic of the data they are to contain. A master table of "Sales People" requires child tables of sales by each sales person, which will vary from none to many. In Integrator the analogy of the basic table as a grid of columns with attributes and rows of sibling items is the master label object with the master objects that reference it for the labels of their value objects. Since the master label object is also a master object, this example illustrates the novelty of treating metadata as data in the context of the basic construct of table.

Integrator also uses the term "label-value pair" to describe an object that is a tuple, i.e. two linked objects where the data associated with the label provides metadata associated with the value. Such tuples are known and called variously "label-value pairs" or "key-value pairs." They take the form <xxxx:yyyy> conventionally. In Integrator this term "label-value pair" refers to one of the three fundamental object types; it appears to be a tuple, but in fact is a data object of a very different and novel concept. Firstly, the key or label of an Integrator label-value pair never contains data or metadata as a value; the label contains a reference to another label-value pair whose value provides the content of the label. Moreover, the construct "label:value" is not strictly associated in the sequence of memory, as <xxxx:yyyy> is. In fact, the label of a value is stored in a separate data object and associated with its value either by a reference or series of references or by a place in an array. In this latter instance, the label-value pair can be seen simply as two elements in two corresponding arrays. Moreover, the "label" array may be referenced by multiple objects, without contradiction, and the "label" array may consist merely of a set of references to further data objects. These forms are unlike the conventional use of "label-value pair." In the graphical representation displayed at runtime, they appear as values and their corresponding labels, i.e. they appear in conventional fashion in the output. They appear in this fashion because the algorithms which instantiate, traverse and display Integrator data structures obtain the data required for display in the label by following the references until they obtain the data required from a value object at run time. The data stored as values for the contents of the labels is subject to computation at runtime and therefore the value displayed or the display parameters in a label may change as needed in the context of the application. In conventional programming the label and the value are associated in memory, so the data displayed in the label is stored repeatedly; this label data cannot be changed without searching and replacing all such instances. Both XML and JSON data storage schema follow this pattern. The data displayed in the label cannot be computed at run-time; the value in the conventional label-value pair cannot be displayed with different labels, depending on context. Therefore, although the label-value pair is a useful construct for associating the semantic name with the data value, its implementation in Integrator is novel and unique.

Integrator uses the term "metadata" in a unique fashion as well. Metadata is broadly defined as of three types: syntactic, semantic and pragmatic (Ingerman, P. Z., A Syntax-Oriented Translator, Academic Press, New York, 1966.) Syntactic metadata determines how data is stored and retrieved by the machine; computers store everything as binary numbers, and the syntactic metadata is used by the machine operating system to determine which parts of the string of binary numbers stored in a sequence represent data. Most of the syntactic metadata is simply interpreted within the machine language of the operating system, but some syntactic metadata must be defined by the database for each entry, such as data type: string, date, decimal, text, etc. Such data type definition is usually performed when the database is established and is embedded in the code that defines the database. In Integrator, data type is also defined when a value object is instantiated. However, it can be changed, either by a human operator directly within the Graphical User Interface (GUI) by invoking menu commands, or dynamically by algorithms which operate the Integrator database.

Semantic metadata is what provides the meaning of the data to a human interpreting the data, i.e. it functions as the "name" of the data values. In conventional programming the semantic metadata includes names for tables and columns. This semantic metadata is usually restricted in form, such as by length or requiring no spaces, depending on the requirements specified by the software language used. As in Integrator, semantic metadata is also syntactic metadata when it is used to retrieve data values. The difference is that in Integrator semantic metadata is stored as data values, which are obtained at runtime and displayed in labels. Therefore, the semantic metadata can take any form, for example natural language, i.e. "Balance due," or it can be any data value, including values derived at run time, such as a time-and-date stamp for the run of an instrument or a software file, an image or icon, or a reference to a portion of a sequence which is being computed successively.

Pragmatic metadata is defined as the metadata required to present the data sought to serve the specific intent of the user. The data returned to a human should serve this intention; in the case of conventional databases the data available to the human is restricted to the results of queries or to the presentation of standard forms which have been generated through reporting software. In the case of Integrator, the pragmatic intent of the user is served further by allowing metadata values to be computed at runtime based on the intent of the user, such that a user searching for financial data related to a business may be shown data restricted to and labeled as "Clients," while the same user searching for contacts within the same database, but entering from a different portal or view, may be shown "Persons" with different contact information. By storing metadata as data within the same data structure, Integrator enables algorithmic modification of the semantic and pragmatic result, as well as enabling the user to modify and save the view generated for their specific pragmatic needs for future use.

In conventional object-oriented programming, metadata is a name used to refer to a table or a column of a table or other object. Metadata is defined in the software that sets up the database; in the algorithms that operate a typical object-oriented database, the metadata may also be used as a name for a variable, which is defined in the code. There are often constraints on how such names are composed, such as no spaces, a length limitation and no special characters. In spreadsheet databases, metadata can take the form of column headings of tables, of names of worksheets, or as names of a defined range of cells, used to obtain values when the name is used in an algorithm. In all these cases the metadata is used to query the data and return the values required for the business logic or database maintenance software to function.

In Integrator, metadata is defined as the contents presented within a label at runtime. Metadata is stored as data in a single terminal value in a value object, which is then referenced by whatever label needs to display that value. Since it is only stored once as data, an Integrator database is fully normalized. Since it is stored in a value object, a name used in a label is not restricted by form or data type; it can be a plain language statement, a date, a picture, can be generated by an algorithm, any form of data whatsoever. Since it is stored as a Terminal Value in a data object, the metadata can be obtained by reference to the UID of this data object. In this way, by treating metadata as data, Integrator can provide functionality not available to conventional object-oriented or spreadsheet databases. Metadata still fulfills the same function, which is to guide interpretation by a human in the display or to obtain the values required by queries or the software associated with the data.

Storing metadata as data in the same data structures as the data itself is unique and novel. Conventional object-oriented databases store the metadata in a separate database called the Database Structure Table. Spreadsheets store metadata as column or row headings, and these can be referenced by location, but the references are not fundamental and durable. Moreover, neither conventional object-oriented databases nor spreadsheets associate data with its corresponding metadata in label-value pairs.

Background on Collections of Items and their Representation:

The data schema of the invention is based on collections of items and how these collections are represented by an abstraction of features of those items. Everyone makes a distinction between a collection of the items themselves and a symbolic representation of that collection, which is used for human interaction with the items collected. Therefore, the symbolic representation and its intended use cannot be considered separately. A representation of a collection exists only in reference to the pragmatic uses to which the representation is put, and therefore implies a useful mode of interaction with the representation, rather than the items themselves. Consider a collection of items which are piled randomly, without order of any kind; there is no convenient representation of the items and one simply has to go through the collection of things until one finds the item of interest. On the other hand, an ordered collection contains a representation of itself. When clothes in a closet are grouped by type, i.e. organized, searching is reduced to a subset of the collection, i.e. within type, such as "shirts." In this case the symbolic representation is simply the ordering of the collection by abstracted features and the human interface is simply the recognition of the features and restriction of the searching to desired features. Both retrieval and storage of items is guided by feature recognition and a disciplined implementation.

The representation of a collection contains information about the collection, but is not the same as the collection. A simple representation may simply be a list of items with, minimally, instruction as to the location of each item, to enable its retrieval; perusing the list is presumably easier than perusing the collection itself. At the next level of complexity, a list of item names may be organized to facilitate their retrieval. In the example of a phone book, a list of names and associated access information, there was once no other way to peruse the collection of phone numbers and retrieve the desired value, the phone number, except through the alphabetical listing of the name of the holder. A representation of a collection may also use features to organize the list of items. Such features have names, which represent types, and the items have values for those types. The Yellow Pages organizes companies by types "service" and "product type" to facilitate access.

In the examples discussed above, the symbolic representation of the collection of clothes or telephone numbers is inseparable from its user interface. The syntax governing the ordering of items in the representation and knowledge of how to operate the user interface is available to the user, the meaning or semantics of the features or symbols used to obtain the desired result is evident to the user, and the representation is created expressly to serve the pragmatic interest of the user.

When the representation of the collection is stored in a computer, it is commonly called a database. Here the representation contains data, which combined with the proper semantics describes salient features of the items Like the representations above, every computer database implies a user interface engine as well, which is typically separate from the database itself. Conventional database management software may supply such a user interface, which accesses the database to perform its function. Some of this data, such as the names of values and data types, is stored as a separate database known as a database catalog. The database catalog lists definitions of database objects such as base tables, views (virtual tables), names, synonyms, value ranges, object types, indexes, users, and user groups. Such data is of two types: structural metadata or "data about the containers of data," and descriptive metadata, which is about the data contained in those containers. The database management software requires structural metadata just to access and return data from any instance of the underlying database, since the strings of bits in the database derive both their syntax (the rules for locating a specific string of bits) and some of their semantics (data type: text, string, real number etc.) from the database catalog as well as the operating system.

In this sense, the database contains not just the data, but this second database of interpretation data, the database catalog. This gives rise to a potential recursion, where the database catalog requires its own catalog to provide the syntax and semantic interpretation and so on. This recursion is avoided in practice by including syntactical data in the data management software. Although the data management software requires the database catalog database to access the database data, the two databases do not necessarily have the same form. In general the data management software delivers a query, which uses data from the Database Catalog, to yield an instruction. The database executes this instruction and delivers the data requested to the output interface. Many databases permit a query, as well, to return the structure and metadata in the Database Catalog.

Moreover, the user interface may not supply the pragmatic meaning, "the particular meaning (from among the available meanings) which is significant to the particular user at a particular time" (Ingerman, P. Z. 1966). The user is still forced to peruse and chose among multiple meanings, limiting the usefulness of the interface, rather than having the information retrieved according to the pragmatic intent of the user.

In most cases the database management software returns values of data to a graphical user interface, which requires additional elements to display the data, such as semantic data in the form of data descriptions. Construction of a functioning GUI is a separate task in the instantiation of a conventional database program, although some programs provide a rudimentary GUI. In other cases, a complete GUI is provided, typically as a set of templates the user can invoke, but they cannot be adapted further by the user without programming code of the database implementation. Typically the GUI contains three components called Model, View and Controller (MVC) to govern the interaction of the database itself with a user. As an example of a relatively-complete graphical interface, MS Excel and other spreadsheet programs show the values within bins, and also can display references when values are obtained by reference, and algorithms when values are obtained by formulas. The display View is evident and based on the Model, the underlying database, and the program responds to the user input (Controller). However, the View can only be modified to a limited extent within the grid provided by the program. For example, a search function will locate occurrences of the term or value sought, but display of search results is limited to highlighting the terms within the existing view; for multi-pane spreadsheets, this means turning pages manually.

In Integrator, since the display is parameter-driven, a search returns a view with only the sought items and their immediate context; the rest of the database is hidden. In Integrator, if the search term is on metadata, then the search returns a view of objects whose labels display that metadata, but with only one example of sibling objects, and the master object which holds the metadata term as a terminal value is also displayed.

To summarize, a collection of items is represented by lists of items sorted by features abstracted from the items. This symbolic representation requires interpretation to be useful, so it is accessed through a user interface governed by a set of rules and conventions. In the case of a computer database representation, a set of computer programs generate the user interface; this interface requires data on the structure of the data in the database, which may not be present in the database itself, in order to function. Moreover, in the case of multiple databases containing information of pragmatic interest, combining such information into a single UI (User Interface) remains a challenge.

In general, a representation of a collection is useful to the extent that it supplies a user with a meaningful response to a particular need. Existing methods for delivering information still have shortcomings. In the case of computer databases, the separation of database and interface limit the flexibility of the interface and require considerable skill or time on the part of the user to obtain a truly meaningful response. Better methods of access to information are urgently needed.

General Definitions Related to Representation Methods:

The following terms and their definitions are presented for clarity.

Algorithm: An algorithm is a process written in software code and executed by the processor which accomplishes a specific purpose in the context of operating a database.

Attribute: A feature of an item in a collection which has a name and corresponding data particular to objects in the collection, such as a number, a color, a genetic code, an image or any other characteristic in the form of data.

Name: designation of an object by a linguistic expression.

Object: A location in memory having a value and possibly referenced by an identifier. An object may exist without content (e.g., NULL).

Child objects: Child objects are objects contained within parent objects in a nested relationship.

Code: Code is the actual statements written in a computer-readable language which make up the software used to execute algorithms.

Identifier: The unique identifier (UID) of an object is its address. In the telephone book, the telephone number is the unique identifier of a telephone, which may be used to access the telephone. When an object with a unique identifier is loaded into memory, the UID is replaced by a memory location address by the operating system, but the assigned address now functions as the UID.

a. Identifiers must be durable, in the sense that they continue to function no matter how many additional references to an identifier may be generated, or how objects or the content of objects may be rearranged.

b. Identifiers must be unique and refer to a single object.

c. An object may only have one identifier by which it is referenced.

Information: The interpretation that is placed on the value of data (or the absence of data) by the user of the data.

Interaction-Specific Data: Data used by an interface to a data structure to accomplish its purpose. Examples include data location and data type, output style, display device parameters, user authorization, etc.

Parent objects: objects which contain a child object.

Sibling objects: Sibling objects are distinct objects of a common type which share the same set of attributes.

Software: An executable list of statements written in computer code which executes an algorithm.

Type: a classifier of features shared by several items in a collection, with a name for the feature and different values for the type, such as the values Home, Business and Mobile for the Types of phone numbers. Type may act as a classifier of sibling items.

Unified Modeling Language (UML): A common format for describing programs using a graphical depiction. UML is maintained by OMG, see www.uml.org User Interface (UI): Software which interacts with a computer database to make it interpretable by a human user. Graphical User Interfaces render portions of the database on a screen; other types of UI may save the database to a persistent medium, exchange data between the database and other computer processes, etc.

Introduction: Beyond Conventional Programming

Integrator provides an environment through which developers can create databases or other applications using a novel format as well as using new techniques. Integrator delivers the following new features, based on the underlying structure and techniques:

a. Automated data object creation. Integrator algorithms will generate data objects specified on a structured list, which can be the data structure table of another database. The new objects are instantiated automatically by the Integrator algorithms. Metadata and other attributes of objects are also instantiated automatically as new label objects associated with the data objects. The instantiation algorithm creates new objects and references throughout the new application based on the list. Integrator algorithms can instantiate and populate new objects with data from an existing data base, from a structured file or as new data is imported, from a data stream or other source being traversed.

b. Merging of existing databases: Once a database has been converted to Integrator format, it is available for common searches across multiple databases. Disparate databases can be joined, with items held in common merged or united by search on common elements. Integrator provides algorithms to search through such databases and highlight differences in the metadata, which are then readily resolved. The basic schema is the same in both Integrator applications, so only metadata varies and is accessible as data.

c. Standardized metadata attributes available on every object: Because Integrator uses a standardized set of objects for its internal data structures, objects have common metadata attributes, instantiated as data in metadata objects. These standard metadata attributes include interaction-specific data such as authorization, display and language attributes. The data can be modified in these metadata objects, which are available to the user in various views. In Integrator, hierarchical (cascading) and conditional parameterization is available on any 1) class, 2) attribute, 3) object, 4) value or 5) container value. Such a hieratical schema means that metadata values set on a more general level can be overridden on a more specific level. Any metadata values can be calculated using any object's data.

d. Improved Graphical User Interface (GUI):

GUI: The GUI software within the Integrator system generates views of the underlying application and the data and metadata are available for view or modification in this GUI. At run time, the GUI uses interaction-specific data stored within the application to configure the view rendered. The GUI implements both view and control in a standard Model-View-Controller (MVC) paradigm. Modification of the interaction-specific data enables the user to create custom views, and these modifications can be saved for future use.

New objects can be specified by manual input in the GUI and are then instantiated by the algorithms and run immediately, without compilation.

i. Metadata associated with any, all or some of the data objects can be viewed and modified as a menu option directly in the GUI.

ii. The user can generate custom views and forms on the screen and save them for future use.

iii. The GUI is available on any device for which view metadata is available, such as different screen sizes, phones (both horizontal and vertical) and so on by automated or manual switching.

e. Object links and references: References (links) are bi-directional and can be visualized from and/or to any object or all objects. At run time, the algorithms traversing the application follow such references to obtain the data and metadata required for display, computation or other functions.

f. Object linkages: Any reference links to its target object directly, whether a single label-value pair, a container or a master object. Since every object in Integrator has a unique identifier, the many-to-one, one-to-many problem is obviated.

Of particular note, Integrator utilizes an object hierarchal schema to store its database of instantiated objects rather than in tables as is typically done in databases. By instantiating a database or other application from a kernel of basic object types (e.g., container objects, master objects and label-value pairs), Integrator provides many advantages over a table-driven approach. First, in the Integrator model, data and metadata are both stored as instances of the same kernel objects, thus allowing modification of metadata without affecting the data to which the metadata is associated. Conventionally, tables, in general, lack references to their own labels or metadata. Further, in Integrator, properties or metadata of data objects can be changed dynamically at run-time, within the same GUI. Many additional benefits and advantages will become apparent as described below.

Integrator Summary

Integrator embodies a new logical method for representing a collection of data (e.g., objects, code, etc.) comprising names and types of features of items in the collection. It differs from the conventional methods discussed above in that in the Integrator database, the values of attributes of the items as data, the metadata or semantic descriptions of this data and the interaction specific-data are integrated into one structure, independent of any particular method of implementation. The application may also contain the software code which executes algorithms using the data and metadata contained in the collection, and may refer to or retrieve the data through the metadata used to provide meaning to the data. The key difference is that metadata is stored as data in the same form, giving rise to the slogan: "metadata is data."

Integrator is made up of "objects." These objects can be considered in the broadest sense as places; each place has a unique identifier and each place may contain various items or references in turn. An object in this sense is simply a place to put things; an object can be located and its content accessed by referencing its identifier or its label value. The arrangement of objects within Integrator constitutes their mutual syntax; container objects hold a collection of master objects, each being one item of a collection, and the master objects hold the data associated with those items in the value objects of label-value pairs. The content of some objects defines the semantics, the meaning assigned to them, of other objects. Further contents govern the interface to the representation of the collection, so that the interface is responsive to the pragmatic intent of the user. Moreover, the types of objects are context specific, and distinctions between types of objects are pragmatic, so different representations of Integrator may display objects as different types, while other representations do not distinguish the same types when it is more useful to avoid the distinction. The underlying logic remains the same. Still, the objects are instantiated data structures within the context of object-oriented programming techniques. The main difference is that new objects do not have to defined as a class; all objects are instances of one of the three classes or root objects: container object, master object and label-value pair.

Definitions Related to Integrator

The following definitions are associated with the inventive subject matter embodied by Integrator.

Value: A Value is an object which contains a datum whose meaning depends entirely on the context in which it is examined.

Data: The actual contents of an object, which are accessed by referring to it, including contents found by following a reference found as the contents of the object.

Label: A Label is an object which displays data about the associated value. Label is defined in Webster's Unabridged Dictionary (1983) as:
  a. "A card, strip of paper, etc. marked and attached to an object to indicate its nature, contents, ownership, destination, etc.
  b. The label itself is empty of content; it is a place for the markings, not the marks themselves."
  Thus a label is an object to display data, which does not contain data itself; labels in Integrator contain a reference to the value which is to be shown as "marks."

Name: A Name is a possible meaning of the data contained within the object "Label." This data provides a semantic context for the interpretation of the value associated with the label.

Label-value pair: Every Value object in Integrator has an associated Label object which references another Value object for its contents. The data of the Label and Value of a label-value pair are intimately associated, but may be stored in separate places.

Relations: A relation is a connection between two objects. A relation takes the form of an expression containing a reference to another object.

Terminal Value: The value in a label-value pair may contain actual data or a reference to another object. In those instances where the Value is actual data, it is called a Terminal Value because obtaining the data concludes the steps taken by the traversing algorithms that Integrator uses to perform its functions. Each Terminal Value is found in the one and only object which contains this specific data; any other appearance of this data must be generated by reference to this Terminal Value Object.

Integrator Data Model

There are several interesting structural features of Integrator. First, variables and parameters are stored as data, and data values themselves are stored in one standard object, the value object, which contains a single datum. One should appreciate that each instance of the value class is a value object even though each instance might carry different data. Thus, value objects are instances of the value class and have the same data structure, but not necessarily the same value data. Value objects are half of a label-value pair, inextricably linked with their label object. The value object in turn is held within two other object types to create a recursive and hierarchical structure of unlimited complexity. Furthermore, data are stored only once, as a Terminal Value in a value object. Other places in which such a datum might appear are supplied by an algorithm which traverses the references until it obtains this Terminal Value and then returns to the previous place to insert the datum. This structural feature ensures that an application created in Integrator is fully normalized.

Integrator objects either have a unique identifier (UID) or they have an unambiguous positional identifier; references are thus unique and are instituted in bidirectional fashion. Thus data values can be accessed by reference, either through their UID or through their label value. Since all data is stored in the same schema, as the value object of a label-value pair, even metadata stored as data in a value object has a label.

Another aspect of Integrator is that objects are of three fundamental types (i.e., class) representing a kernel of three basic objects: a container object, a master object and a value object, and their mutual syntax is as follows:

Container objects are defined as objects which hold master objects in the sense that references to the master objects they contain are delivered by the Integrator software which traverses the container object. The references can include pointers, identifiers (e.g, GUID, UUDI, etc.), lists, arrays or other reference constructs. Container objects can hold different master objects, as well as any number of sibling master objects. Container objects also reference another object, which holds a label-value pair which can be said to have the name of this specific instance of the container object as its value. This reference in the container object points to a master object called, for convenience, the container label object. The container label object holds a label-value pair whose value object holds the data required for the name of the container object or a reference to the label-value pair which holds this name as its data value. A container object also holds two label-value pairs, one of which has the UID of the object as its value and the other has the UID of the parent object within which it is instantiated. Otherwise a container object is not required to contain any data per se, only references to other objects. There are differing low-level implementations of a Container object, these implementations differ only in detail, and the definition of a Container object is invariant under its implementation.

Although the word "container" is used for Abstract Data Types in programming languages such as C++, or a comparable function in Java called "collection framework," these constructs are different than the "Container" class used in Integrator. These similar-appearing constructs do not have associated and interaction-specific metadata, other than a variable name assigned in the software and they are not used to persist data in a database structure. They have never been used to contain an entire application. Their primary function is to provide transitory storage when a database interaction software is run in memory, where they act as temporary holders of data from the underlying stored database, either as copies or as references to the data objects.

In Integrator the class "Container" with its fields is declared as follows in Java, but could be written in analogous fashion in another object-oriented language:

```
class Container {
    String number;
    MasterLabel container_label;
    Master parent_Master_object;
    Integrator integrator;
    List<Master> Masters=new ArrayList( );
}
```

This is only one way of instantiating this class "Container." Another approach is to define it as follows, with only two attributes, where one is a reference to a master object "Container data" which holds other attributes of the container object. In this approach, new attributes can be added to the class "container object" by adding new label-value pairs to the master object "Container data" without recompiling the application. So defining the class container object can be done in several ways. The class "Container" is defined as follows when attributes are held in the master object "Container data":

```
class Container {
    Master container_data;
    List<Master> objects
}
```

Or in an even simpler form, where the list of master objects is also stored as a list in master object "Container data,"

```
class Container {
    Master container_data;
}
```

Master objects are found only in container objects. A master object represents an item which contains at least one datum of any type as the value object of a label-value pair, see below. Typically master objects represent items from a collection which share attributes with sibling master objects of the same type. Master objects contain label-value pairs whose value objects contain the data related to these items. Each master object is distinguished from others by its UID, held as a value in a label-value pair. All instances of master objects are in fact only master objects, of the class "Master". However, each instance of a master object might store different value data that would differentiate one master object from another. There are differing low-level implementations of a Master object, these implementations differ only in detail, and the definition of a Master object is invariant under its implementation.

Master objects hold a reference to their parent container object, thereby allowing the Integrator algorithms to forward chain or backward chain through the object hierarchy. Master objects also hold a reference to their master label object; the master label object holds a label-value pair whose value object is the data required for the name of the master object type, i.e. "Person." The value stored as the name is simply data, and no new class is created by using a master label object to provide the data associated with the master object. The master label object also holds label-value pair(s) whose value objects hold the data required for the labels of the label-value pairs in the master object(s). Master label objects contain a list of references to all master objects of their type. Both master objects and master label objects are instances of the same master object class and have identical structures. In Integrator the class "Master" with its fields is declared as follows in Java, but could be written in analogous fashion in another object-oriented language:

```
class Master {
    String number;
    MasterLabel master_label;
    Container parent_container;
    List<Label_Value_pair> Label_Value_pairs;
}
```

This is only one way of instantiating this class "Master." Another approach is to define it with only two essential attributes, its UID and a reference to another master object "Master object data" whose value objects contain data of the other attributes of the master object. In this approach, new attributes can be added to the class "master" by adding new label-value pairs to the master object "Master object data" without recompiling the application. So defining the class master object can be done in several forms, with the essential attributes in the class definition or supplied as attributes through the master object "Master object data." The class definition with attributes held in the master object "Master object data":

```
class Master {
    Master master_object_data;
    List<Label_Value_pair> _values;
}
```

Or in an even simpler form, where the list of label-value pairs is also stored as a list in master object "Master object data,"

```
class Master {
    Master master_object_data;
}
```

Value objects are only found within master objects. They constitute the value portion of label-value pairs, which are objects with a reference to their parent master object, either explicit or implicit. Label-value pairs hold the data associated with the items which a master object represents in the database. The labels of the label-value pairs in master objects reference label-value pairs in the master label object whose value objects are the data required for the labels; the reference is either explicit or implicit. Thus, an algorithm traversing a master object is referred to the master label object for the values of the labels of the attributes and populates these labels in the data display, while the values of the data are obtained from the value objects in the master object itself. This intimate association of label and value, or metadata and data can be implemented in a variety of ways, such as using references within the label portion or through arrays of label values in the master label object associated with a corresponding array of data values in the master object, as is convenient. A value object is intimately connected to its label object and can be located through reference to the data displayed in the label. As an algorithm traverses the application to obtain output, it follows the references and obtains the data from the Terminal Value to which these references lead.

The value objects held in the master objects may hold data of three different qualities.

1) They may hold an actual datum, such as a date "2014-12-29" or a string or a video.
2) They may hold a reference to another object where the data is to be found.
3) They may hold a reference to a Child Container, which is typically the UID of this separate container object.

In the latter case, the label object of the label-value pair references a Container- or a Master-Label Object for its content, which is the "name" of the Child Container, such as "Address." Such Child Containers nested within master objects allow the extension of the database in the vertical direction of the hierarchy. In Integrator the class "Label_Value_pair" with its fields is declared as follows in Java, but could be written in analogous fashion in another object-oriented language:

```
class Label_Value_pair {
    String number;
    Label label;
    Object value;
    Master parent_Master;
}
```

This is only one way of instantiating this class "Label_Value_pair." Another approach is to define it as follows, with only two attributes, where one is a reference to another master object "Label_Value_pair_data" which holds the other attributes of the label-value pair object. In this approach, new attributes can be added to the class "Label_Value_pair" by adding new label-value pairs to the master object "Label_Value_pair_ data" without recompiling the application. So defining the class Label_Value_pair can be done in several forms, with the essential attributes in the class definition or supplied as attributes through the master object "Label_Value_pair_data." The class definition with attributes held in the master object "Master object data":

```
class Label_Value_pair {
    Master Label_Value_pair_data;
    Object value;
}
```

The Label Objects, Master Label Objects and Container Label Object used by Integrator to store the metadata and interaction-specific data are also of these three basic classes, but they are defined as subclasses of the basic object:

class Label extends Master { }
class MasterLabel extends Label { }
class ContainerLabel extends Label { }

Distinction Between Label and Value within Integrator

Central to the conception of Integrator is that everything is data. Data are stored as data, and the contents of the labels used to give the data semantic meaning, i.e. metadata, are also stored as data. The value objects which hold the data take the form of label-value pairs, which are two linked objects (i.e., a label object and a value object). The label-value pair as two inextricably linked objects is considered an important aspect of the inventive subject matter of Integrator. Such linked pairs of strings are known and widely used, written in C# as <string, string>. In the case of Integrator, the label object simply provides a place to display data about the data, commonly known as metadata. The value object provides the place for the data itself. As an example consider "first name: Joe", which appears to be a conventional label-value pair. However, in Integrator, the label object does not contain data, but a reference to the value object of a second label-value pair instance. The metadata for the label is stored as data and only as data in the value object of this second label-value pair, in this example as a text string "first name". The second label-value pair is instantiated by the same object-generation algorithm which is invoked to establish the first label-value pair. Therefore, while instantiating a label-value pair of objects L1:V1, an algorithm also instantiates a second pair of objects L2:V2 and sets the value of L1 as a reference to V2. In the example above, the conventional label-value pair <string, string> is actually instantiated as two label-value pairs: <reference, string> and <reference, string>, where the first reference points to the second label-value pair. There is no known implementation of label value pair where the label and the value are stored in separate objects. There is also no implementation where the label values, as stored in L2:V2, also have a label L2 which references another label-value pair for its display value. The value associated with L1 is not determined until it is requested, and hence V2 may be changed contextually before display or utilization. As an example, the same data about an individual may be presented under the labels "Person" or "Employee" depending on the context.

This relationship between a label L1 and the L2:V2 label-value pair that supplies the value for L1 holds for all the label-value pairs of an instance of Integrator. Every object has a corresponding label object with a label-value pair whose value is the contents of the label for the first object. Thus master label objects reference the master label object "Master label" for their labels. The duality is ended in the Kernel objects; the label objects of Kernel objects reference themselves, thus supplying the necessary values for their own labels, as well as supplying values needed for labels in other label objects. Application-level metadata is not hidden in programming code. System-level metadata that is not normally accessible to the Integrator system for whatever reason may be stored differently from other metadata, but need not be, as is convenient.

The UML diagram in FIG. 1 illustrates this relationship. Here the DATA box represents the value and the METADATA box represents the label of label-value pairs. The meaning of the aggregation 1 is that data has metadata as a definitive part of it. Generalization 2 means that metadata is functionally the same as data. Aggregation and generalization are available on all Integrator objects and discussed more fully below.

Definitions of Integrator-Specific Object Types

Although there are three basic object classes in Integrator, they are divided for convenience into six object types, each of which is discussed in detail below. As discussed above, the three basic classes of objects: Container Object, Master Object and Label-Value Pair have the subclasses Container Label Object, Master Label Object and. Value Label Object. These six types of object together constitute a complete Integrator object (an "I-object"), and all objects in an Integrator application are of one of these six types. They are connected together in a pattern of dependence which reflects their individual function; they are recursive in that the same pattern of six can be extended hierarchically by nesting or extended horizontally by repetition:

Container Object:
Master Object:
Value Object
Container Label Object
Master Label Object
Value Label Object Where a Label-Value Pair is constituted from a Label Object and a Value Object.

Figure 4:
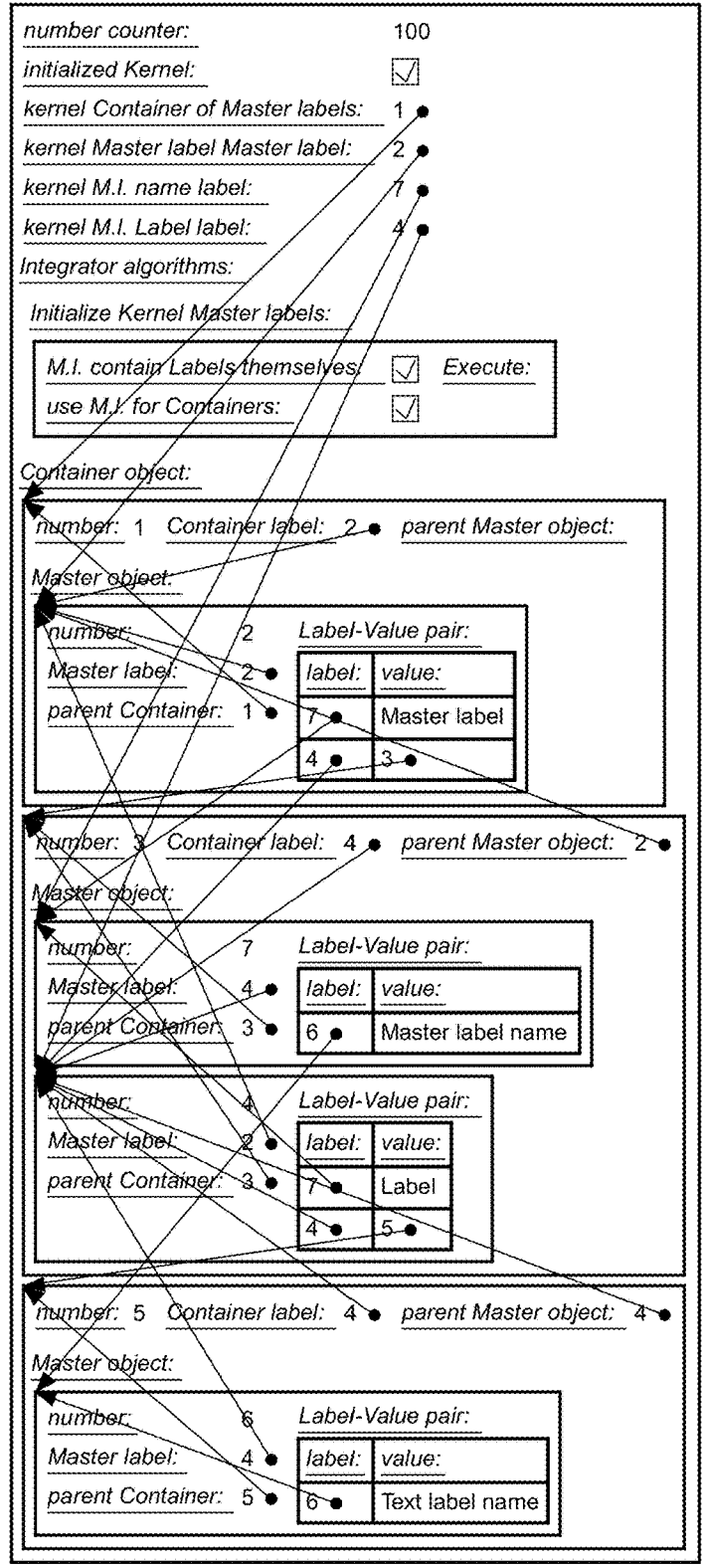
FIG. 4 is a screen shot of the user menu on initialization of the Integrator kernel objects and the resulting kernel of master label objects and data.

A reduced set of five objects, without Container Label Object, is also sufficient to define an Integrator object, an "I-object". In this case, the container object references a master label object for the value of its label (see below). The choice of five or six objects for the implementation is a matter of convenience; either syntax has the same functionality. The choice of which form to employ is made in a Yes/No decision when the algorithm "Initialize Kernel Master labels" is run at the opening of any application, as shown in FIG. 4.

In conventional object-oriented programming, objects are defined by coding a class, and sibling objects share the same class. The characteristics of one class of objects are different from other classes. In Integrator, there are only three fundamental classes of objects: container, master object and label-value pair. Label objects which hold the labels and characteristics of other objects as data are also of the class "master object" and "label-value pair object." The specific characteristics of what is normally called "a class of objects" are stored as data in the associated label object, rather than creating a separate class. The multiplicity of different types of items in any representation is fully accommodated within these three types of objects. Thus, it should be appreciated that all objects in an Integrator application are in fact instantiated containers, masters or label-value pairs, while container labels, master labels or value labels are of the same basic three types, but differ only in that their data is the syntactic, semantic and other metadata, or references to it, for the containers, masters and values that hold data itself.

Creation Sequence for Integrator Objects

What follows is a formal, generalized description of how objects are instantiated in the Integrator scheme. Taken together, these six (or five) types of objects constitute an Integrator Object (I-object).

1. Container: The container is an object that contains a reference to the container label object, to the parent master object within which it is referenced by a value object and contains references to such master objects as are to be understood to be "contained" within the container object. In the simplest implementation these basic values can be held in a master object "Container data" referenced by the container object. Containers hold master objects as either an array of UIDs or by the implicit method, such as in an XML representation, where the master object(s) are simply listed within the container object. The container object is generated by the following algorithm:

Container algorithm "Allocate new Container object"
Input parameters:
  Container label
  parent Master object—null for root Containers
  integrator—reference to the root Integrator instance
Written in Java as:

```
class Container {
    // Allocate new Container object
    Container(MasterLabel Container_label, Master
    parent_Master_object,
Integrator integrator) {
        this.number=""+(++Integrator.number_counter);
        this.container_label = Container_label;
        this.parent_Master_object=parent_Master_object;
        this.integrator=integrator;
    }
}
```

Figure 28:
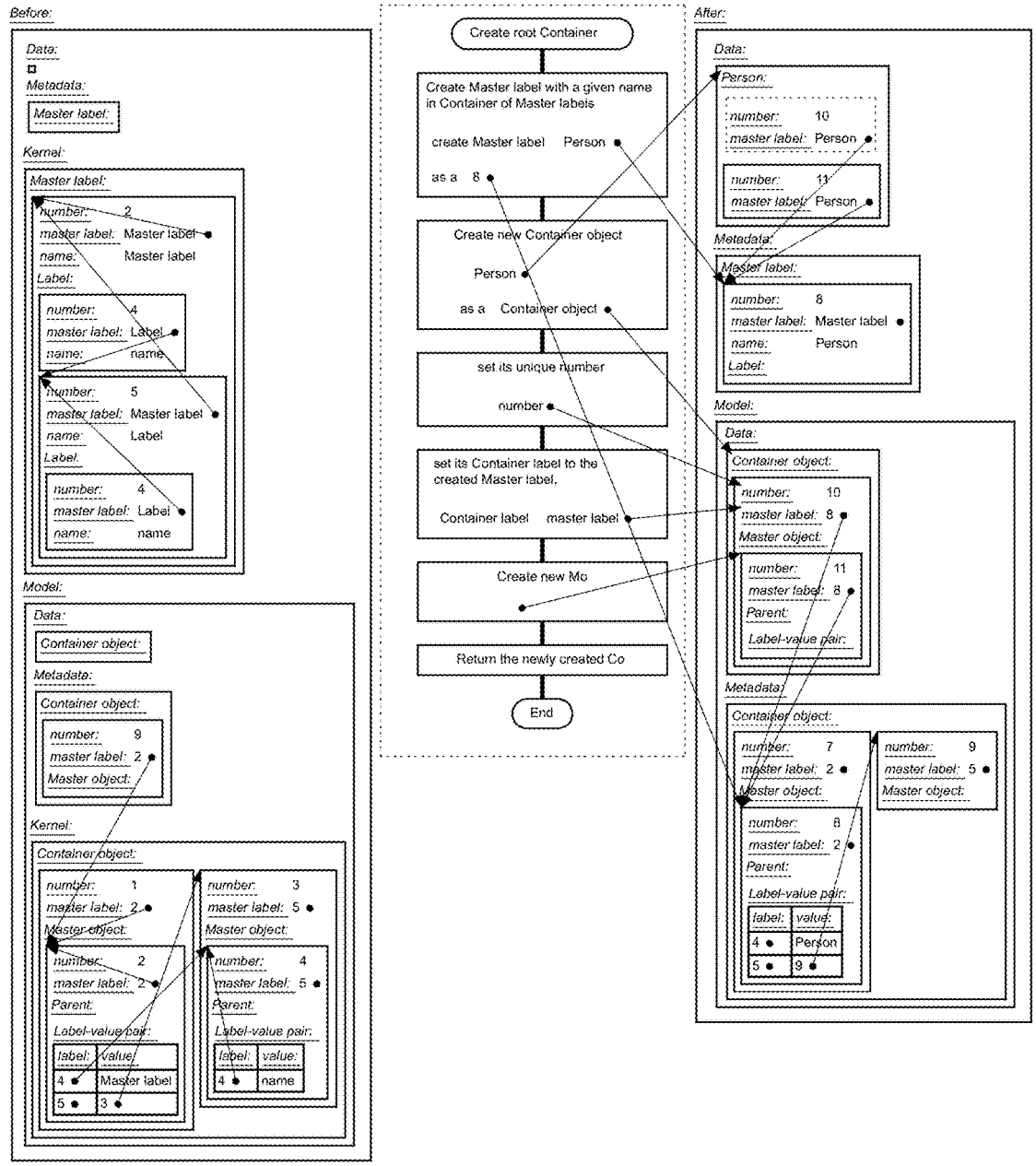
FIG. 28 is a screenshot of the algorithm "Create Root Container" which initiates a new Integrator application. Invoking this algorithm with its gesture generates a new Root container object "Data" as an I-object with the data input requested for its label value, in this case "Person."
Figure 29:
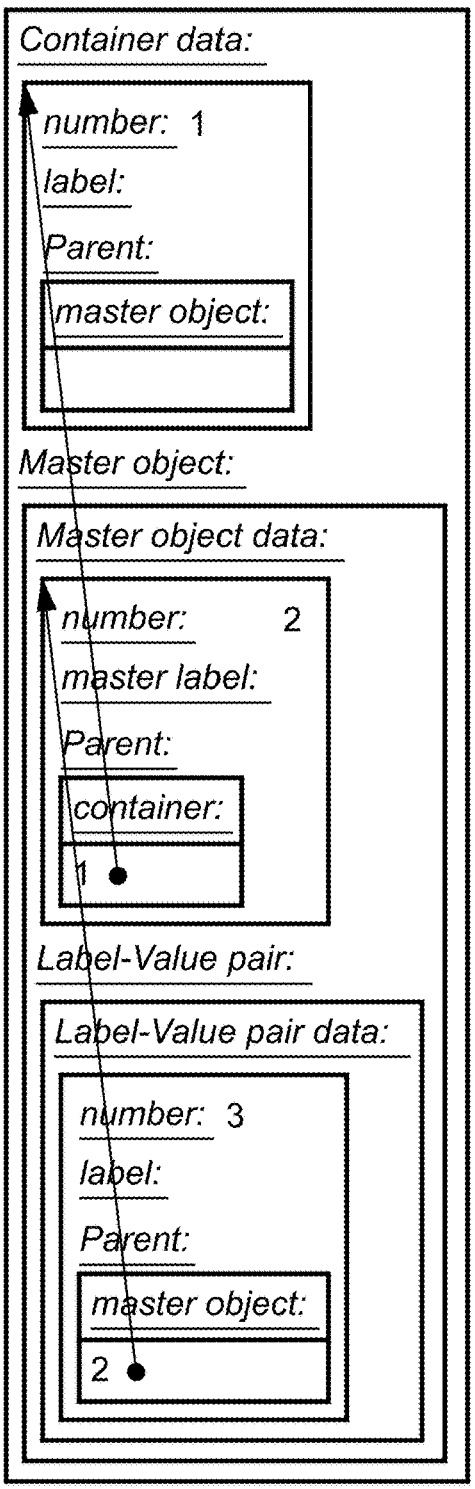
FIG. 29 is a screen shot displaying an instance of a Root Container Object, which holds an entire application, without being the value of a label-value pair within a master object, so its parent master object reference is null. The label objects are not shown in this figure.

There is a special instance of the container object called a "Root Container Object" which holds an entire application. It is "self-contained" and is not held within another hierarchy. An instance of Integrator is held within a root container and the entire contents of the program and its data in that root container can be displayed. Otherwise, the root container is analogous to a "workbook," file or a new relational database, when it is stored with its contents as an Integrator application. The root container is completely unlike existing concepts of "container" as an Abstract Data Type or similar construct. The root container object is generated by the algorithm above, except that the value for "this.parent_Master_object=null" is used. FIGS. 4, 28 and 29 demonstrate the structure of a root container object and its contents, as well as the algorithm used to instantiate a new application using a root container object, or when a saved application is read into memory. The algorithm below initializes the interaction-specific metadata on the kernel objects, and by extension other objects within an instance of Integrator, once the input parameters have been supplied by checking the appropriate two boxes by the Execute button. See FIG. 4 for a screen shot of the initialization.

Integrator algorithm "Initialize Kernel Master labels"
Input parameters: none
Java:

```
class Integrator {
    public void Initialize_interaction_specific_Metadata( ) {
        initialized_interaction_specific_Metadata=false;
        Container global = Create_root_Container("Global metadata");
        global_Metadata_Mo=global.Create_new_Master_object_in_Container( );
        global_Metadata_Mo.master_label.Add_new_Label("Label", "current Properties");
```

```
Properties_Ml=global_Metadata_Mo.master_label.Add_new_Container_label("Properties");
    Master
current_Properties_Mo=global_Metadata_Mo.Get_Container_Value_by_Label_name("Properties
").Create_new_Master_object_in_Container( );
        global_Metadata_Mo.Set_Value("current Properties", current_Properties_Mo);
        // add some properties
            Properties_Ml.Add_new_Label("Label", "show object numbers"); // label color
        current_Properties_Mo.Set_Value("show object numbers", false);
        // Add Properties to Master label and Label
        kernel_Master_label_Master_label.Add_existing_Label(Properties_Ml);
        kernel_Ml_name_label.getMaster_label( ).Add_existing_Label(Properties_Ml);
        initialized_interaction_specific_Metadata=true;
    }
```

Figure 9:
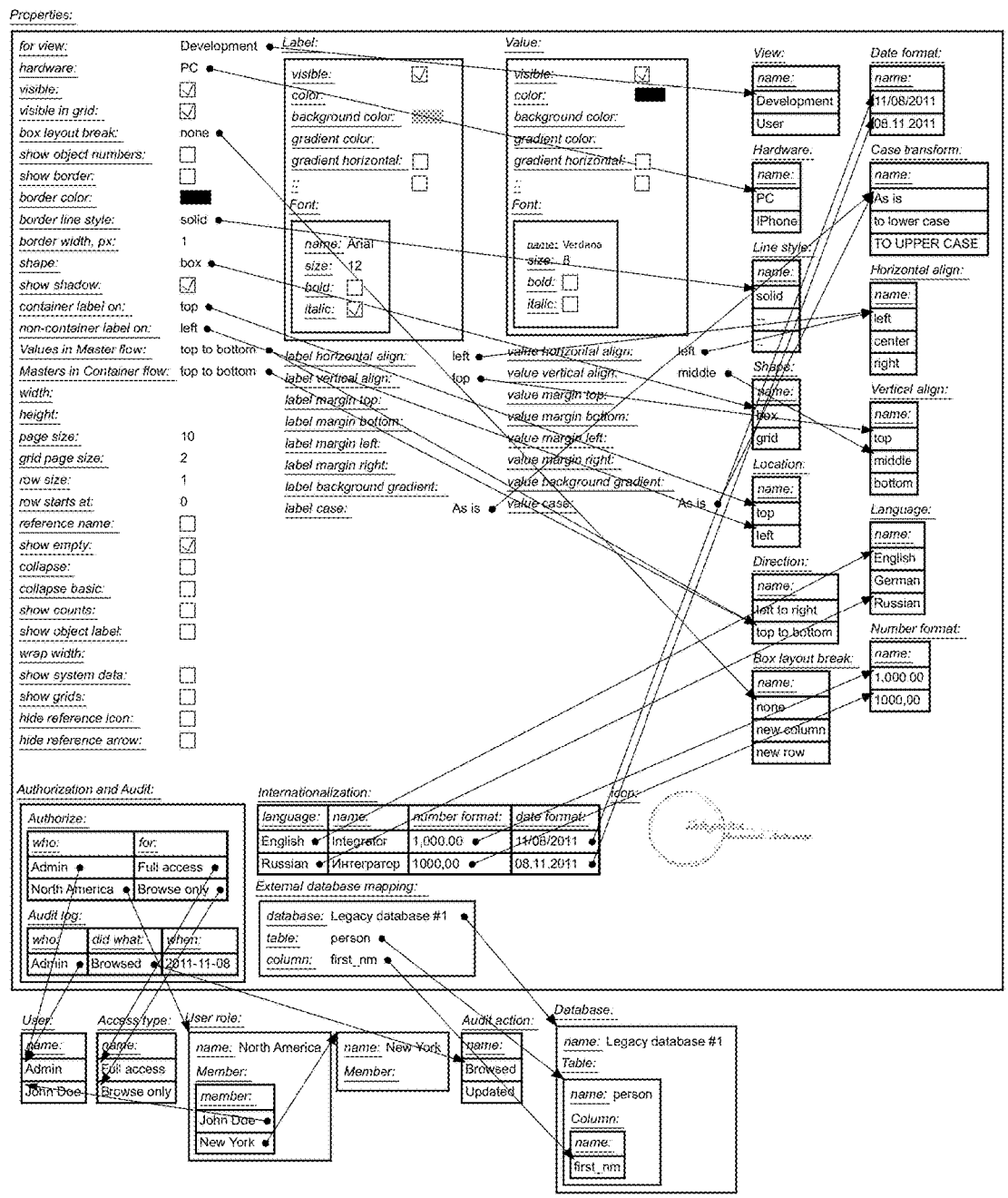
FIG. 9 is a screen shot of a typical Global Properties container object of interaction-specific data available on every label object. Different implementations will have different properties available.

Implementation creates a root Container with Global metadata available on every object. This collection of metadata is called "Properties" and an example is shown in FIG. 9. Once the initialization code shown here has been run, an instance is created and metadata is stored within it. Thereafter loading the Root Container initializes functionality. Note that this functionality includes access to Integrator algorithms available through commands in the application.

2. The Master Object: When a master object is first created, its reference is placed in its container object. A reference to its parent container object is also placed in the master object, as well as a reference to its master label object. Sibling master objects represent different items in the collection which share the same type, i.e. "person" or "company," and sibling master objects share the same master label object. Master objects representing items of a different type may be contained in the same container object, but will reference a different master label object. Moreover, master objects may be held in more than one container, but since they can be located by their UIDs, in fact there will only be one version, usually the first. Master objects contain value objects which hold the data for their specific items. The new sibling master object is generated by the following algorithm, using the master label object as a template:

Master algorithm "Allocate new Master object"
Input parameters:
    Master label
    Parent Container
Written in Java as:

```
class Master {
    // Allocate new Master object
    Master(MasterLabel master_label, Container parent_container) {
        this.number=""+(++Integrator.number_counter);
        this.master_label=master_label;
        this.parent_container=parent_container;
        if (master_label!=null) {
            createInitialLabelValuePairs( );
        }
        if (parent_container!=null) {
            parent_container.Masters.add(this);
        }
    }
    void createInitialLabelValuePairs( ) {
        for (Label valueLabel : master_label.Get_Master_labels_Labels( )) {
            Label_Value_pair value=new
Label_Value_pair(this,valueLabel,valueLabel.Create_Type_specific_default_initial_v
alue(this));
            Label_Value_pairs.add(value);
        }
    }
    public Integrator getIntegrator( ) {
        if (parent_container!=null) {
            return parent_container.getIntegrator( );
        } else {
        return master_label.getIntegrator ( );
        }
    }
}
```

Master number is automatically generated; necessary references are established. Label-value pairs with Type-specific empty initial value objects are created for each Label on the Master label object. Reference to any Integrator object can be obtained either via parent Container Object or via Master Label Object, whichever is available, due to aggregation, as shown in FIG. 1.

Figure 5:
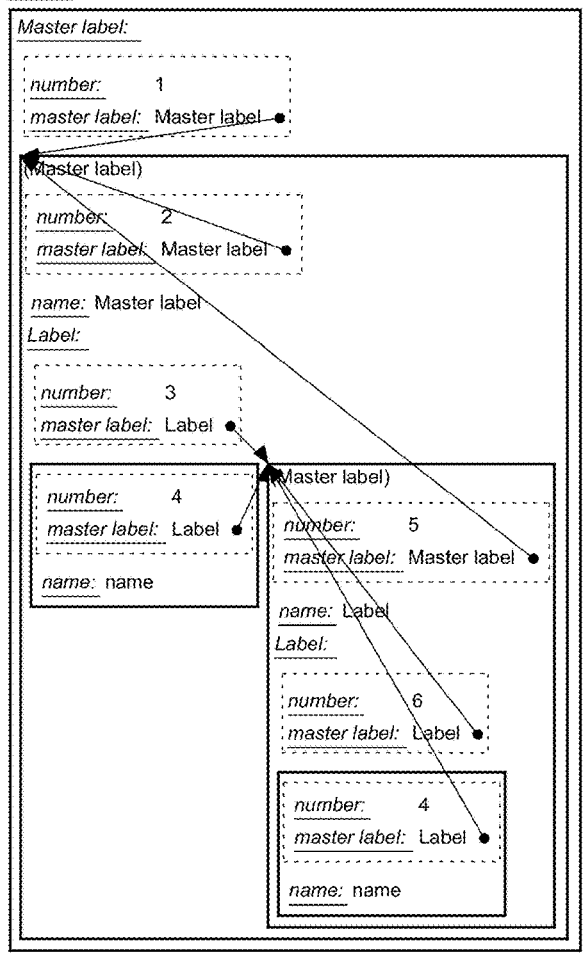
FIG. 5 is a screen shot of another view of the kernel of master label objects and their data common to instances of Integrator. At the top is a text file with indentation to depict the hierarchy. The container object labeled "Kernel" illustrates the Kernel objects with the labels populated with and the child container objects nested within master objects. The container object "Model" depicts the actual complete model in memory with the Terminal Values for labels held as value objects of label-value pairs and with the three container objects 1, 3 and 6 side-by-side.
Figure 5:
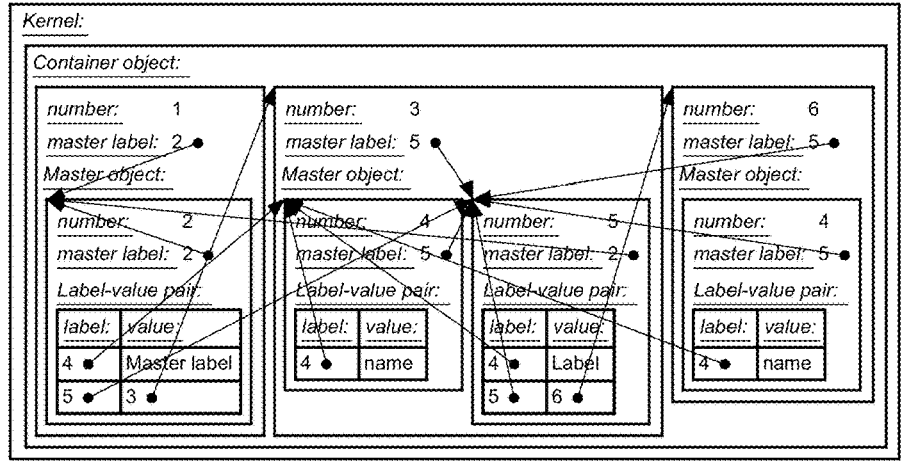
Figure 31:
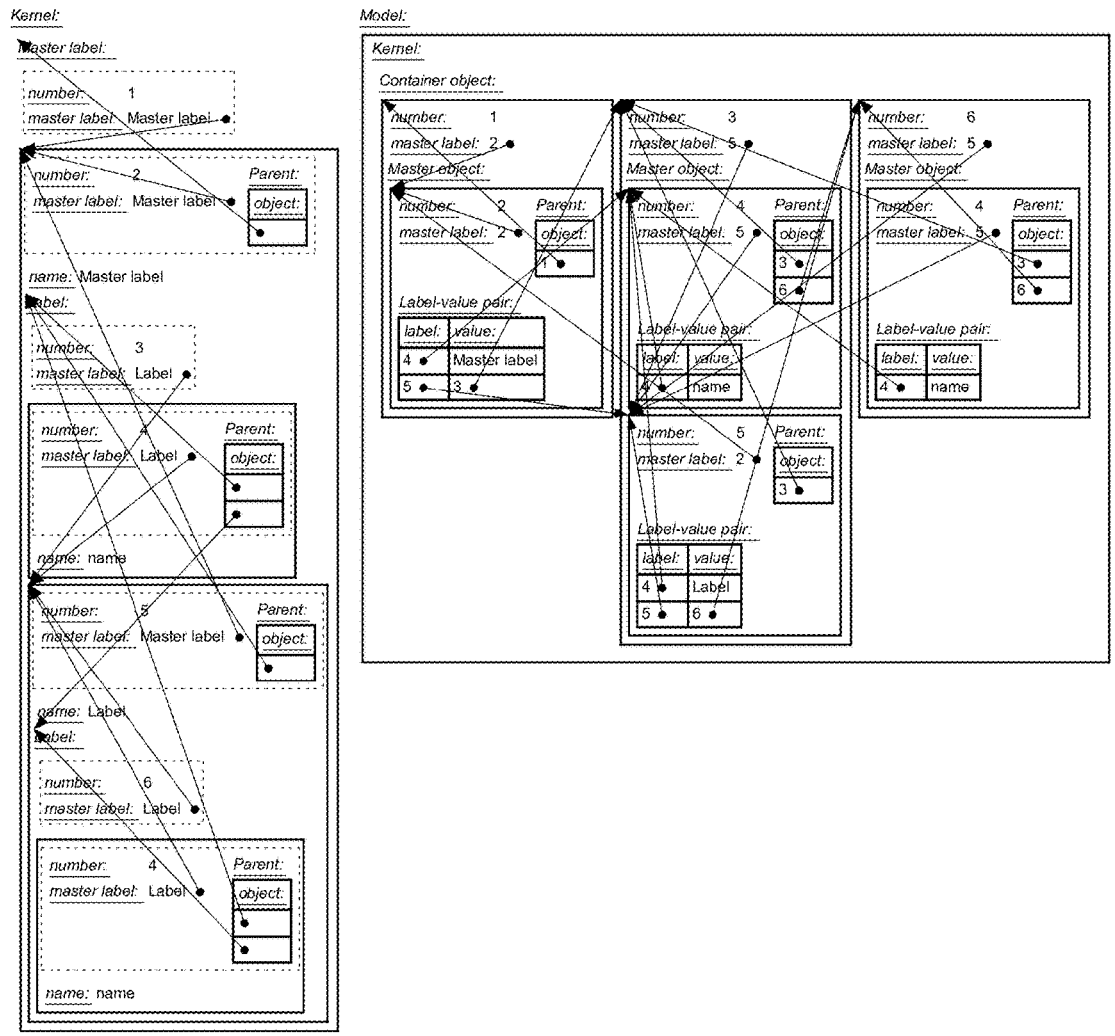
FIG. 31 is a screen shot of the Kernel, where the master object 4 that holds the single label "name" is shown to have multiple parents.

3. The Value Object: The first value object is created when a master object is created; the value object is placed in the master object, and a datum, which may be null, is placed in the value object. The data type of the value may be determined at the time it is required by the use to which the value will be put; data type and other attributes of the value object are held as values in the label object for that value. There may be one or more value objects held by a master object, and the same value object may be held by multiple master objects;

the original value object will be referenced by any copies of this value object. As an example, the Label "name" is held in one master object #4, but appears in two container objects in the Kernel, as shown in FIGS. 5 and 31.

A value object may be a terminal value object, in which case it contains only data, or a value object may hold a reference to another object. A value object within a master object is the value of a label-value pair, of which the label is a reference to the value label object (see below). Nesting of objects is accomplished in Integrator by having a value object reference a Child Container, which is then logically located within the Master Object. This construct permits infinite nesting of complex data, as is accomplished in conventional relational databases by having child tables with foreign keys. The value object is generated by the following algorithm:

Label Value pair algorithm "Allocate new Label Value pair"

Input parameters:
  Master object
  Label
  Value
Written in Java as:

```
class Label_Value_pair {
    // Allocate new Label Value pair
    public Label_Value_pair(Master master, Label label, Object value)
    {
        this.number=""+(++Integrator.number_counter);
        this.parent_Master=master;
        this.label=label;
        this.value=value;
    }
}
```

Figure 8:
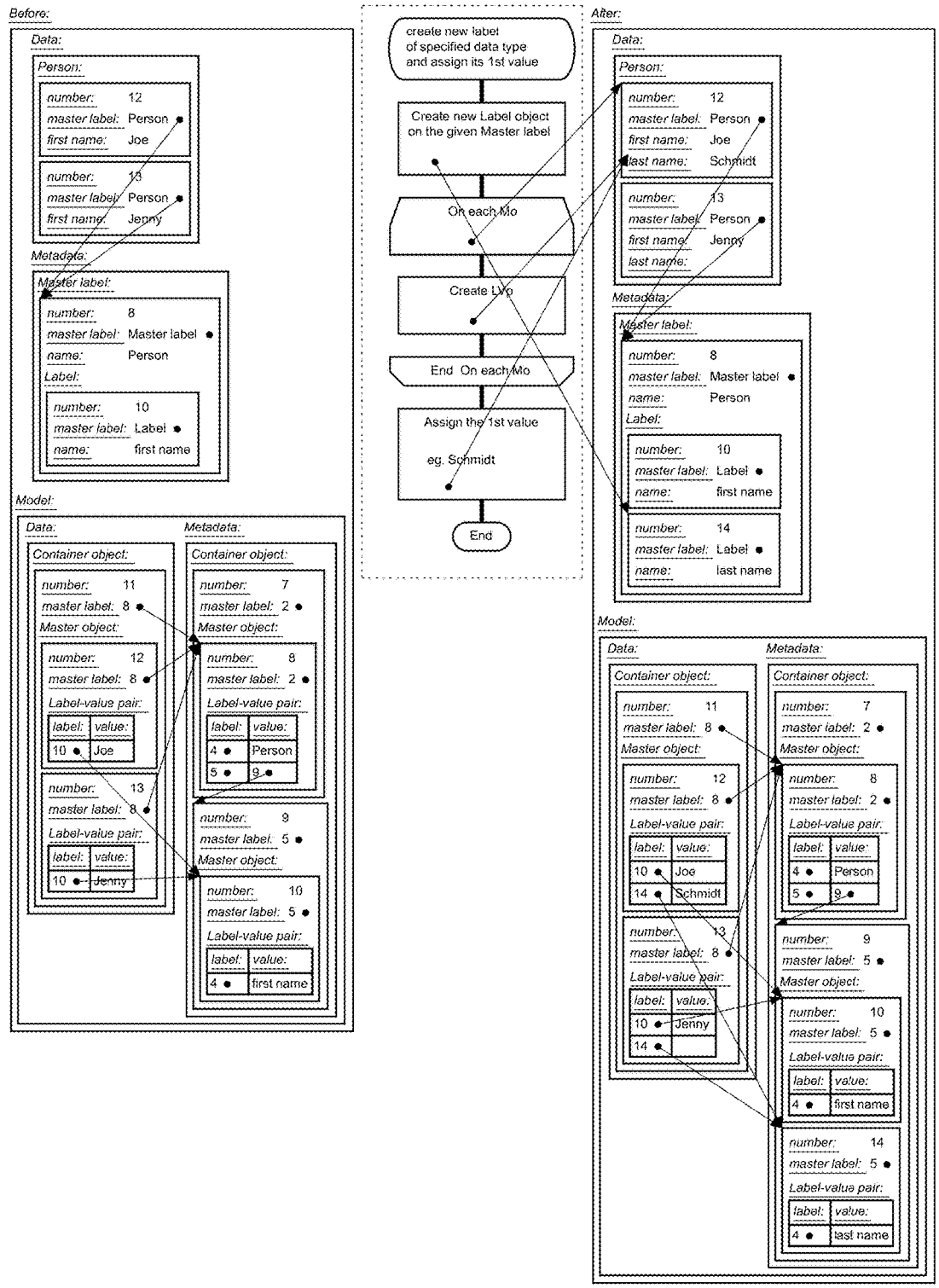
FIG. 8 depicts the action and result of adding a new label-value pair. It shows the Integrator data application before and after a new text label-value pair is instantiated. The algorithm which instantiates this label-value pair is shown in Drakon format with references to the values instantiated. Changes to both master objects and master label objects are shown in "Data" and "Metadata" and the combined effect in the underlying "Model."

Label Value pair number is automatically generated, unless the array method is being used; necessary references are established by the algorithm. When a label-value pair is instantiated in a master object, only the value object in that master object will hold the input value; the instantiation algorithm will then place the label object in the master label object of that master object and instantiate the same value object in sibling master objects, with null data. Instantiation of a new label-value pair is shown in FIG. 8.

4. The Master Label Object: A master label object is created when a first master object is instantiated; a reference to the master label object is placed within that master object, as well as within sibling master objects subsequently instantiated. A label-value pair in the master label object contains the data understood to be the name of the master object or a reference to another value object with that data. A reference to each of its sibling master objects is placed within the single master label object. The master label object contains either the data for the value label object or a reference to where the data is stored for every value object in its master objects. Thus the master label object provides the data for the labels for the label-value pairs of value objects within its master object(s); it also contains the syntactic data required to store, manipulate or otherwise work with the data in the value objects (Properties). The Master Label Object is the closest analogy to a table in conventional databases, and it might be thought of as the header row in such a table. Master label objects may appear conveniently as master objects within their container object "master label" although they can be located in any container, even sharing the same container as their master objects. The kernel master label object "master label" provides the template for all master label objects including itself; this object contains the label-value pairs whose values contain data for the labels of the label-value pairs inside all master label object(s), i.e. "name," as a text label. Since Master label are subclasses of Master, they are allocated just like any other Master object (albeit with specific appropriate values of parent Container and Master label):

Integrator algorithm "Create Master label"

Input parameters:
  name—name of the new Master label (Used as name for its master objects)
  in Container—parent Container which will contain the new Master label Implementation in Java:

```
class Integrator {
    public MasterLabel Create_Master_label(String name, Container inContainer) {
        MasterLabel Master_label=new MasterLabel(kernel_Container_of_Master_labels.container_label, inContainer);
        Master_label.Set_Value("name", name);
        return Master_label;
    }
}
```

Implementation creates new Master Label and then invokes "Set Value" algorithm on the new Master label object to set the value of its 'name' attribute, based on the input value.

5. The Value Label Object: The value label object is instantiated as a value object in the master label object when a value object is added to its master object(s). Every instance of a value object has access to its value label object through a chain of references, explicit or implicit, such that given a value object, the algorithm instantiating a request to the Integrator application locates its value label object, and given a value label object, instances of its value object(s) are located as needed. The value label object is instantiated as a label-value pair whose value contains the data for the label of its value object. This data is understood to be the name of the value object; this data is not necessarily a text expression and may be any expression, number, picture or other datum. The value label object may contain a reference to another object as its value, and the algorithm follows this reference and any further references until it obtains a terminal value, which is then displayed in the label of the value object, as well as in the value label object itself when the master label object is viewed.

Master label algorithm "Add new Label"

Input parameters:
  type—indicates Type of the new Label, such as "Label", "Text", "Reference to Master object" etc.
  name—name of the new Label Java:

```
class MasterLabel {
    public Label Add_new_Label(String type, String name) {
        Container labelContainer=Get_Container_Value_by_Label_name("Label");
        Label label=new Label(labelContainer.container_label, labelContainer);
        label.Set_Value("name", name);
        populate_Values_for_new_Label(label);
        return label;
    }
    void populate_Values_for_new_Label(Label label) {
        // add default value to all objects of
        for (Master master: Get_all_Master_objects_of_Master_label( )) {
            master.Set_Value(label,
label.Create_Type_specific_default_initial_value(master));
        }
    }
}
```

One can use the implicit reference method, rather than instantiate separate references from value objects to their value label object. Label values or references to them can be stored in an array in the master label object, while the value objects are stored in a corresponding array in their respective master objects. The algorithm for retrieving data for the label of the value object locates this data in the value label object in the corresponding cell in the array in the master label object. The basic principle of connecting the value object and value label object intimately operates in either the referencing or array implementation. Thus the value label object and its value object form the two halves of a label-value pair, but are located in separate objects.

6. The Container Label Object: The container label object contains a reference to its container object as well as a label-value pair whose value is displayed in the label of this container object. The value of this label-value pair usually references a master label object which holds the value required as data; therefore the container label object is redundant in most cases. However, it has potential uses and is retained as a fundamental object in the description of Integrator. There may be instances where the container object does not share its name with any master objects it contains, in which case the container label object either contains a label-value pair whose value is understood to the name of the container object or it references a master label object with the name of the container as its only value object. The container label object is created when a new container object is instantiated and its reference is added to its container object. Container label objects may be conveniently located in a separate container "container label", even though their container objects themselves may be nested within master objects. In the case of the five-fold implementation of an I-object, the container object references a master label object for the label-value pair whose value is understood to be the name of the container or a reference to it. The choice to have separate container label objects is made when an Integrator application is initialized. The following code shows the generation of a Container Label Object for the label of a container object:

Master label algorithm "Add new Container label"

Input parameters:

name

Written in Java as:

```
class MasterLabel {
    public MasterLabel Add_new_Container_label(String name) {
        MasterLabel
label=getIntegrator( ).Create_Master_label(name,Get_Container_Value_by_Label_name("
Label"));
        populate_Values_for_new_Label(label);
        return label;
    }
}
```

Figure 2:
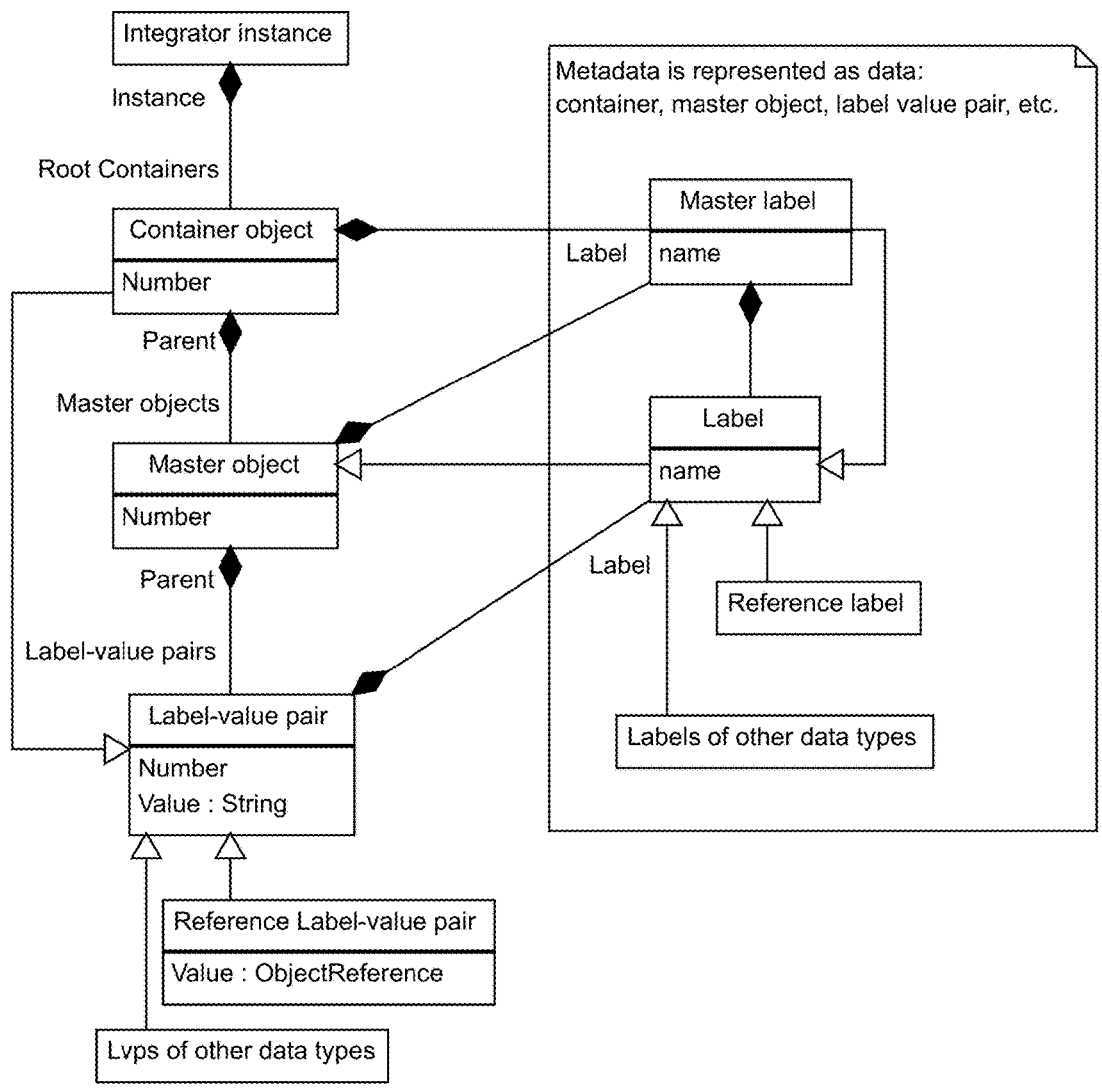
FIG. 2 is a schematic UML diagram of a complete 6-fold I-object, with the data and metadata held or referenced by each of the six objects.

These six (or five) objects are the components of a complete Integrator I-object. Container objects contain only references, while the other five (four) components contain data held in value objects as well, although in some instances these values may be references. Master objects are nested within container objects and value objects are nested within master objects, while their respective label objects are contained within master label objects within their respective container objects. The mutual syntax of these objects is always of the same form, as depicted in FIG. 2, which shows the graphical representation of a complete I-object in Unified Modeling Language (UML), and FIG. 30, where the entity-relation diagram is shown in Integrator format.

The container object is the outer component and occurs once for each I-object, along with its container label object. Each master object within a container object represents a separate item of its type in the collection and sibling master objects of this type share the same master label object as a template. The individual data of each master object is stored in its value objects, each with its corresponding value label object stored in the master label object. The following table of components shows their contents, but note that either the implicit or explicit referencing method may apply:

TABLE 1

Components of an I-object

| Component: | Contained References | Data |
|---|---|---|
| Container (and its identifier) | Reference to Container Label Object or Master Label Object<br>References to Master Objects it contains<br>Reference to parent Master Object which contains this Container as a Value Object | References |
| Master Object (and its identifier) | Reference to its Master Label Object<br>References to Container<br>Value Objects it contain(s) | References<br>Value Objects |
| Value Object (and its identifier) | Reference to its Master Object<br>Reference to its Value Label Object | Data or reference to its location |
| Master Label Object (and its identifier) | Reference(s) to its Master Object(s) - Optional (can be calculated by iterating over Master Objects)<br>Reference to its Container<br>Reference to its Master Label Object<br>Value Label Objects it contains | Name of Master Object or Container Object as data or reference<br>Value Label Objects<br>Data on the attributes of the data of the Value Objects in Master Object that reference it and its Value Label Objects |
| Value Label Object (and its identifier) | Reference to its Master Label Object, if not located there.<br>Reference to its Value Object. | Name for Value Object as data or reference<br>Data on the attributes of the data held in its Value Object and itself |
| Container Label Object (and its identifier) | Reference to its Container Object<br>Reference to its Container<br>Reference to its Master Label Object | Name for Container as data or reference |

Description I-Object Components and their Mutual Relationship

The starting point is the container object. A container object references the master object(s) it contains and also holds a reference to its container label object (if used) or its master label object. The container object also holds a reference to its parent master object, unless it is the Root Container. Master objects contain a reference to their parent container object and their master label object; they also contain value object(s), which hold the data sought.

A master label object contains a label-value pair whose value serves as the name of its master object(s), as well as of its container object if the two share the same name. (In cases where the name of the container object is different than its master objects, then the label-value pair in the container label object references another master label object with a label-value pair whose value is the name of this container object. The master label object contains value label object(s), whose data is supplied to the labels of the value objects contained in their master object(s). Master label objects (as master objects) also reference their master label object "master label" to obtain the data for their labels.

Container label objects are conveniently held in a container object (called "container label"), master label objects are conveniently held in a container object (called "master label") and value label objects are held by data type in container objects (named by type, such as "text label"). The container label objects are therefore master objects within this container; in turn they reference a master label object (called "container label"). The data supplied for every label is data stored in a separate value object, within either a master label object, a container label object or another master object.

The Master Label Objects "Master Label" and "Value Label" play a special role in the instantiation of Integrator. All master label objects reference the master label object "master label." Its value objects are referenced by the labels of the label-value pairs in master label objects, and the data in these value objects, such as "name" and "value label," is used in the labels of master label objects, including the name "master label." These objects are traversed by algorithms as they accomplish a particular task, such as generation of the user interface or data retrieval. As the nodal objects at the peak of the hierarchy, they serve as their own label objects. This core set of master label objects is called the Kernel and is illustrated in FIGS. 5 and 31-35. Since the algorithms contain a completion rule, so that they stop once a terminal value is obtained, an object may reference value objects within itself without danger of a loop or endless regress.

Additional label-value pairs, master objects or containers can be instantiated by menu commands and manual entry into the fields supplied by the command or instantiated automatically by algorithms. Upon completion of editing, the change algorithm propagates structural changes to the required data and label objects, stepping through them systematically as it follows a chain of references to its end, and then moves to the next instance. Thus manually adding a label-value pair to a master object triggers the change algorithm to traverse to the master label object, instantiate a label value object, populate it with the data entered for the label, and then traverse all other master objects referenced by the master label object and insert a value object in the corresponding position with a null value. In case the data for labels is stored within separate master objects, as in the examples in FIGS. 6 and 7, the change algorithm instantiates a new master object of the data type chosen at data input and using the relevant master label object for that data type as a template, sets the value object to the data entered for the label, and then traverses to the master label object of the master object where the change was made manually, inserts a label value object whose data is a reference to the newly-created master object, and then changes other master objects as above. FIG. 8 illustrates the process of instantiating a new label-value pair manually. The bi-directional references maintain integrity, as each value or label value object is listed as a reference in the master object or master label object it references, so the set of references the change algorithm follows is complete. In the same way, references to their master objects are instantiated in container objects when the master objects are instantiated, and all master label objects are referenced by both their master objects and the container "master label."

Nesting of I-Objects

To add a child item to a parent master object, one instantiates the entire 6 (or 5)-fold Integrator object. In the parent master object one instantiates a label-value pair whose value object holds a reference to a child container; the corresponding label object in the master object references the child container label object. The nesting paradigm is illustrated in FIG. 3. In this way the particular child container, child master object(s) and value object(s) are referenced from their parent master object, so data in the child value objects are particular to this master object. Instantiating a child container in a parent master object triggers the change algorithm as above, so siblings of the parent master object also receive child containers and a child container is instantiated in the master label object as well. Each sibling master objects references its own child container by its UID, which is assigned when the child container object is created. Each child container holds a reference to its parent master object. Therefore references to the child containers or their contents are not ambiguous. As an example, a master object "person" may have a child container "Phone" as a value object. Each phone number of each person is a child master object within this child container and is available to its parent master object. Moreover, separate "persons" may share "phone numbers," so any further persons who share a number would have the value object "phone number" be a reference to the first master object; a search on this phone number would show instances of "persons" at that phone number. It is well known in relational database programming that multiple references are very difficult to handle, and this is known as the 'one-to-many, many-to-one" problem which has no easy solution. However, since Integrator uses a separate child container object in each master object, the problem of multiple references contained in the child master objects vanishes. Each "phone number" is associated with its "persons," while persons can have multiple "phone numbers," without conflict.

The child container objects in a set of sibling master objects reference a shared child container label object within the parent master label object. Master objects within the child container object share a master label object within that child container in the master label object.

The nesting of I-objects is always accomplished in the same way: a value object references a container object, which references its master object(s) which references or contains its value objects and each in turn reference their respective label object(s). One or more of the value objects may reference yet more child containers. This nesting pattern is consistent, recursive and recreates the same hierarchical structure without limit.

I-Object General Characteristics

Aggregation is important to the implementation of Integrator; the six (or five) subsidiary objects exist as one associated group at every level of recursion. Each object type in the nesting hierarchy has the next inner object aggregated within it, in the sense that the inner object is referenced and its interaction-specific data is accessible. A container object aggregates to the value object which holds its reference. except for Root Container which holds an instance of Integrator. The master object aggregates to the container, while the value object(s) aggregate to the master object. In turn, each label object aggregates to its respective outer object: value label object aggregates to its value object and to its master label object; the master label object in turn aggregates to its master object and its container object. The container label object aggregates only to its container object. Thereby interaction-specific data and the interfaces to subsidiary objects within each I-object are available from the Container Object. For general discussion of aggregation see: (see URL ootips.org/uml-hasa.html or URL en.wikipedia.org/wiki/Object_composition) Microsoft makes the following comments on aggregation at URL msdn.microsoft.com/en-us/library/ms686558.aspx: "Aggregation is the object reuse mechanism in which the outer object exposes interfaces from the inner object as if they were implemented on the outer object itself. This is useful when the outer object delegates every call to one of its interfaces to the same interface in the inner object. Aggregation is available as a convenience to avoid extra implementation overhead in the outer object in this case."

Integrator implements this aggregation through a series of references which are instantiated automatically as the application is developed. As new I-objects are nested within previously instantiated objects, they reference and are referenced by the master object within which they have been placed through the value object which holds the reference to the child container object. So every label-value pair has a label object which references a value label object within a master label object. The data in this referenced value object may be a terminal value, as data, or a reference to another object with the data value sought. When the chain of references reaches a terminal value, the data sought is retrieved and displayed in the label cell. Aggregation is implemented by enabling a chain of references from any starting point to the terminal value which supplies the data required, no matter where in the hierarchy one starts and no matter how many levels one traverses.

Generalization is another aspect of the six (or five) constituent parts of an I-object, as well as between hierarchical layers of other I-objects contained within an I-object. By generalization we mean that the interaction-specific data becomes available, either as duplicates controlling their respective targets at different hierarchical levels, or as shared between objects at the same level. Every instantiation of a component of an I-object is based on a label object which supplies a template for its elements, which include the interaction-specific data as I-objects. This allows the appropriate interaction-specific data to be instantiated and available on every individual object.

In practice, this means that container label objects or master label objects, appearing as master objects within their container objects, contain value objects which reference containers of interaction-specific data, such as display properties, internationalization, permissions, and so on. The data required to implement a specific result, such as a display on a screen type, is held as parameters in value objects within master objects, and there is one set of parameters available for each type of screen. These containers of interaction-specific data may be placed for convenience within the container "general metadata," but they remain accessible to all objects through generalization. Generalization means that each six (or five)-fold I-object has reference to the parameters in the standardized metadata attributes required by any algorithm. It also means that the interaction-specific data is supplied through I-objects and therefore the same algorithm can obtain any data required throughout Integrator.

Completeness means that Integrator combines stored data and interaction-specific data in one structure. Data necessary to support some appropriate interpretation and output or input is available in the same data structure and therefore obtained by the same path which is executed by the various algorithms. As a matter of convenience, some parameters required may not be stored in the database; as an example, display color for monitors is usually specified in RGB or BYCM format. Some embodiments of Integrator may offer fewer Interaction-Specific Data features. However, the totality of data and features is still complete and consistent within a particular application and sufficient to deliver the required result.

Figure 30:
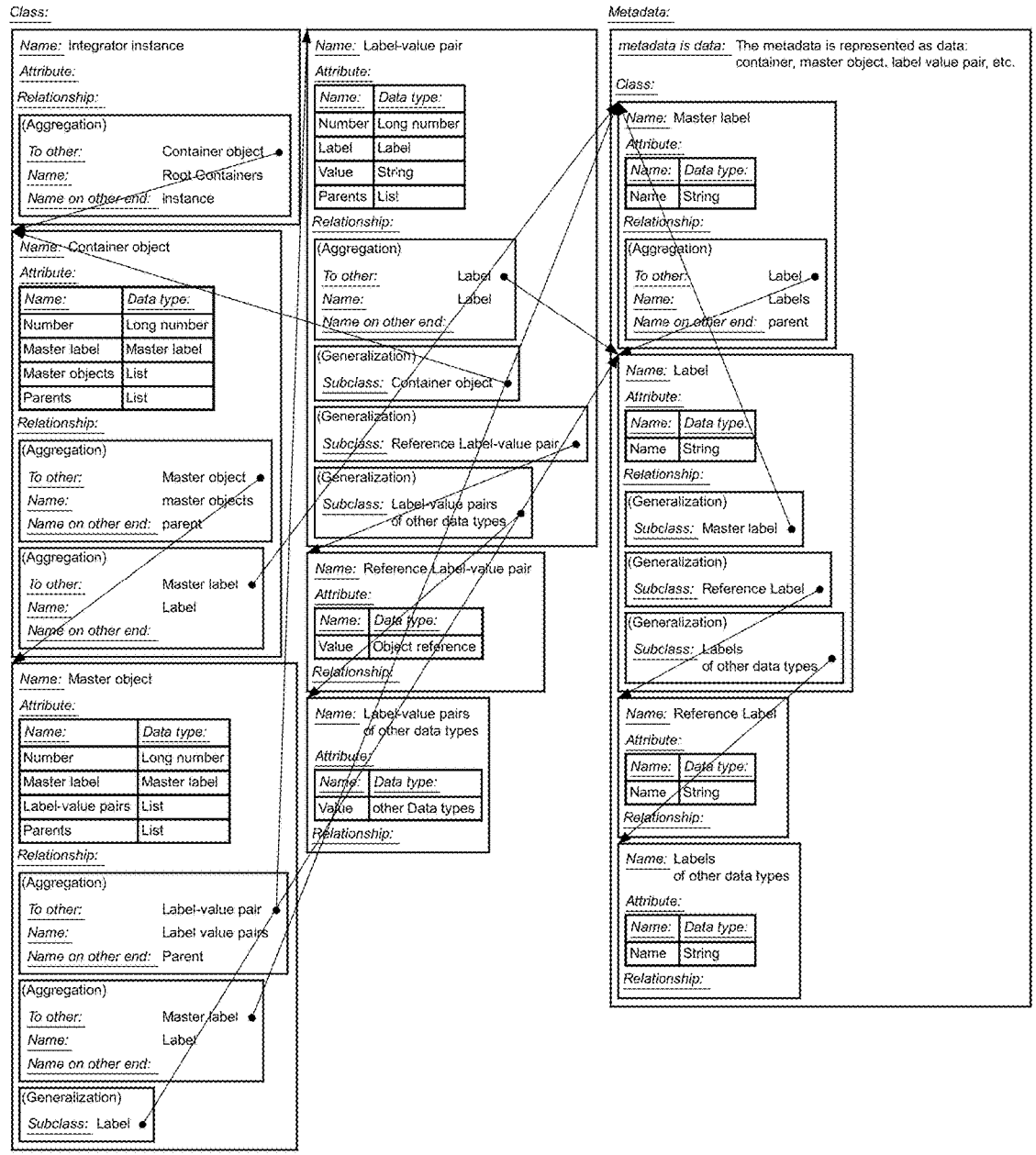
FIG. 30 is a screenshot of Integrator UML in Integrator notation showing how metadata and data are connected. Variation on the Kernel, where Master labels are logically connected in a Tree Hierarchy. Master object 4 appears twice in the Kernel depiction, as it provides the same data "name" but is used for master label objects in the first case, within container object (3) and for labels of label-value pairs when held in container object (6). In both cases, (4) references both parents and is instantiated as a reference to its UID, so it is only held once as data in the model.

Aggregation, generalization and completeness care illustrated in the UML diagrams, shown in FIGS. 1 & 2 and again in Integrator format in FIG. 30.

Relations Among I-Objects

Relations are connections between the objects defined above. In Integrator, a relation is a form of label-value pair where the value object contains the identifier of another object, while its label contains a reference to the value of another label-value pair, whose value is the data understood to be the name of the referencing object. In other words, a label-value pair may contain either one or two references; labels always reference the value of another label-value pair. A referenced object may in turn contain a further reference as its value, and so on until a terminal value is obtained and then displayed as the content of the original referencing cell. Every reference to another object is replaced by the terminal value at the end of the chain of references when the Integrator application is traversed for display or output.

Relations are instantiated in both directions. Sometimes the identifier of the referencing object is placed in the object referenced, such as when master label objects contain references to the master objects that reference them. At other times the referencing object is found by traversing all relevant objects to locate it. In either case, this bi-directional relation enables a change in a subsidiary object to be propagated up to its referencing object and then to its sibling objects.

The algorithm which traverses an Integrator application to obtain the data required for a function, for display or for output starts at a Container Object and finds a first label-value pair. The label portion references the master label object "container label" which is the label object for all container label objects. The value object of the first label-value pair in master label object "container label" references a value object whose data is "container label". This data is then reported for the label of the first label-value pair of the first container object and the algorithm steps to the next item, which is the value object of that first label-value pair. This value object holds a references to the container label object or master label object associated with this particular container. The algorithm either finds the value object of the first label-value pair in the label object, where it obtains a terminal value, or it finds a reference to a further object until it obtains a terminal value; this data is displayed as the name of the first container object. The algorithm then steps to the label of the next label-value pair and continues until all items have terminal values displayed. The key point is that the data for both labels and values is kept only in value objects and yet available through a series of references at run time.

Instantiating a New Object in Integrator

The data structure described above is created by the algorithms which run Integrator and are an integral part of the invention; these algorithms are invoked by Gestures, which are the actions taken by the user to invoke them, such as using a mouse, pressing a button, a key stroke, a verbal command, a finger tap, or an algorithm may be called by another algorithm. For example, new objects can be added by invoking the algorithms of the Integrator program such as "Allocate new Container Object," "Allocate new Master Object" and "Allocate new label-value pair" and providing the required inputs. Other Gestures are used to modify, sort, delete, retrieve, search and otherwise provide the functionality of a database system using the underlying data structure. As an example, FIG. 8 illustrates the instantiation of a new label-value pair "last name" in the application shown in FIGS. 5 and 6. The algorithm is shown in Drakon format with natural language in the boxes; its expression in Java follows:

"Allocate new Label Value pair"

Input parameters:
  Master object
  Label
  Value
Java:

```
class Label_Value_pair {
    // Allocate new Label Value pair
    public Label_Value_pair(Master master, Label label, Object value)
    {
        this.number="" +(++Integrator.number_counter);
        this.parent_Master=master;
        this.label=label;
        this.value=value;
    }
}
```

The Gesture "Allocate new Label Value pair" is invoked after placing the cursor and highlighting the Person object "Joe" (12). The inputs requested by the algorithm are input label-value pair "last name: Schmidt". The algorithm traverses the application and instantiates a new master object 14 in the master label object 8 "Person" with a label-value pair "name: last name" where the label is a reference to master object 4, the kernel master label object "Label" which holds the value object with the data "name." Note this is the same label value object used in the master object (10), which is the first master object in the container object (9) in the master label object (8) for "Person." Since the new label-value pair was instantiated in master object (12), with value object "Joe," and the input value for the new label-value pair was "Schmidt," this master object (12) then displays this data in the value object for the label "last name," while sibling master object(s) display the label but have a null value object. In summary, the algorithm receives the input data, instantiates all objects and references for the completeness of the I-object, and then places the input value in the new value object where the algorithm was initiated.

Additional Methods of Creating I-Objects

In the example given above, a single I-object is instantiated manually by the user. However, Integrator has algorithms which instantiate new I-Objects or entire applications automatically from a list of components. Such a list has syntax, so that the hierarchy of the list is defined by the relative place of its items. In this example, illustrated in FIG. 10, the syntax takes the abstract form:

Container Object: Data
    Master Object: Client
        Label-value pair: First name: John The syntax shown here is simply by indentation, which specifies that the value object is contained within the master object within its container object. The instantiation algorithm "Load Data from Text" will generate the complete I-object. We now have a container object "Client" with its master object named "Client" which holds a reference to a "value object" which has value "John," along with the corresponding four label objects; two of them are Child container objects. The corresponding Container Objects for "Route" and "Tour" have been instantiated with their master objects, and the references from the label-value pair "Route: Halifax" have been instantiated automatically from the use of the data "Halifax." Lists of any desired complexity are instantiated in a similar fashion. Note the master label object reflects and describes the list completely, but only the master label object "Client" is shown for reasons of space on the page. Given all master label objects; one can recreate the list used to generate the collection.

Since the list and the I-objects derived from it are related unambiguously, one can instantiate the I-objects using an algorithm that parses a list and assigns the items on the list to their appropriate I-objects. This algorithm requires parameters to interpret the syntax of the list, and these parameters can be stored conveniently in I-objects. In this case, given a list to interpret, one chooses the master object in the container "list interpretation" whose value objects contain the appropriate data. This particular list requires three parameters: "no indent"=container object, "single indent"=master object and "double indent"=value objects. The instantiation algorithm "Load Data from Text" is limited in its interpretation of lists only by its need for these parameters. Structured lists and trees are well known logical constructs, but have not been used for automated instantiation of databases.

Figure 11:
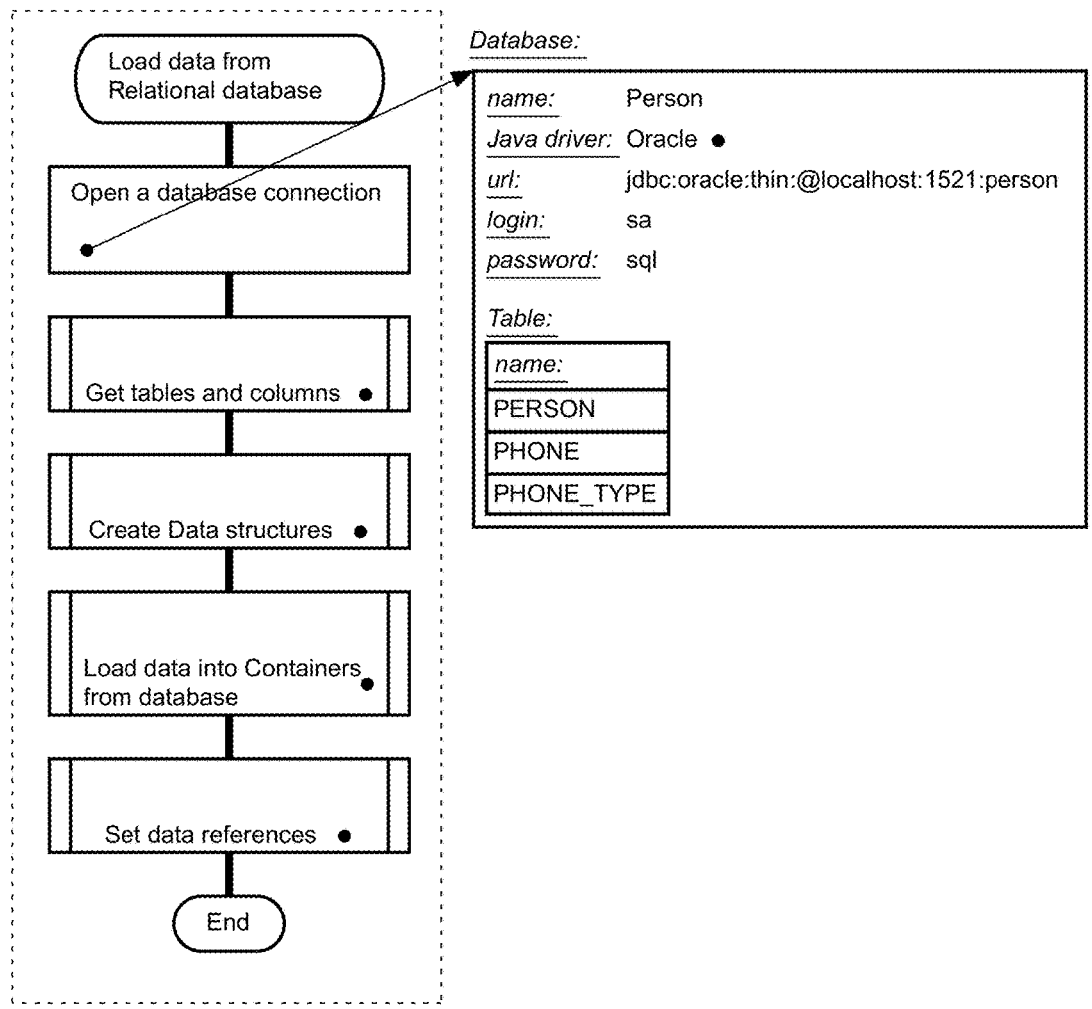
FIGS. 11-14 are structured diagrams of how the "Load data from Relational database" algorithm creates an Integrator application from an existing relational database and populates it with the data. The algorithm calls four subroutines, box with double side-edges, which are depicted as Drakon flow charts. Foreign Keys in the relational database are instantiated as child container objects.
Figure 12:
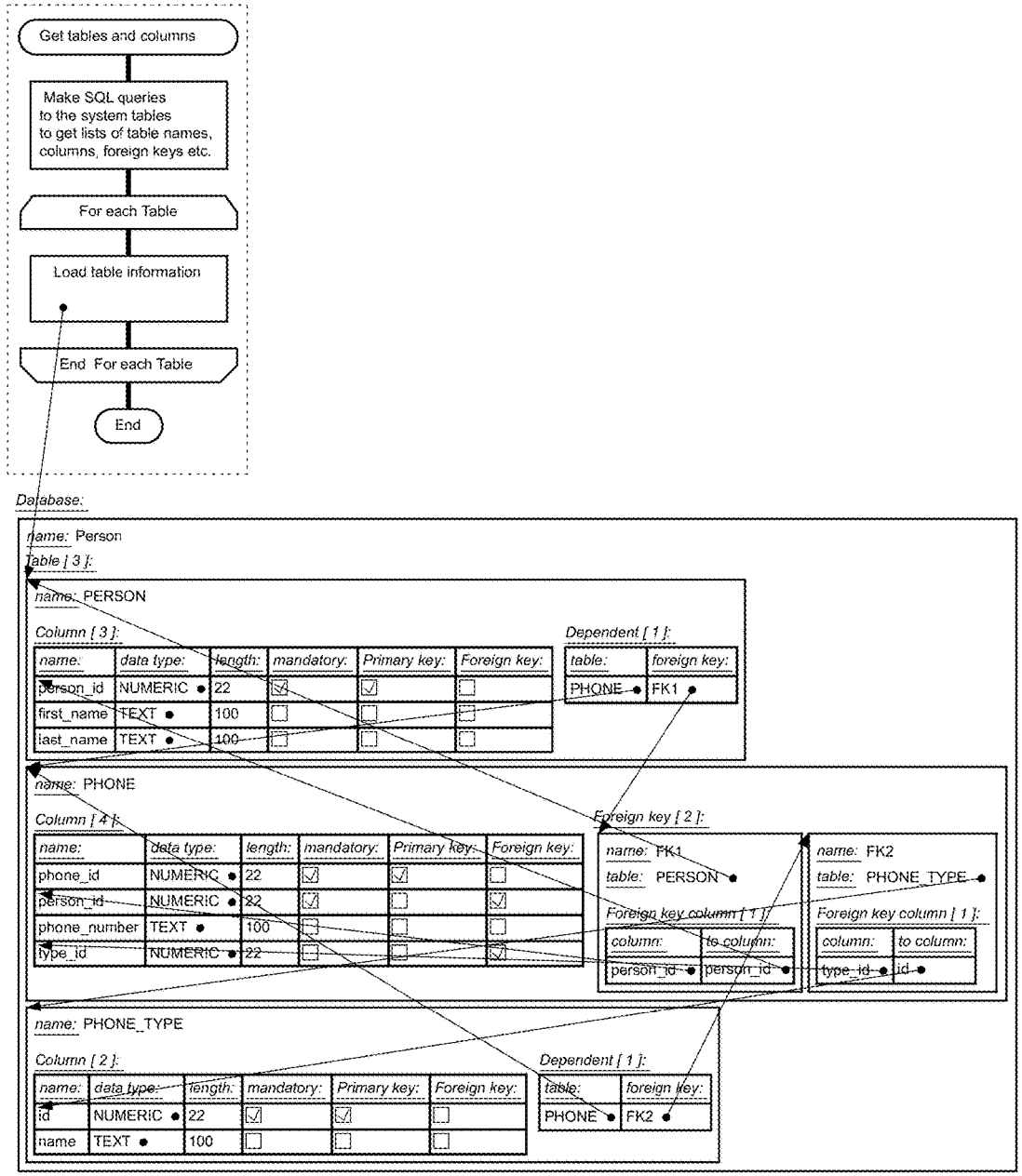
Figure 13:
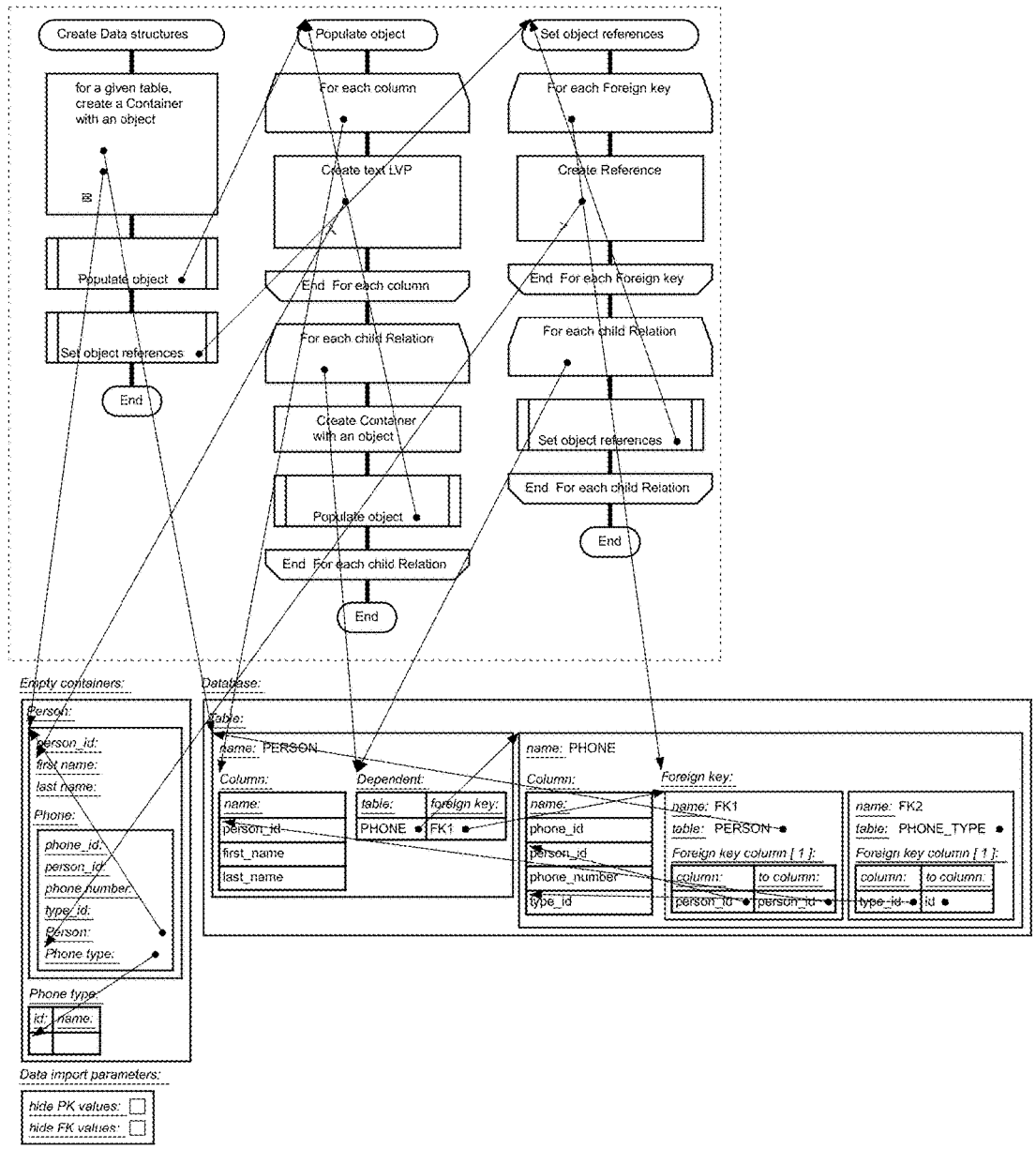
Figure 14:
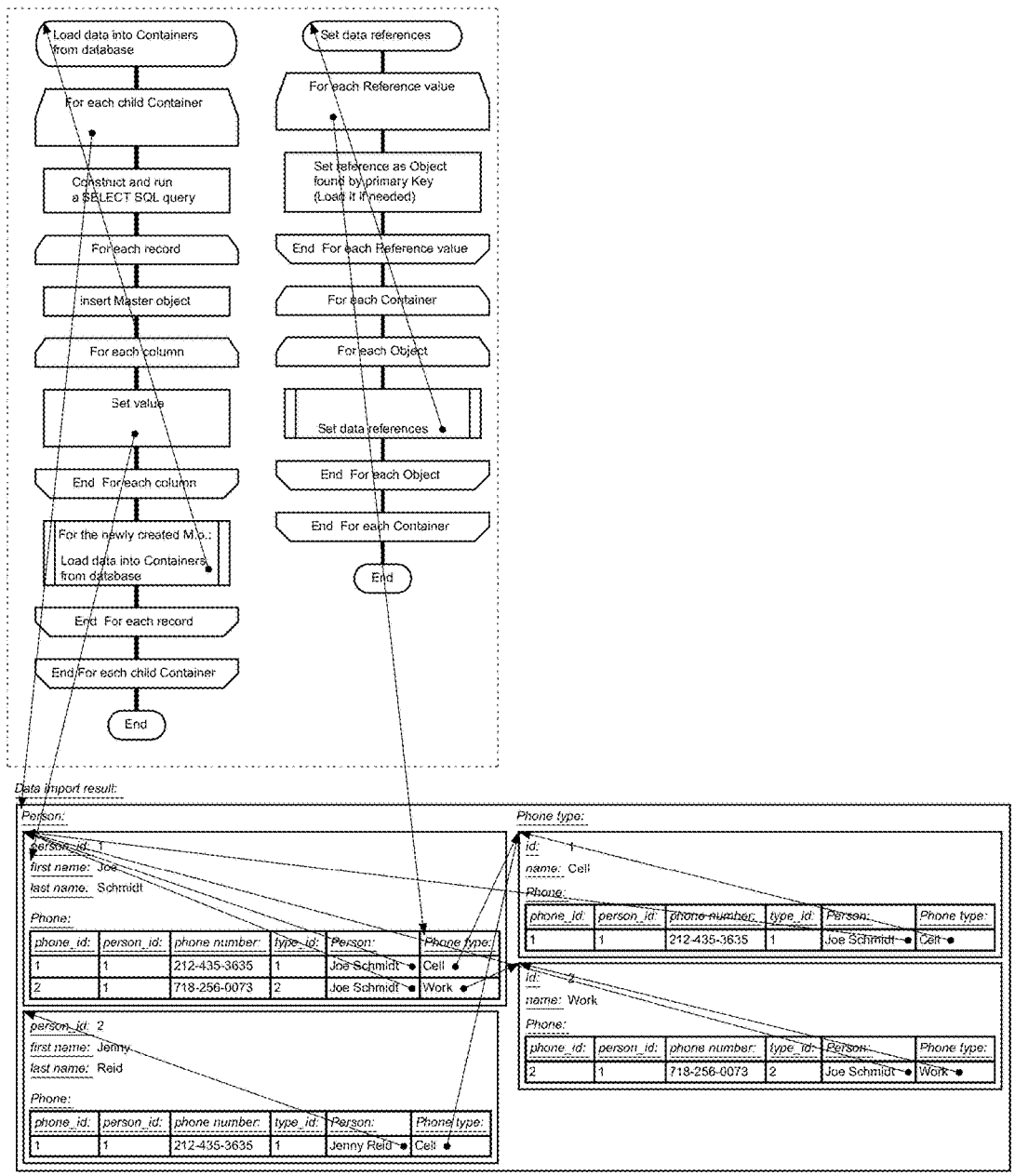

Alternatively, one may use an existing relational or other type of database as the source for the listing to create and populate the objects in an Integrator representation, using the algorithm "Load data from Relational database." This process is illustrated in FIGS. 11 through 14. One starts by entering permission to query the database and its location, as shown in FIG. 11. Typically, a computer database provides a method to obtain its metadata, such as SQL. Such a listing of metadata will include the list of tables as well as data names for the columns and types ("Number", "Varchar2", etc.). Various elements of the database, such as trees or tables, have names as well. The database catalog describes the structure of the database completely, and the syntax of the catalog is well known, so this catalog functions as a structured list of the same type as described above. The parameters to interpret the database catalog for a particular brand of database can be stored. FIG. 12 shows how the algorithm "Get tables and columns" stores the database catalog in Integrator format. As shown in FIG. 13, the algorithm "Create Data structures" utilizes these data on the tables, child tables, and columns in a similar fashion to the structured text conversion above to generate an Integrator structure of iObjects. Once the structure is complete, the algorithm "Load data from databases into Containers" makes another query to obtain the actual data and uses it to populate the Value Objects, as shown in FIG. 14. Note that a new master object is generated for every row, populated with the appropriate label-value pairs using the Master Label Object as a template, and then Value Objects for that item are populated. Finally, as also shown in FIG. 14, the second algorithm "Set data references" traces references from Foreign Keys and Child Tables in the object database and instantiates them.

Figure 36:
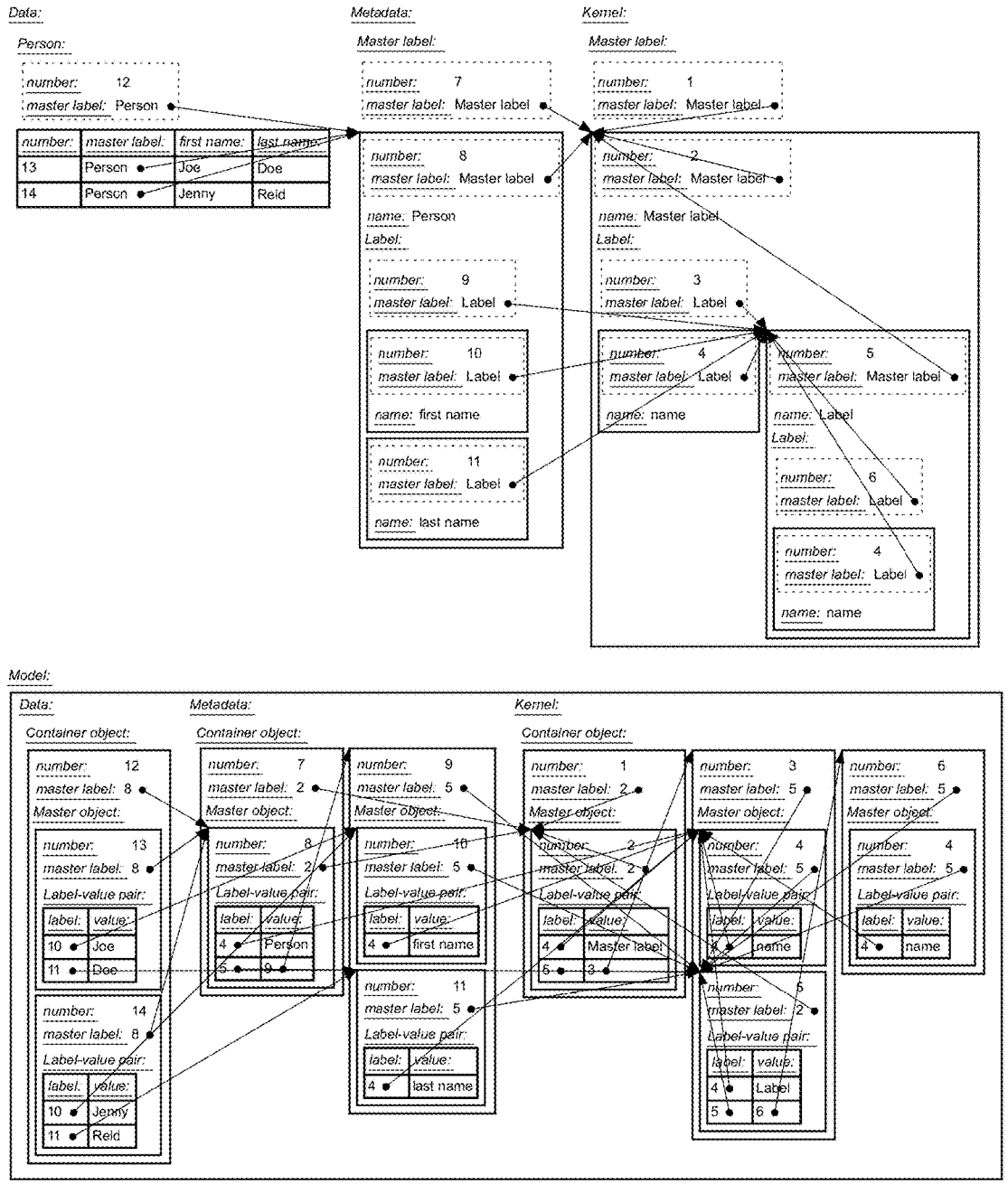
FIG. 36 is a screen shot depiction of a single table of sibling master objects in grid form, where the label-value pairs are shown with the data referenced by the label object as a column heading and the data in value objects displayed in the bins within a container object.
Figure 37:
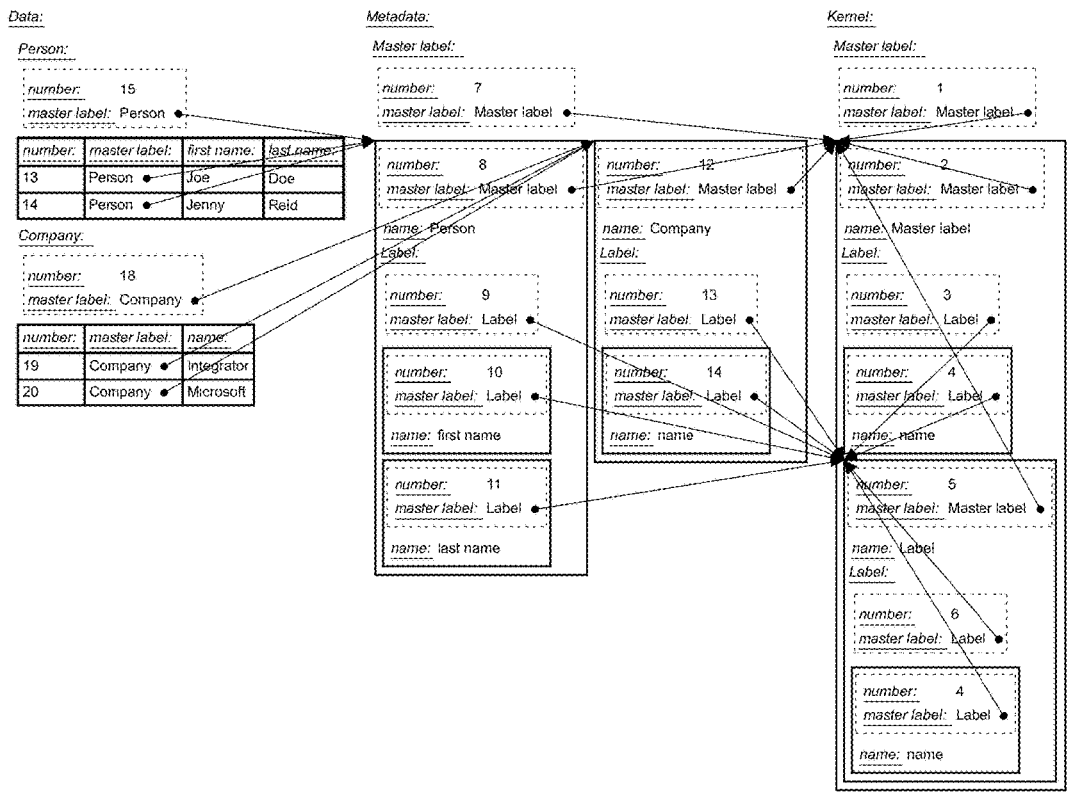
FIG. 37 is a screen shot depiction of a container object which holds two tables of two sets of sibling master objects in grid format.
Figure 37:
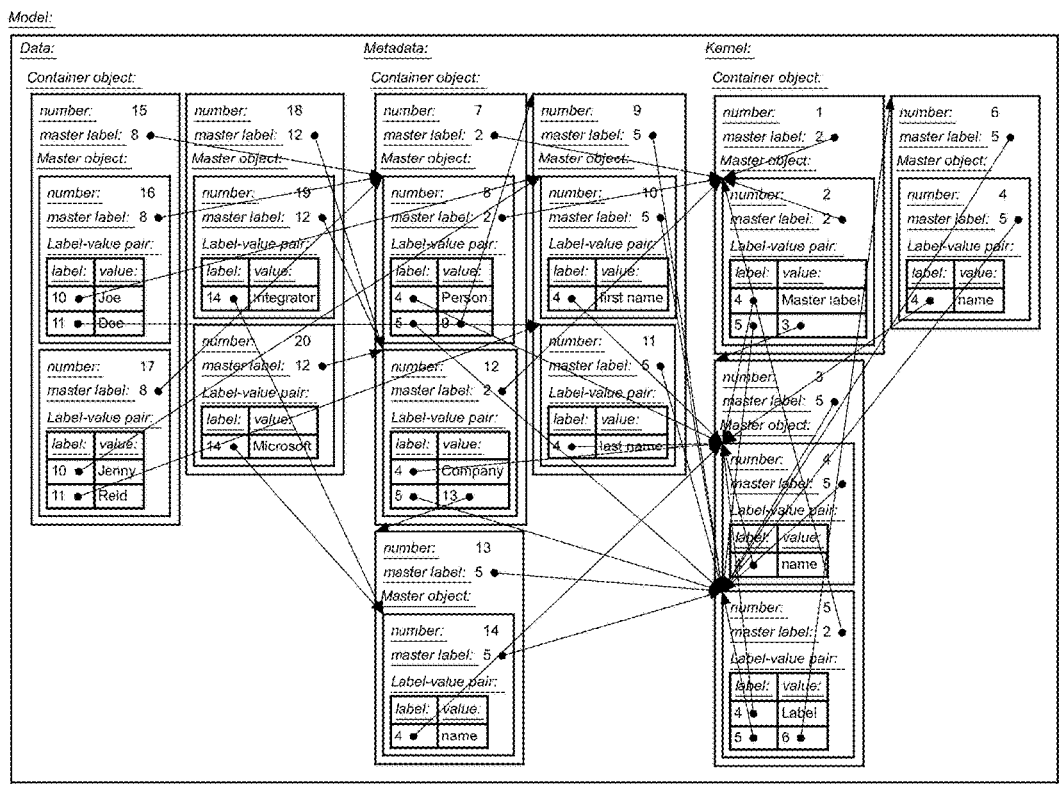

For example, one can instantiate a table as a master label object, while the master objects represent lines in a table, each with their unique identifier. This is illustrated in FIGS. 36 and 37. The data of individual value objects appear in bins and their value label objects provide column names and references to standardized metadata attributes, such as data type (string, text, date, etc.). A typical relational database will also contain foreign keys, which are instantiated in Integrator as value objects with the appropriate references as their content. Child tables in the relational database are instantiated as value objects which reference child container objects, each with the master objects containing the child data. This method of relating the data to the parent object is quite different from the foreign key method. For example, when a item is deleted in a conventional database, all its foreign keys must be located and the child table data deleted as well; with the Integrator method, all data associated with an item as a master object is held unambiguously in child container objects which will be deleted as well.

In summary, an existing database catalog can be parsed for its metadata and data to guide the automatic instantiation of the label I-objects. Once the structure of the database has been duplicated as a series of label I-objects in an Integrator application, the algorithm executes another query to the existing database and instantiates master objects (using the label I-objects as templates) populated with the data. Interaction-specific data to govern reading and writing new values to the existing database, access permissions or such other functions as would be useful are stored as I-objects. The instantiation algorithm uses access permission to obtain the data catalog by a query, instantiates an Integrator version of the same database and populates its data. The Integrator version of the existing database may continue to use the original database to store and retrieve data, which it then has available for whatever implementations are required. In this case the Integrator database is acting as middleware, but with a standardized format that can be joined across multiple databases.

Other Container Objects and their Implementations

Other interaction-specific data may be required to represent the collection of items usefully or to facilitate various functionalities. For example, types may be descriptors of data. Type objects contain data relevant to retrieval, storage or display, as well as providing useful information. For example, both "phone numbers" and "addresses" may be of types "personal" or "business"; a display may use the type associated with phones and addresses to display the relevant values. Each type is instantiated as an I-object. Thus there is a container object with its container label object which holds the datum "Phone Type," a series of master objects for each of the types, each with its own value objects such as "Mobile" "Business" or "Fax," as well as the master label object with the name "Phone Type" as its label and with value label objects for the value objects that contain semantic data about the type. Type values may provide semantic interpretation of the value objects with which they are associated, as well as providing the means for proper display in the pragmatic solution sought, such as whether one calls a person at their office or home. Although such type designations appear trivial and well known, having them available as I-objects associated with the data enables functionality not readily available without programming in conventional databases. For example, one can use types and working hours to display the immediate emergency number to reach a person, without any further interpretation required. This dynamic display is implemented by software scripts stored within a value object of the interaction-specific data available for every label value object.

Another issue that concerns database developers is how data entries are joined in a display. Another example of a feature which requires sophisticated coding is database SQL query with joins. Many professional developers would consider inner and outer joins a tricky subject on the interview. For example, to query data from one table, the SQL is:
  select * from People
To query data from two tables, the SQL is:
  select * from People inner join Phone on People.id=Phone.personid
The type of joins determines whether or not non-matching records will be included in the results:
  All people with phones—inner join
  All people, with or without phone—left join
  All phones, belonging to people or not—right join
  All people and phones—full join
Joins are implemented in Integrator as child Containers and References. Joins are available in the display, which is shown as the result of two searches; people and their phones on the left, and phones and their people on the right. Thus even though phones are contained as child data within the parent people, the opposite search yields a result.

Any database requires an interface and internal management to function. These functions involve data, which may be stored in various places. In Integrator, interaction-specific data are instantiated as I-objects stored on the label objects and referenced by the master objects and value objects. FIG. 9 displays an example of "Global Properties," the interaction-specific data available on every label object. Examples include display properties with hardware-specific parameters, authorization, change tracking, internationalization and, at the bottom, data for mapping to a conventional database for storage. Note that display properties in this example are for two types of display, PC and Ipad. The data shown is typical default data and can be changed at the local level on any label object.

When a value object is first instantiated, its value may not be null but a reference to a default value in a container of default values stored as terminal values; this is particularly useful for interaction-specific data. Changing a default value changes values in the application that reference it, but has no effect on references to non-default values. Alternatively, one can instantiate the reference from a new value object to the same value object in a higher level of the hierarchy, which in turn would reference up until the default value is referenced from the highest level. In that case, replacing the reference with a terminal value in interaction-specific data in a master label object would change the values for its master objects and any child master objects that reference it. In this way we have a top-down hierarchy of interaction-specific data parameters. Values cascade down a chain of references which were instantiated upwards. When another value is inserted instead of the reference, it becomes a terminal value at that location and is also the target of references lower in the hierarchy. Moreover, changes to Properties can be user- and view-specific. The underlying database, which is shown in most of these figures in Developer View, is not changed, but a saved view can be tweaked to the users specifications, and the Properties associated with this view are saved as well. The example database "John and Jenny" is shown in Runtime View in FIGS. 3 and 27. There is further discussion of view below.

Storing and Implementing Software in the Integrator Data Structure

Computer software is conventionally stored as a list of code statements in a file, and the name of the file is used to call the software, also known as source code. The format of the file and the statements are sent to an interpreter program, which renders them in to a machine-compatible language. In Integrator, components of the software file are stored as data in I-objects. The code-retrieval algorithm obtains that data and synthesizes a conventional software file for execution.

Conventional flow chart editors are used to depict the flow of a program for planning purposes, but they typically include either a natural language statement or, for those flowcharts generated by parsers, a line of code in software language. In the early days of programming, when the programmer wrote machine language, a flow chart was essential to interpret each line. Modern high-level languages can be read and written by a human and a flow chart has become redundant for normal computer programming. However, the Drakon flowchart language has been developed for use in testing and reviewing code, since it is much easier for a human to read than endless files of software. In Integrator the software statements stored as data can be displayed as Drakon flowcharts in the GUI; the individual graphic operators are called "boxes."

Figure 16:
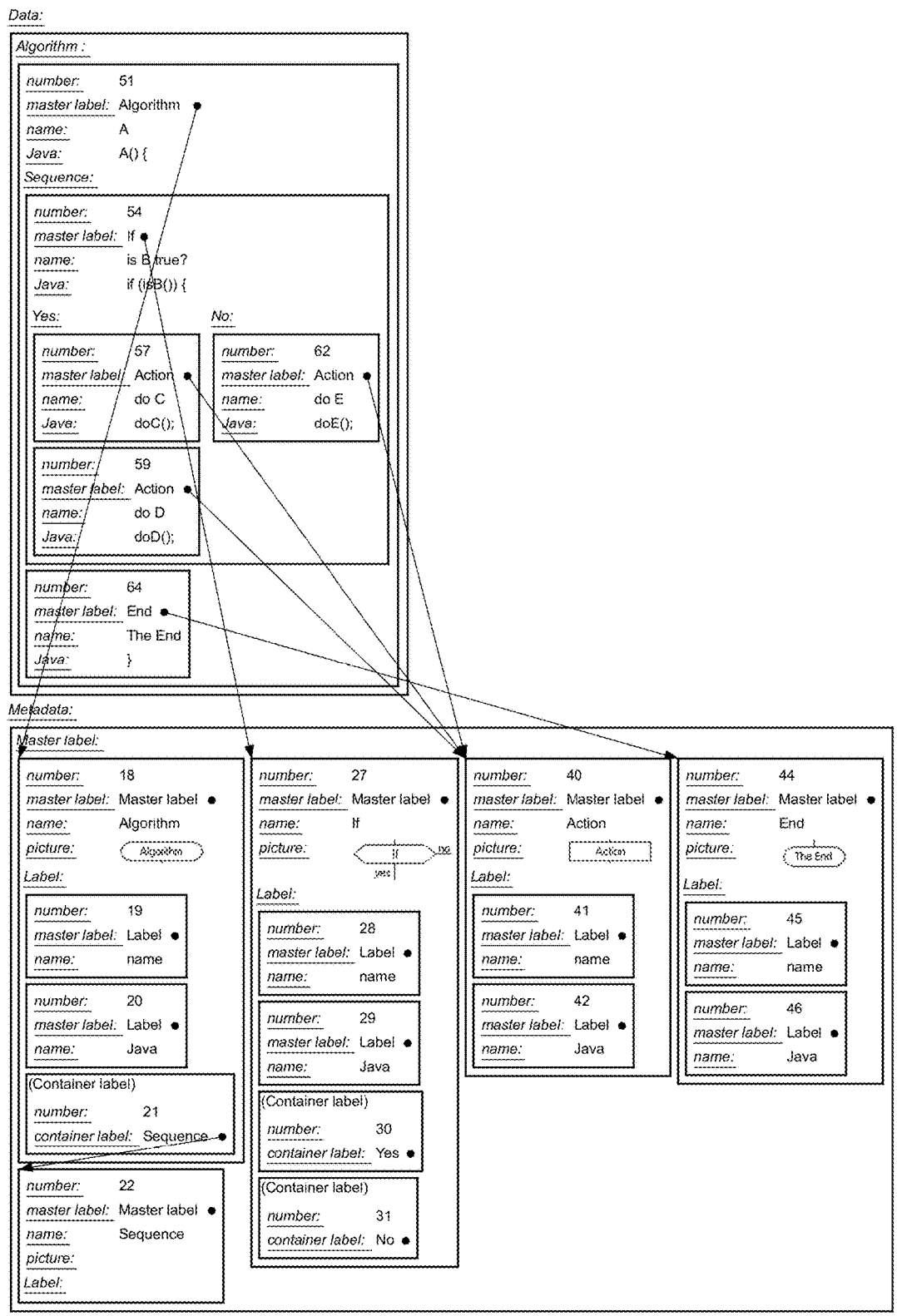
FIG. 16 is a structured diagram of how the algorithm shown in FIG. 15 is stored as data in Integrator format.
Figure 17:
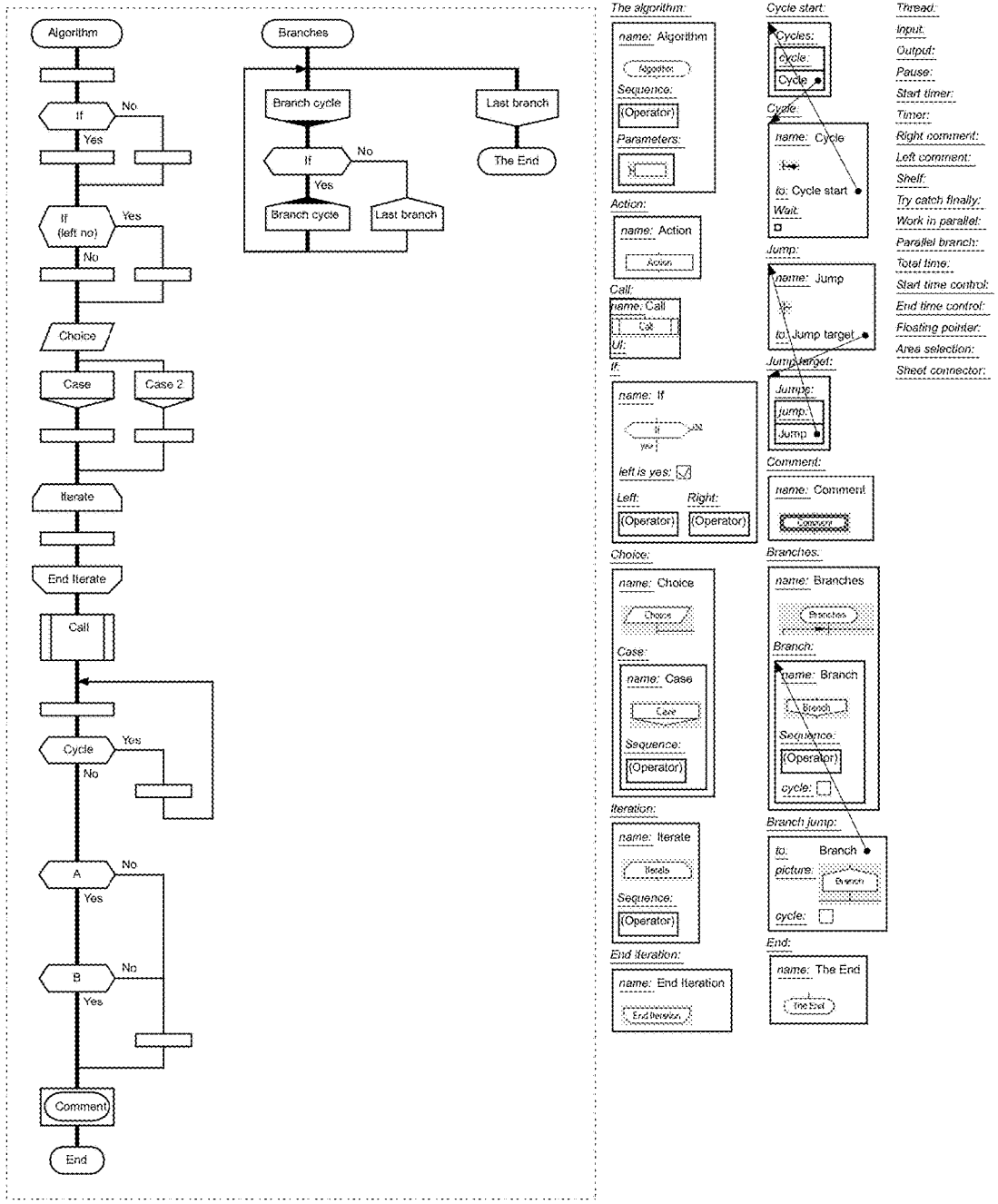
FIG. 17 is an illustration of algorithm operators as Drakon outlines on the left and a set of Integrator objects on the right, which are then used as master label objects for the master objects which store the programming blocks.

In Integrator, each line of code in a software program can be stored as data in a value object in a Master Object. The sequence of master objects corresponding to lines of code can be stored in a child container object "Algorithm," as shown in FIG. 16. Other value objects stored in the same Master Object might include the line number, the line number of the previous line of code, the line number of the next line of code, a natural language translation of the line of code, the same line of code written in other languages and any variable or intermediate values of the data the software is processing. Moreover, if the stored software is depicted in a flowchart, the master label object for each Master Object includes information about the flow chart box to be used. FIG. 17 depicts the logical operators commonly encountered in java software as boxes in Drakon flowchart format and as portions of the master label objects used as templates in the graphic display of a software program stored as data.

If pre-existing software is parsed before storage as data in the application, branch points and other logics are attached to each line of code by the parser. Then the flowchart information is already available. Such parsers are commonly available and the rendering of a software program in a graphical flowchart is known. However, such flow charts are only static depictions. Here the Integrator algorithm Code Reverse uses the output of the parser to transform the lines of code into data stored in I-objects, shown in FIG. 16. The software algorithm can be displayed as a Drakon flowchart, shown in FIG. 15. The version stored as data remains a fully-functional version of the software.

Variables defined in the reversed software which use metadata of label objects in the Integrator database are replaced by a reference to the UID of the terminal value of the label object. During Code Reverse, any variables which are not resolved as label objects are presented to the user for input on their interpretation, which can be as simple as pointing to the label object the parser cannot identify.

Figure 18:
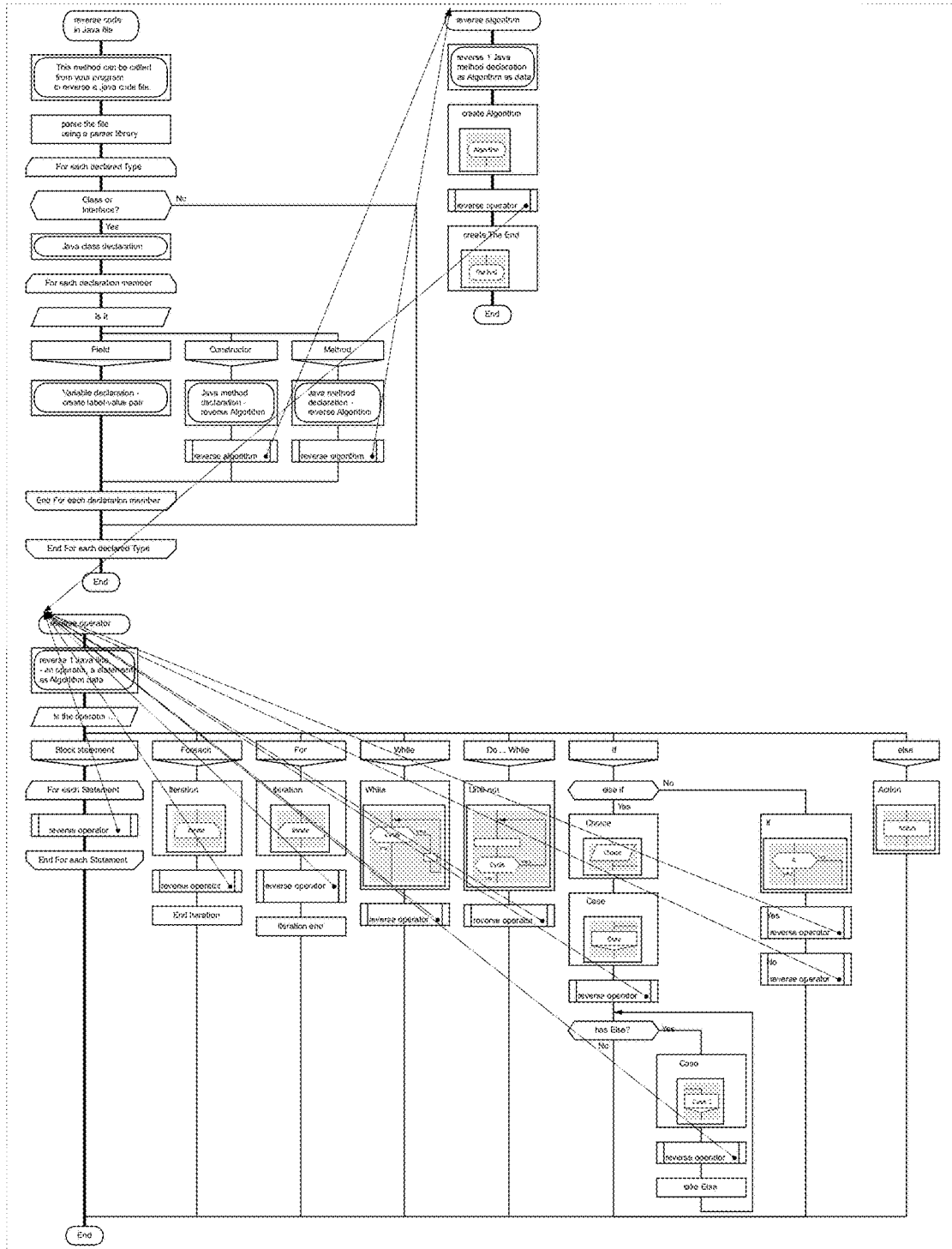
FIG. 18 displays the "Reverse code in Java file" algorithm in Drakon flowchart format with English statements of actions in the outlines. The algorithm takes a Java code file as input, parses it and stores it in Integrator format, using the operator master label objects as templates.

Any intermediate or local variables such as counters or current values of variables are instantiated as label-value pairs in the master object where they are generated, such as an "Iteration" in Java. Such objects would be instantiated as separate master objects with their master label objects and with the current values of such variables stored in label-value pairs. The Code Reverse Integrator algorithm is shown in FIG. 18.

Figure 15:
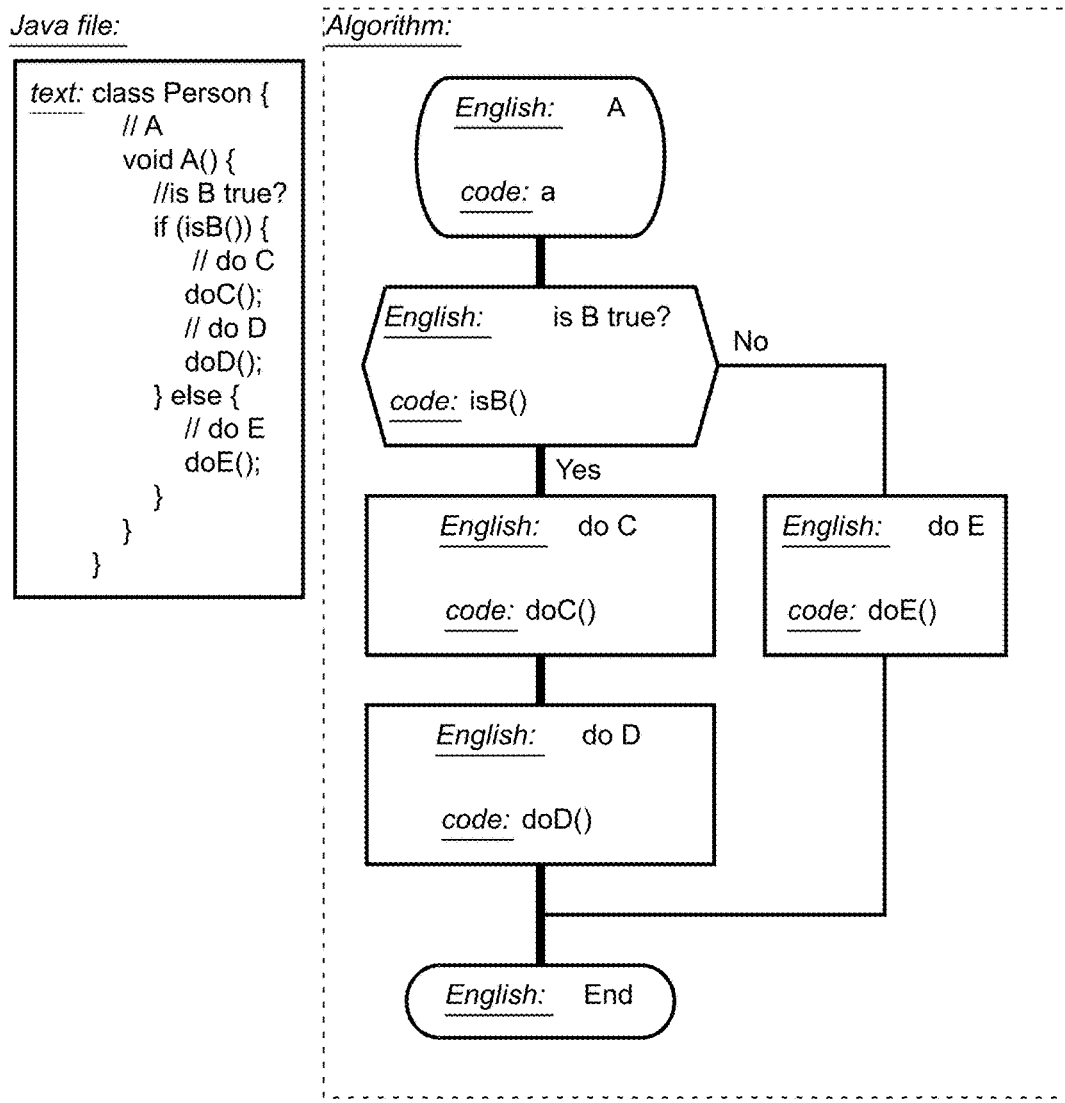
FIG. 15 is a structured diagram of how the "Reverse code in Java file" algorithm parses a Java file of software statements and displays it as a set of linked operators in a Drakon flowchart.

When software is reversed into Integrator format by parsing, the lines of software are stored as data in value objects, within master objects, along with the additional attributes also saved as value objects within the same master object. The reversed software remains fully functional and one may consider this "running a flowchart." FIG. 15 shows a synthetic algorithm written first in Java and then parsed and displayed in a Drakon flowchart. FIG. 16 shows how the same algorithm is stored in the Integrator format in a series of container and master objects. Note that the "If" statement is instantiated as a child container object with three master objects which correspond to the If choice with the Yes and No alternative branches and the algorithm flow continues within that container object until the two branches rejoin. The master label object for each master object representing a line of code is chosen to represent the operation of that line of code, such as "If statement," Action statement," "Iteration," "Call," etc. The available choices for Java as boxes and master label objects are depicted in FIG. 17. Depending on the language to be reversed, different master label objects will be instantiated and available to the code reverse algorithm.

Figure 23:
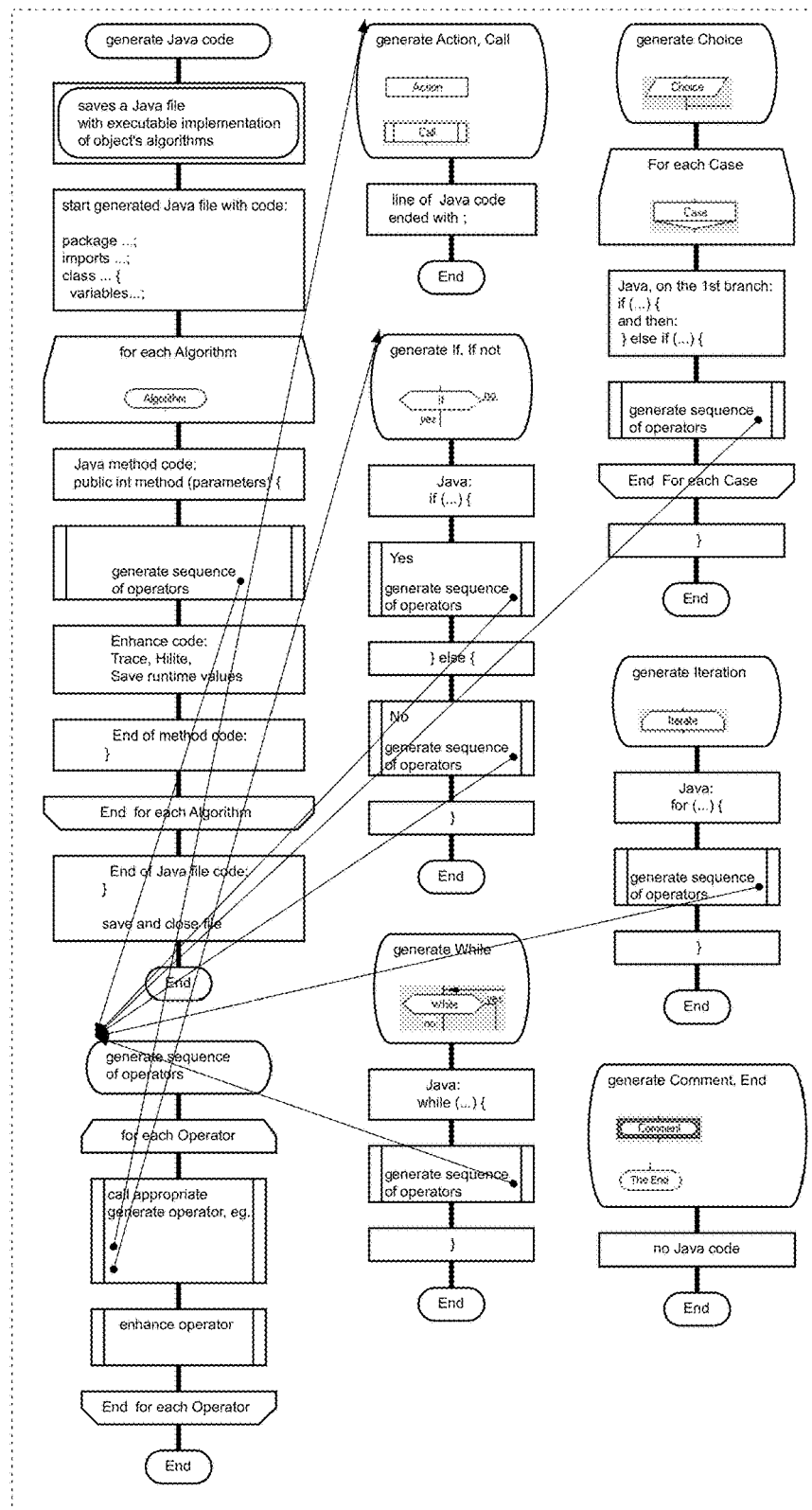
FIG. 23 is a structured diagram of the code-retrieval algorithm which generates an executable file from code stored as data in iObjects. Note the call for the algorithm "enhance operator" to enhance the code, in the bottom left, shown in detail in FIG. 24.

A software algorithm stored as data can be executed by the Integrator "code retrieval" algorithms. This algorithm traverses the application and locates a stored algorithm in its container object by name, following the references from the terminal value of the name. It then traverses the master objects containing code, retrieves the code and assembles an executable file according to the order of line numbers. As this algorithm traverses the stored data, any variable names are retrieved using the UID of their terminal values of the label object values and substituted into the code. Therefore the reconstituted software uses the current variable names, no matter how the database has been altered. FIG. 23 depicts how the "code retrieval" algorithm generates an executable file in Java. Although these steps of code assembly into a file, enhancement and execution are shown for the Java language, this is merely for convenience and the principles are the same for any software language.

To execute an algorithm written in Java and stored as data, a Java code file is generated. It is a standard Java file with declarations of packages, imports, class header and variables. Each algorithm is represented as a Java method. For each operator in the sequence, the appropriate generation method is called. An action or a Call operator will be simply a line of Java code ending with a semicolon. Ifs and choices will be generated as "if" statements. Cycles will be generated as "while" and "do while" and iterations as "for" statements. The opening and closing java code is stored on the first box, whose value is the name of the algorithm and the last box "The End" respectively.

Once the Java file is assembled, it is run in a conventional fashion. When an algorithm calls another algorithm, this call is passed to the code retrieval algorithm which finds the called algorithm by name and retrieves and runs it in the same fashion. This functionality of retrieving and running algorithms stored as data operates as a part of the Integrator application; there are no permanent files of software stored in conventional files except some system software. The entire process runs in the background once it is initiated. For example, when the "Create label-value pair" algorithm illustrated in FIG. 8 is run, the initial portion requiring input is invoked by the gesture, and the completion portion which performs the object instantiations shown is invoked by striking "Return" when the input is completed.

In conventional programming, a software variable is defined as a class using the metadata as a name. This metadata is used to retrieve the data used as input by the software from the database and also to locate where the output value computed should be placed. In Integrator, a variable in the software is not defined as a class, but is simply a reference to a label object in the database. In the Integrator data paradigm, data can be located by its label value by the algorithms that traverse the application, so the label functions just like a conventional variable defined as a class. While writing code, the programmer points to any instance of a displayed label and the code instantiation algorithm uses the reference in that label object to locate the UID of the terminal value of the metadata and substitutes this UID into the code. When existing code is parsed and stored as data in I-Objects by the algorithm, variable names are compared to available label names and if they match, are replaced by references to the Terminal Value of that label name.

Figure 19:
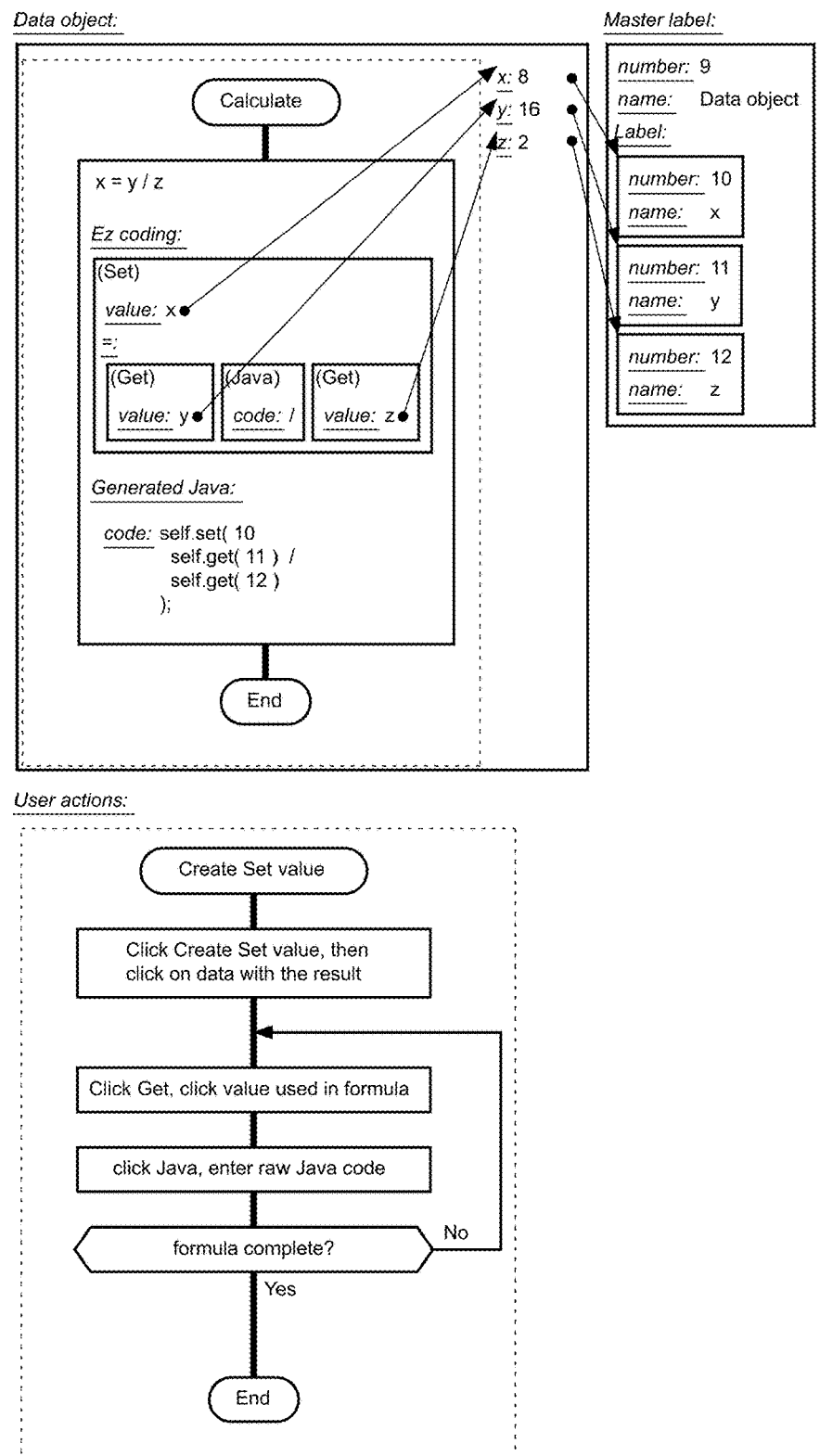
FIG. 19 is a structured diagram of using data objects as variable names in algorithms and implementing software operators by selecting from a menu with automated code generation from the resulting Drakon diagram.
Figure 20:
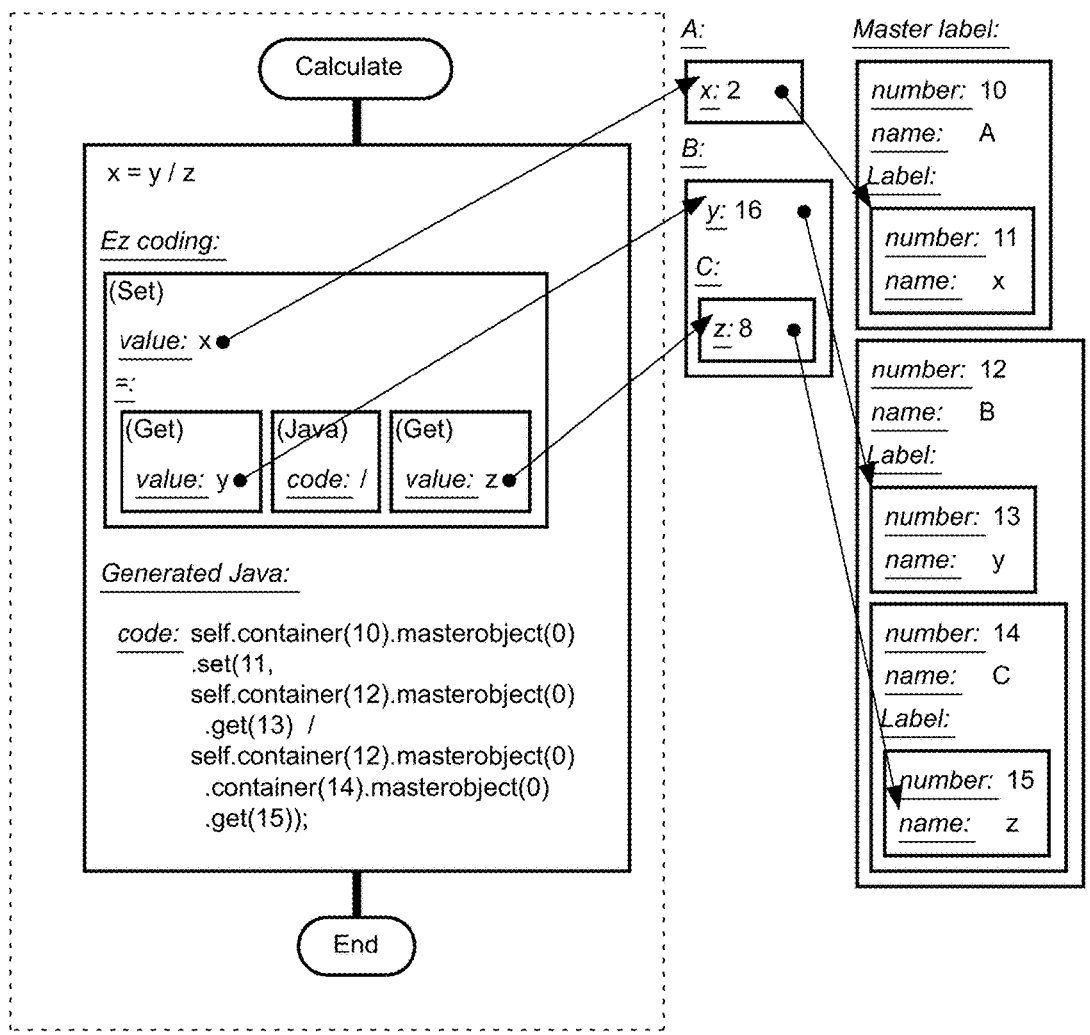
FIG. 20 is a structured diagram of an example of using label objects as variable names in the same algorithm "Calculate," where the data objects are located by the traversal algorithm in container objects. The variables are defined by pointing to the labels of the data objects on the upper right.
Figure 21:
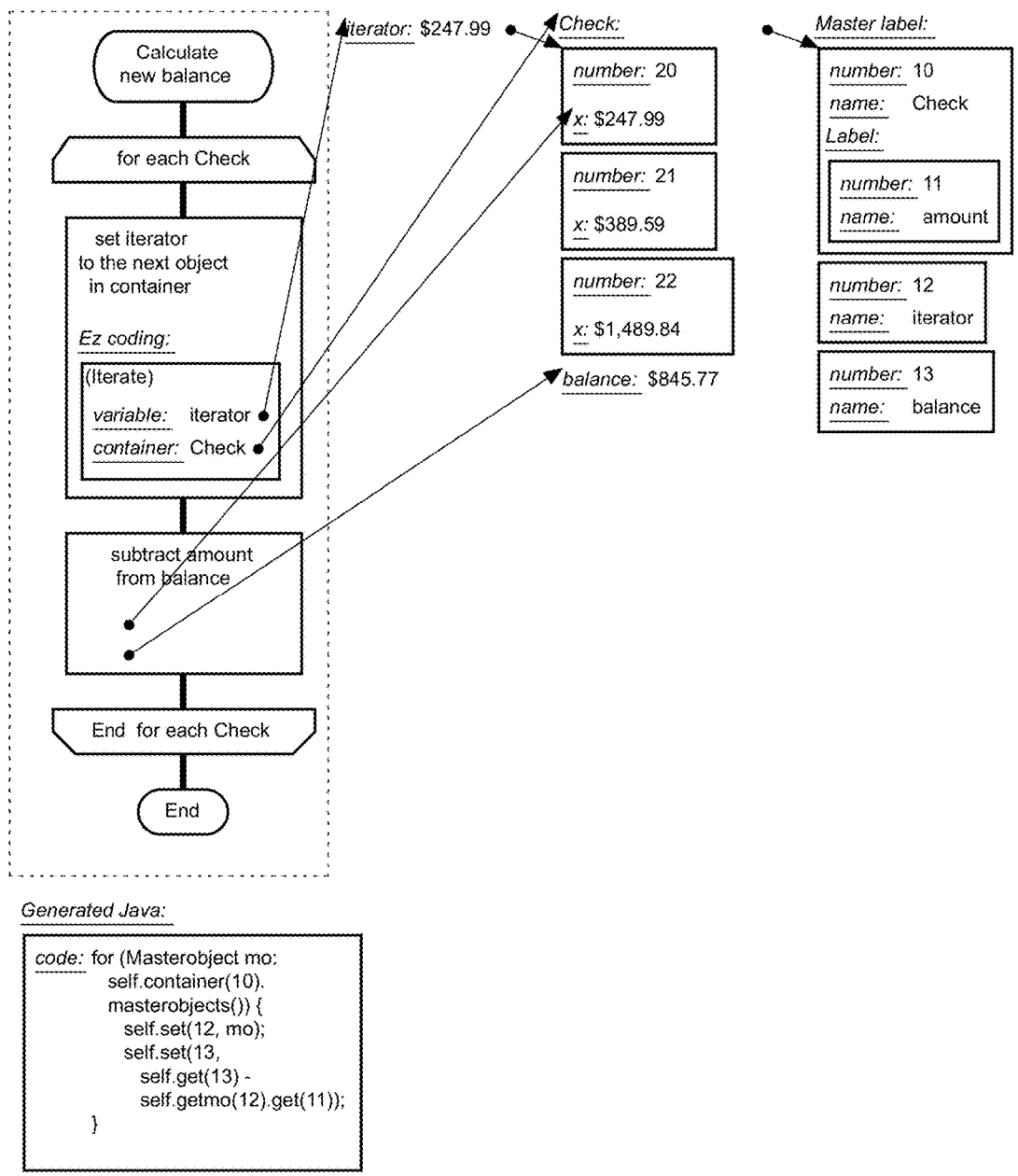
FIG. 21 is a structured diagram of EZ code where the values are returned one after another by iterating over a series of objects in container object "Check" to compute a "Balance" in its master object.

Universal variables are those whose values are retrieved through the metadata that describes them. If a column in a table has a name, that name may be used by the software as a variable to retrieve the values in cells for this calculation. Moreover, the resulting output may then be stored in further cells in the same or another table, and the column where they are stored will also have a name. Typically the name is declared as a variable within the software. When the metadata of the database is changed, the associated software will no longer function. Here, since the software and the data are stored in the same application in the same format, a variable name can be a reference to a name used in the label of a label-value pair. To define a variable as referring to a value, the programmer points to any label for that value. The system software will then follow the references of that label until it obtains the Terminal Value to be displayed in that label, note the UID of the value object containing this Terminal Value, and then insert that UID as a reference for the variable name in the code. At runtime, the code-output algorithm will retrieve the Terminal Value and substitute it for the reference to the UID, so that the software will always have the appropriate variable names, since the same terminal value is being used in labels for the data sought. The use of a pointer to establish a variable name in an algorithm is depicted in FIGS. 19 to 21.

Creating Algorithms Using Integrator and Object References

One can generate new software by using the Integrator Drakon editor to generate a Drakon flow chart depiction, populate the boxes with natural language statements about the steps to be taken and store the depiction. The various operators used in Drakon software flow charts are available through a drop-down or on-screen menu; the various operators required are shown in FIG. 17. The editor software generates the lines linking the Drakon boxes. The boxes default to the natural language value object when first installed. The algorithm in natural language can be checked for completeness, and then used as a guide for writing the code, or EZ code operators can be invoked from another menu, see below.

One can write lines of code manually into the code value objects available on every master object in a stored algorithm and use the code output algorithm to compile and run the flowchart as software. The code-retrieval algorithm traverses the flowchart, retrieves the code and synthesizes a software file; this file is then compiled and run. Even when writing code manually, one can define the variables by pointing to Integrator data objects; the algorithms "Get value" or "Set value" will accept pointing as input to retrieve and substitute the UID of the terminal value for the label. When the code writing is completed, one runs the algorithm stored as data with a menu item button "Run". As the code is retrieved by the code-retrieval algorithm, it is enhanced to assist in debugging, as described below.

Storing the code as data enables a novel functionality during software development, which is that as the code retrieval algorithm assembles the executable file, it can enhance the code by appending additional code to each line. One enhancement function is to append code which reports back to the Integrator application when a line of code is being executed so that the flowchart box is highlighted. Another enhancement function stores any intermediate or runtime data values which the software has generated up to that point. Such data values might include the current value of references to the data being used as input, the values of any counters created and incremented by the software, and any data values which have been computed for later output, either completed values or values for which further computation is required. The variables associated with software come in at least three types: universal variables which refer to database objects that are persisted, such as "Date of Birth"; intermediate variables such as flags set to show an object has been processed, and runtime variables such as iteration counters which are generated as data objects during execution and then eliminated afterwards. As the code-output algorithm processes the code statements, it also discovers which objects are being accessed, i.e. universal variables and intermediate variables, while runtime variables are discovered when the code creates them.

Figure 24:
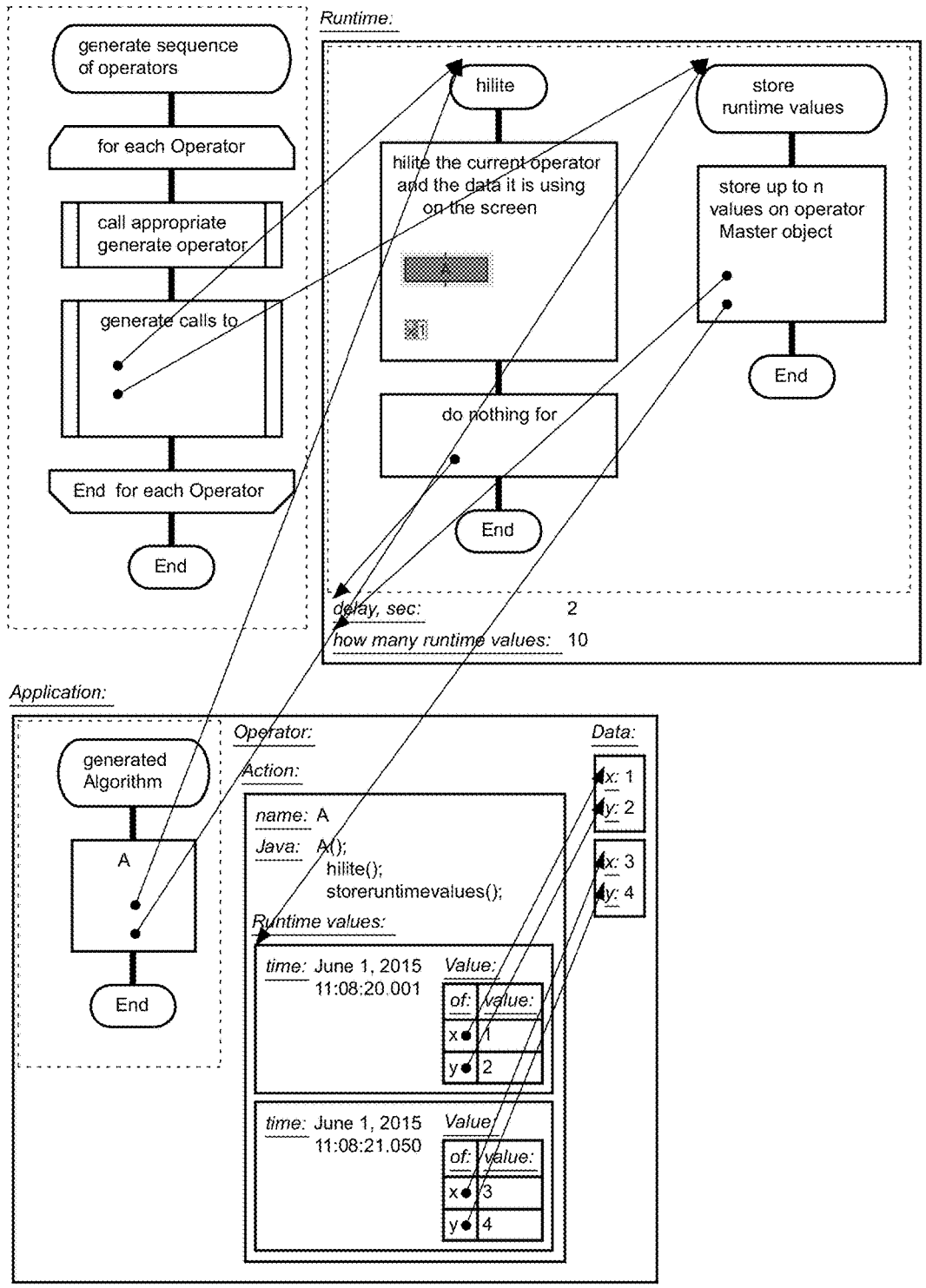
FIG. 24 is a structured diagram of the algorithm "enhance operator" in the context of the previous diagram, where this algorithm is called within the subroutine "generate sequence of operators." The "enhance operator" generates the appended code which enables "hilite" in Runtime and also "store runtime values." Other enhancements can be added as algorithms in this spot.

FIG. 24 displays the "enhance operator" algorithm called by "generate sequence of operators" shown in FIG. 23. The "enhance operator" algorithm has two routines, which enhance the code being assembled. The algorithm "hilite" makes the software highlight the current operator for X seconds, where the value of the label-value pair "delay: x seconds" is one parameter of the "Properties" of the algorithm, stored on the master label object for the algorithm object. This feature would only run in the developer view of the Drakon depiction; it will not run during operation of the database when algorithms are called in the background.

The second routine "store runtime values" instantiates a child container "Runtime values" in every master object of the algorithm stored as data, which contains a master object with null values. When any variable of the three types is operated on by the code of that master object, "store runtime values" instantiates label-value pairs for each variable, with a reference to the variable UID in the label and the current value of the variable stored in the value object. Each instance of a run of the code is stored automatically, labeled with a name, such as a time stamp. Such intermediate data can be displayed beside the Drakon representation for ease of interpretation. Previous instances of a running of the software may be retrieved for comparison of the intermediate values generated. Debugging and testing code is enhanced by access to a series of values generated as different versions of the code are run. Although some debugging tools will display intermediate values of variables during a run, none have the capability to store and recall previous values. Object generation for permanent storage of values in real time as values are generated is not known for intermediate and runtime variables.

EZ Coding Use of Drakon Editor and Gestures.

Integrator enables another functionality to generate code in a graphical setting, called EZ coding. In this approach, one uses the EZ coding container object within every Drakon box to generate the expression required. The components of the expression are inserted from the EZ coding menu; each component will have different inputs. This is analogous to calling a function in a spreadsheet program; the function is called by name or from a menu, and then its inputs are specified, usually by specifying a cell or a range of cells. There are differences in the approach described here. First, variables are defined by their labels, including the dependent variable whose value is being computed; in a spreadsheet program the function delivers the value to the cell where it is located on the worksheet or an area defined by its location. Second, when an algorithm is generated using EZ coding, the result is a software language file which can be run like any software. The inputs used to generate the EZ coding are translated with the functions into the software language by the code stored with the master label objects of the EZ coding components and a code-generation algorithm. Thus larger programming constructs than mathematical expressions can be developed using EZ coding. For example, an EZ coding component "event handler" can be used to program the response to any user input, for constructing a game for example.

Graphical programming does not appear related to database paradigms, but the full functionality of the I-objects and the GUI together create a graphical programming environment. Many attempts have been made, such as Visual Basic. Some instrument interface programs like LabView provide a user interface for creating data flow charts, which the software then turns into code in a similar fashion to what is presented here. The following discussion of EZ coding is provided to illustrate the novel features of the Integrator code generation aspect, not the overall concept of coding in a graphical environment.

In Integrator code generation, variables are defined by pointing at the labels of data; the code instantiation algorithm uses the reference in that label object to locate the UID of the terminal value of the metadata and substitutes this UID into the code. In ordinary programming of relational databases, one needs to know the metadata itself and what it represents and it is never shown in association with real data; metadata is only revealed by queries. A graphical interface with a conventional relational database may show label-value pairs, but what is displayed in the label is generated by the UI interface layer and may not be the actual metadata. In a spreadsheet one can see the metadata which is either a column or row header, but when the data has been defined as a "Name" it is not revealed unless one is in the named cell or looks through the list of names and their cell references. Through the Integrator paradigm that each label contains a reference to data which is displayed in the label at runtime, one has access to the real metadata and therefore can use it as a variable just by pointing. One could use the UID for metadata in conventional relational database programming, and then write a program to substitute the current metadata name at runtime, but it is never done. By implementing references to metadata values in the code, the code associated with a database also becomes fully normalized.

Figure 22:
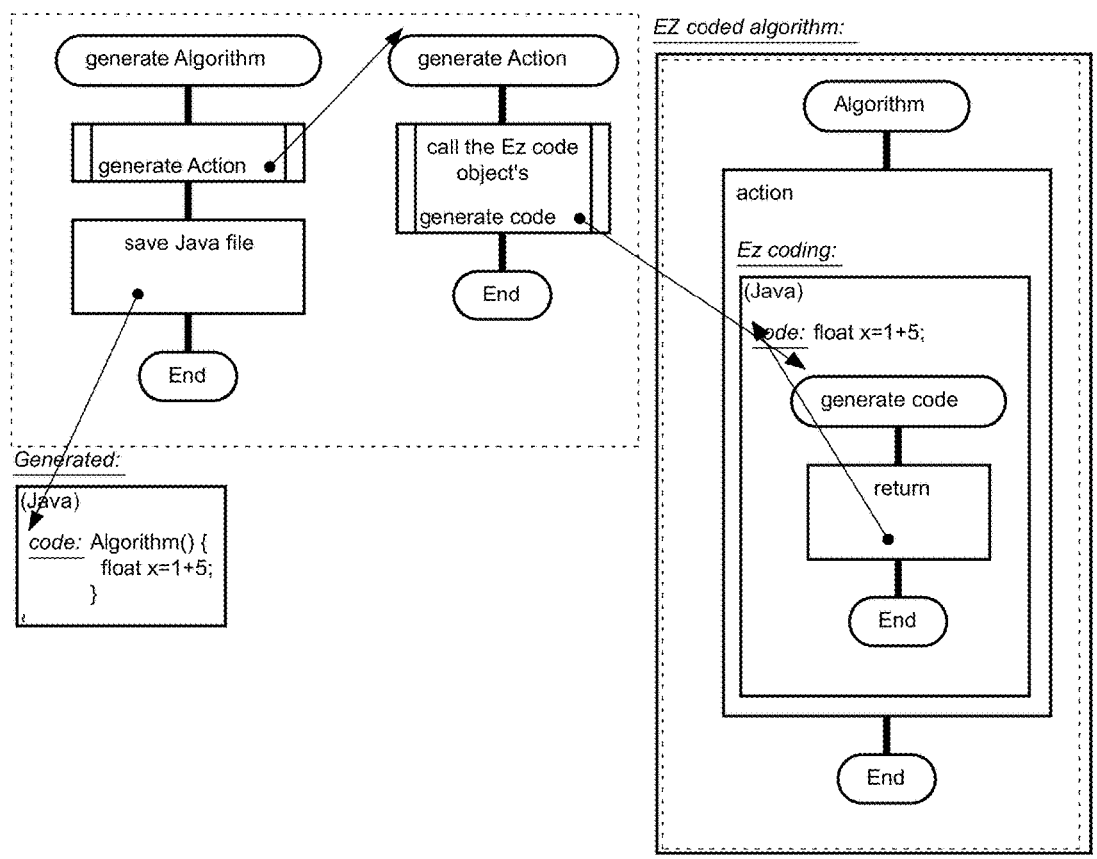
FIG. 22 is a structured diagram of the Drakon flowchart of "generate Algorithm" which turns an EZ coding flowchart to generate java code, using variables and operators entered and the snippets of code stored on the master label object for each Drakon operator.

To generate the code from the components of an EZ coding box, the system assembles code snippets from each of the components; the algorithm which accomplishes this step is shown in FIG. 22. This algorithm first calls the subroutine "Generate action" which iterates over all EZ Code boxes and causes each to generate the snippet of code it represents. Each box's code generation is done by software stored on the object itself or its master label object. The "generate Algorithm" then assembles the snippets into a file and saves it in a value object on the stored algorithm. The initial lozenge box and the END box both provide the snippets to start and stop the routine.

FIGS. 19 to 21 depict the use of references (pointing) to create a durable variable, as well as using a table to insert code for the operator into the algorithm. FIGS. 22 and 23 show how another software algorithm can be called from within a working flowchart depiction of an algorithm, using the rectangular box with double end bars. FIGS. 19 to 22 demonstrate how the inputs of an EZ code generated flowchart are transformed into executable Java code using the code stored in the master label objects of the Drakon boxes.

Algorithms take data as input and use operators on this data in a logical sequence, essentially doing arithmetic; here "operators" refers to either mathematical or logical operators such as +, −, x, /, <. The operator in a programming language is written using a code symbol specific to that language. In a further embodiment, Integrator provides a list of operators represented by English or mathematical expressions beside the related code expressions in that programming language. In the boxes of the Drakon flowchart for EZ Coding, there is a value object for each natural language or mathematical expression accomplished by that step; this data is displayed at the top of a new box. There is also a child container "EZ coding" available on every box and one can place a master object to define the action in that container by highlighting the container object and choosing from a list provided on the Drakon editor menu. As an example, FIG. 19 illustrates the process and its result; at the bottom of the figure the instructions to the user are drawn as a Drakon flow chart. One begins by writing the expression "x=y/z" in the natural language value object. Then one chooses "Set Value" from the EZ coding menu and the master object (Set) is placed in the "EZ coding" container object, with one label-value pair "value: null." After highlighting the value object by clicking on it, one clicks on a separate label-value pair to set the value to a reference to the label value of that second label-value pair and it's Terminal Value is displayed in the value object, in this case "x". Since we wish to program the mathematical expression, one now points to the "=" on the menu and a new child container is instantiated. One populates this with master objects from the menu, in this case two of "Get value" as a way to retrieve the input values "y" and "z". These are also defined by clicking on their labels. The arithmetic operator is a master object "Java" inserted between them; the Java code object for the operator is chosen from a list of natural language and mathematical operators.

The code for conditional operators such as "if," "iterate" and "iteration end," or "while" is stored in their respective Drakon master label objects, and the variables on which they operate can also be provided by pointing to the labels of data in Integrator objects. In this fashion, one can not only depict an algorithm in Drakon, but one can also generate the software for each action in the language chosen using only natural language and pointing to tables of operators supplied. It is straightforward to substitute software language for mathematical or logical expressions such as "+" or "<" in natural language and this process may be automated as part of the code generation.

On completion of EZ coding, the algorithm "generate algorithm" is invoked, as shown in FIG. 22. The master label objects for the boxes used in EZ coding store the code to interpret the formula and its variables. This stored code generates a piece of java code, which is stored on the master object for later use by the code retrieval algorithm discussed above. This process is illustrated in FIG. 20 as follows: the label reference pointed at, such as "y," is shown in the EZ Coding box, but in the Java below we see "get" referring to the UID of the terminal value of that label. The operator box "Java" is populated with the appropriate symbol by choosing it from the menu, or an algorithm can look up the appropriate symbol from the English or mathematical expression used when this modality of EZ coding is implemented. Finally the code in master label object "Get" interprets the expression as a whole and transforms it into the Java shown. FIGS. 19 to 23 display the generated Java code for each EZ coding implementation illustrated.

To summarize the steps in generating new software, one begins by creating a new instance of software as a gesture. This gesture instantiates a new container object and the opening outline for an algorithm, as well as their shared master label object; user input is the name of the new algorithm, by which it will be called by other algorithms. Note that this name is stored as a value, like all metadata. One then chooses a sequence of Drakon outline objects from a drop-down menu; this gesture instantiates a master object or child container with a master object in the container object, based on the master label object selected, that stores the algorithm, and displays the box in the flowchart, and requests the relevant input as a natural language or mathematical expression for display. The lines connecting boxes are instantiated automatically. At his point the process branches into two methods. One can complete a flow chart and then write the code directly into the "code" value object, or one can chose the "EZ coding" container and proceed by inserting the appropriate operators from the "EZ coding" menu. Both the "code" value object and the "EZ coding" object are available within each Drakon object, and the program allows switching between a simple "natural language" and an "all-objects" view. In either method, variables are chosen by pointing at any instance of the label object of the variable; the Drakon editor algorithm traverses the Integrator application through the reference held in that label object to obtain the terminal value and then substitutes the UID of that terminal value in the software statement of the current Drakon object. Operators are chosen as mathematical or logical operators, such as +, −, x, /, <, etc. from a drop-down list or as plain language keyboard symbols; the algorithm substitutes the term for the operator in whatever software language being used. When input for a box is completed, in the second method the code-generation algorithm uses this input and the code stored in the master label object for the box to generate the code stored in this step of the algorithm. These steps are not necessarily accomplished in one sequence; one can generate the Drakon depiction with only plain language descriptions of the steps, including any mathematical or logical expressions; such a depiction can then later be transformed to a software program by following the input steps outlined here.

Automatic code generation is known in other contexts, as is generating code after creating a flowchart. Pointing to database objects to obtain values for variables and operators is not.

In this way, the software required to operate the system, to load, store, manipulate and retrieve the data, and the software required to accomplish the business logic within an application are stored as I-objects in the Integrator data structure. They are displayed in the same GUI, using master label objects so they can be rendered in Drakon or other flowchart format. At run time, a code retrieval algorithm traverses these data objects, retrieves the lines of code, and assembles an executable file with enhanced code appended, which the operating system compiles and executes. An algorithm can be run from a variety of inputs, such as from the standard Integrator menu, from "Run" buttons stored on the data structure and visible in the GUI, when called by other software or triggered on certain events, such as a new transaction.

Interface with a Collection of I-Objects

A collection of I-objects is complete and self-contained as entities in whatever place they have been established, but it is purely symbolic; values have labels to give them semantic meaning, but the user has no pragmatic relation to the data. A user requires an interface to retrieve information or modify the structure, views or data. An interface executes a set of rules to obtain the information and deliver it in the desired format by using interaction-specific data which governs implementation of these rules. Such parameters may include storage locations, for display include places on a screen, fonts, colors, etc., for sound output include musical notes, spoken words or other noise, and so on. The interface enables the pragmatic delivery of information, i.e. data with semantic context meaningful to the user. Most databases separate the data storage function from the interface to the output devices.

The most widespread description of such an interface is MVC (Model, View, Controller). The three basic functions of MVC are required for any interaction with a representation of a collection, whether a list, a telephone book or a computer database. These three categories simply restate the basic functions alluded to above: the model, which is the stored representation(s) of the collection, the view, which the user receives in a pragmatic context of their request, and the controller, which takes input from the user and delivers the result, with data as relevant to the input, or whatever other action the user has initiated. In the case of conventional computer databases, each of the views and the view-specific controller is a separate piece of software with its own collection of objects and interaction-specific data.

A display on a screen is a typical output for a computer database, and this discussion will be restricted to that device, although other outputs follow the same logic. Generation of the display is accomplished by two separate functions: the display driver, which receives input in a pre-defined format and renders it on a screen, and the application interface, which takes an instance of data and delivers it to the display driver in the required format. The display driver, which is part of the operating system of the computer device, arranges the lighting of each pixel (intensity, color, X, Y) into a visual form interpretable by humans; characters described by ASCII are rendered as letters by groups of pixels. Lines, background colors and images are displayed using code built into every operating system. The earliest screen drivers were simply rows of set length before a carriage return (inherited from the typewriter) started the next line, and text files can still be displayed by modern systems in this way. A typical driver provides a hidden grid within the display, typically for the arrangement of items in a sequential order. Location parameters are field, number of rows, number of columns, row height and column width. The display driver must receive the data to be displayed in a certain format and order and then computes the pixel information accordingly.

The function of the View component of the database system is to translate the objects of an instance of the database into language the display driver interprets and delivers as pixels. There are a variety of specifications for the input to the display drivers, such as API for Microsoft, HTML for web-based drivers, and so on. The data to be displayed is typically delivered as a string with an associated style tag. Other objects such as pictures and sounds are delivered in various specified formats. For conventional databases, objects for display in a particular view have been programmed as a profusion of classes, attributes and names, so every view requires a separate program, although the underlying data within a view may change per instance. An example frequently used in the literature is that one view shows the products, with a button to add to a cart, while the view of the cart is another view, as it also contains payment instructions. Moreover, the controller is different for each view, as the choices for the user will change.

Integrator Approach to MVC: A Self-Generated UI

Integrator takes a different approach to the interface. There are still three basic components, i.e. model, view and controller, because there are three fundamental tasks. However, instances of a view are created within Integrator itself as a subset of the data and labels available, rather than called by a separate view program. The Integrator application serves as the model and generates the instance in response to the query of the user, whether through search, selection or other method. The UI algorithm traverses the objects and for those whose display value is set to true, retrieves data and terminal values and creates a UI Instance in a separate container. This instance is then processed by the display algorithm for translation to code interpretable by the appropriate display driver and rendered on the screen, as the View component. The UI Instance for the current view is refreshed whenever data is changed or another query is executed. Once the view is refreshed, the Controller waits for user input. The user may generate an input by mouse click, typing, voice or other communication to the system, which activates the controller. The controller determines which object was addressed based on this communication and using the UI Instance. Once the action is completed, the view is refreshed. The overall UI Algorithm is shown in outline in Drakon format in FIG. 25.

Figure 26:
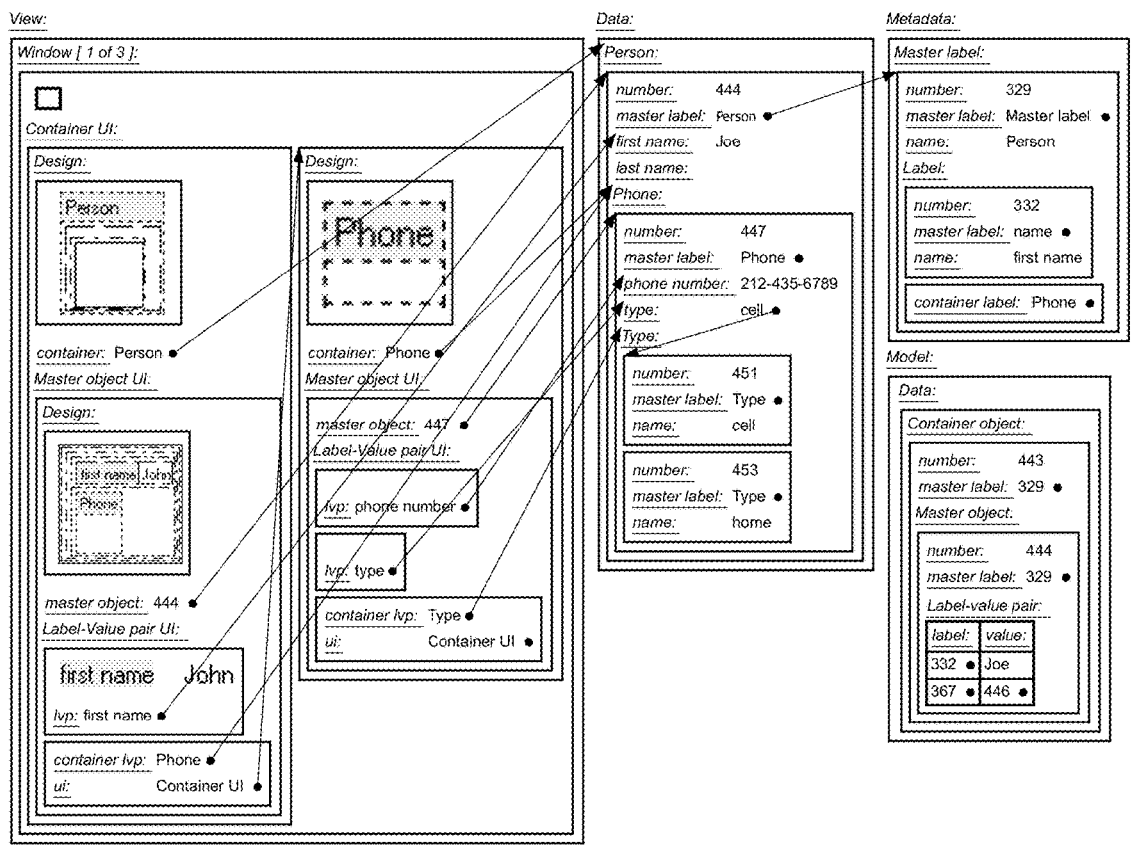
FIG. 26 is a diagram displaying the hierarchy of nested boxes available from the screen driver used to generate the display, along with the metadata available to the algorithm for the generation of the boxes and the display of each data item stored as an I-object.

Every I-object exists only as strings in memory, so its representation on a screen must be generated by a UI algorithm that provides those strings to the screen driver in an interpretable way. The UI algorithm does so by generating a UI master object for every I-object using the interaction specific data in its label object, and these UI objects are contained within the temporary container object "UI Instance". The container object "UI instance" has a UI master object for every object in the view, irrespective of its type. These UI master objects contain as value objects the identifier of the Integrator object represented, a reference to the appropriate UI component master object and references to the UI components of value objects they contain. For example, a container object is mirrored by a UI master object and the UI value objects it contains refer to the master objects within the original container object. The original master objects are each mirrored by their own UI master object, with label-value pairs referencing their UI value objects. Each value object gives rise to a UI master object with its identifier as well as the required UI component such as "Text Value Display." "Master Link Display" is used in those cases where the value object references a child container object. Thus every object with an identifier generates a UI-object with a reference to its UI component. FIG. 26 depicts the display of a UI Container Instance for the "John and Jenny" database shown in FIGS. 5 and 6 with the borders of rectangles provided by the operating system.

Since there are only six basic object types in Integrator, there are six UI components. The two basic components for display are "Bag" and "Grid", where Bag is simply a rectangle around the I-objects in a display, while Grid displays the contents of a container object as a table with labels as column heads and values in the grid bins. Container Bag and container Grid, as well as master Bag and master Grid are the main components of displays. Value objects appear in a box (with visible or invisible outline), so their component types are text value and master link. There is also a master shell, which represents the outermost bag of the UI instance. Each component associated with each object has a variety of interaction-specific data such as color, horizontal alignment, vertical alignment, horizontal span, number of columns, horizontal spacing of columns, and so on. This data is stored in Integrator I-objects stored on the master label objects, in a child container object called "Properties." The nesting process of data in the display mirrors the relationships of this data in the Model, the Integrator data structure.

Figure 27:
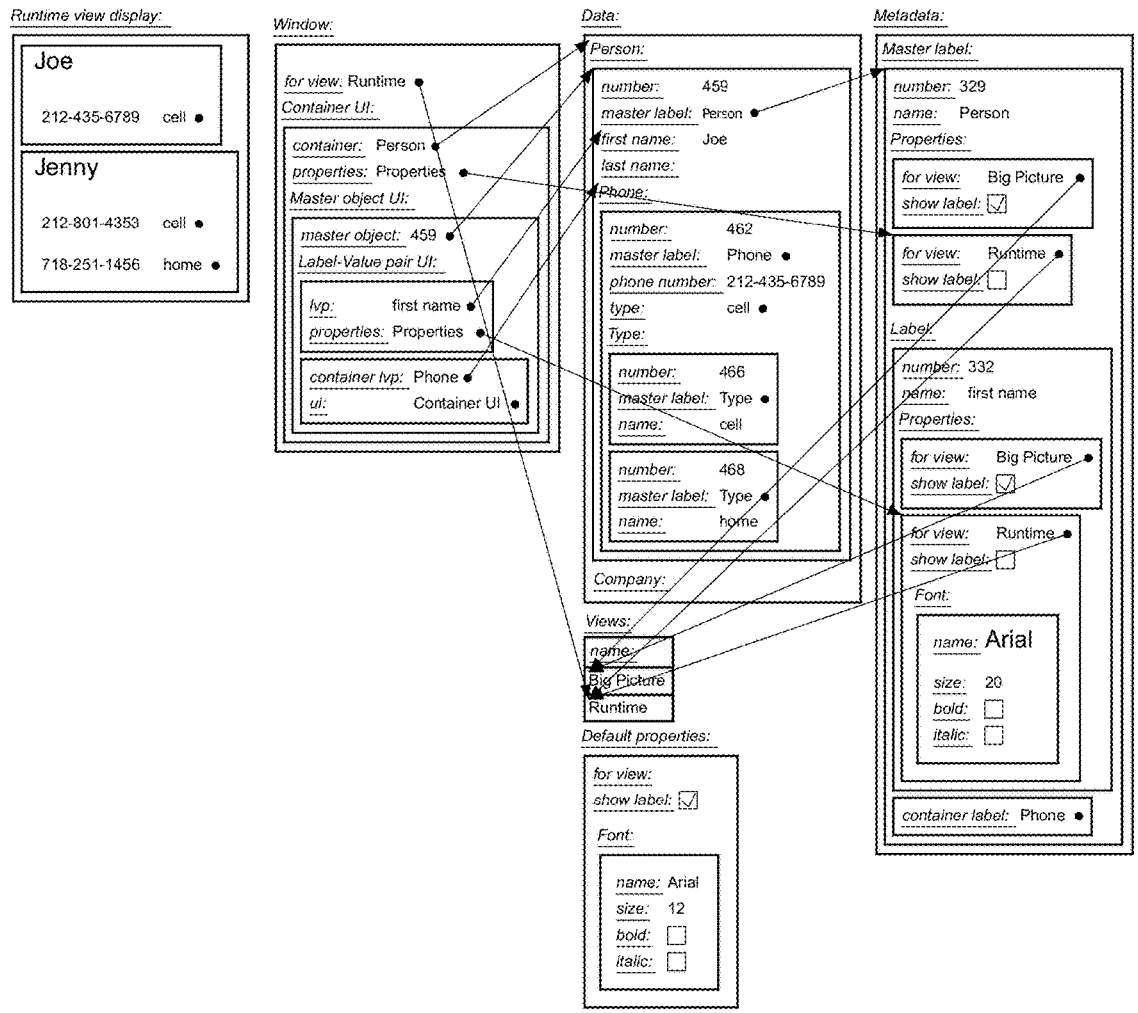
FIG. 27 is a screen shot that depicts how to modify the View by changing Label properties for the database entries for "John and Jenny" displayed in FIGS. 6 and 7.

The Properties of interaction-specific data are available on each label object, so this data controls the appearance of multiple master objects as a template. The interaction-specific data in a label object is usually specific to the display of that object, such as style sheet, label or value string length, dynamic programming if any, and so on. The UI algorithm parses the label object for this data and instantiates the UI-object appropriately. Therefore the UI translator has this data available for translation of the data and the style information to the display driver within the same Integrator data structure. FIG. 9 illustrates the Properties master objects with the parameters which control display for the PC (IBM compatible personal computer). FIG. 27 demonstrates how the on-screen appearance of the "John and Jenny" database shown in FIGS. 5 and 6 can be changed to a Runtime View using the interaction-specific data held in Properties.

View-master-objects hold the data required to represent views of the data structure which are commonly required, such as the data-only interface, the interface displaying label objects, and the interface that displays the entire application in developer mode. Other view-master-objects generate forms, such as mailing labels or invoices. One generates relevant subsets of I-objects for display as views stored as master objects by changing the parameters in the Properties container object. In turn users can save a new view-master-object for future use. A view-master-object is generated by the view algorithm based on the data settings for interaction-specific data in each object, and the interaction-specific data is hierarchical, so for example showing of labels can be suppressed at the container, master object or individual label-value pair levels. Placing, line length, font size and other aspects of the display are all controlled by parameter settings within a particular view. Since the new view is generated after a parameter is changed, and the Properties are available to the user for these objects, views can be changed one step at a time to the desired form by tweaking the parameters and then seeing the results immediately. Once named and saved, the different views can be invoked from a menu of their names.

Different types of display hardware, such as individual or multiple monitors, tablets and mobile telephone screens require different display drivers and libraries, so there has to be a UI translator for each type. Since the size of the display varies, interaction-specific data for each display type controls how the UI algorithm creates the UI instance. Each hardware type is represented as a master object in the container "Display" available within "Properties" and its value objects are hold the data needed to generate the display for these different devices. Screen type is either detected automatically when the device seeks access to Integrator or can be selected from a list.

To summarize, a query from the controller causes a subset of the integrator application to be processed by the UI algorithm to generate a set of UI master objects in the container "UI Instance." These objects mirror their original I-objects, but with terminal values or data inserted, since the UI algorithm has traced references in the I-objects to their terminal values. The interaction-specific data from their label objects controls the appearance for the display. The appropriate display algorithm translates the UI-objects into code for the display driver of the device required. Thus there is only one process for every instance of a view in Integrator, and one algorithm which gathers the subset of data being displayed by this process. The UI-objects are generated in a new container object at run time and cannot interfere in the functioning of Integrator itself, as the model is not changing based on the query. This one way flow from query to model response to view ensures there is never a conflict.

Therefore the Integrator application contains a Graphical User Interface which renders I-objects on a screen. This graphical user interface functions at all stages of instantiation, during development or in response to queries. The Integrator UI algorithm utilizes the operating system screen driver for the generation of the pixels, but parameters are stored as data values in I-objects. In that sense, Integrator contains its own user interface. Objects are instantiated and then displayed, since the UI algorithm steps through objects and their current values to be displayed to generate each UI Instance for rendering.

Integrator Approach to Customized Views

Since the Graphical User Interface output is controlled by parameters stored as interaction-specific data within each master label object, the user can chose which data to display on the screen. Moreover, such a View can be stored by name for future retrieval. Several functions such as Search operate through the same parameter settings, so that a search for a specific data value is returned as a View with only objects containing such data being displayed, along with the related objects that provide context for this data; the output of a Search can also be stored as a View. Such a View generated by Search can be tweaked by changing parameters in Properties until the desired specific View is obtained. An example would include a View of Accounts Payable over a certain age, with the Client name, amount due and contact information. A subsidiary View would then be opened by clicking on the Client, and providing a field to record notes of a telephone call. Both screens would be saved in the same View. Since such Views display parts of the underlying Data Model, changes to data made within such Views are permanent and accessible to others from their own Views.

Views are also applicable to the software stored within Integrator, such that only that part of the code relevant to a certain function can be displayed, along with the data referenced by the software as input, output and intermediate values. The changes made by the user to the code are instantiated immediately and may be run to determine whether they function properly. Instances of data and software in the View can be saved and compared later to other instances after the software has been modified.

Additional Considerations

Labels and values ultimately have a single terminal value, which may occur at the end of one reference or a series of them. No matter how many objects reference this terminal value, they all obtain it at "run time" from this single terminal value. Changing this value clearly has the effect of changing it everywhere at once. Therefore data and metadata are both treated as data, and this data is singular, with one primary location referenced for all instances of a datum. Therefore there can be no confusion with alternate data for the same cell. This process of eliminating duplication is called normalization, and the software that instantiates the Integrator data structure ensures that Integrator applications are fully normalized.

One reason to utilize six (or five) components in a data structure of this type is to separate the labels and values until the data is accessed. Different display formats may show values for labels or may keep them hidden. Display attributes can be changed by dynamic programming, with individual values being highlighted or otherwise changed by placing computation scripts based on other values in a value object in their Properties, thereby enabling an adaptable display based on the latest values. Since these display attributes are retrieved only when needed, they are indeterminate until that moment.

Another reason to utilize the six (or five) components in a data structure of this type is that it will function at every stage of development. One adds a new attribute by adding a new label-value pair to a master object. The change is then propagated by the "change" algorithm up to the master label object and out to every master object it references, so that it is instantiated before the program is allowed to run again. The separate and unique identifiers for each new object do not disturb the function of the previous data structure. Therefore the Integrator application can be built or modified step-by-step, without re-compilation. Mistakes which give rise to errors can be identified immediately and are therefore easily rectified. When data is edited, the new values are implemented immediately by the "display" algorithm as it follows references to these values and returns the data as terminal values to the cells referencing them.

Another reason to adopt this method is that the label or value objects can be readily listed, with their respective references, by type, i.e. a list of authors, and a list of titles. Value objects can be grouped and listed by their label object. Access and searching is straightforward.

Another advantage during Search is that when a data value is located within a value object, that value object is displayed in its context, along with its label object, master object and container object. The result of the search is simply a view into the existing Integrator application, so changes can be made within a Search display and will be instantiated by the algorithms.

Another advantage of this approach is that labels are instantiated as references to other label-value pairs, and the choice of value in the label is dynamically controlled by interaction-specific data, including coding for values derived from other data. As a practical example, a database may contain the date of birth for an individual, which is private information and should not be displayed. By using code, one computes an age based on the current date and displays that instead. Every value object has the interaction-specific data readily available, from the menu, which has a cell for coding such a computation.

Another reason to utilize this approach is that the interaction-specific data is associated with its object in a hierarchical fashion, as label-value pairs within a complete I-object In this way any data type required is also grouped by its label when needed. Any value of data can be obtained by reference to its label, which references the terminal value which holds the data considered its name. In the case where application-specific software uses value data as a variable, the variable name can be inserted in the software by pointing to any instance of the label for this value data and the UID for the terminal value will be stored in the software as the variable name. At run time this terminal value will be retrieved and used by the software to obtain the value data required.

Another reason to utilize such an approach is that various functions of information systems are easily implemented. For example, searching for values is facilitated, because value objects of that type are accessed through the references stored in the label object. A listing of all value data of a type can be readily generated and searched.

Another reason to adopt such an approach is that objects contain information about the type of object represented, and the types are each master objects in another container which contains references to the value and value label objects of these types. Thus a library may hold books, but it may also hold DVDs, and addition of a new type of object is as simple as adding another master object in the "Type" container. The new type is then available to all objects.

Because the display algorithm only seeks data which it is not already present, the framework displayed and the label values do not change as one scrolls through an application, and only data values are changing. Therefore the algorithm only need seek the data itself for the new scrolled view.

To give a practical example of how these separate containers of interaction-specific data function, within the container object "Properties" on every master label object, there is a child container for "Language" which lists the languages available. The text values used as value label data throughout the entire application are accessible as a list by references there. Adding a new language only requires instantiating a new sibling master object "Italian" in this container "Language," and then entering the Italian translation for the label objects throughout the application. Although language look-up tables for display names are known in other programs, such as DotBase from Webbysoft, Gorman et al, see URL www.webbysoft.com, and Grace Hopper's COBOL compiler from the 1950's, here it is included in every application as an inherent feature.

DETAILED DESCRIPTIONS OF THE FIGURES

FIG. 1 is a UML diagram which illustrates the relationship of data and metadata. The meaning of the "Aggregation" 1 is that data has metadata as a definitive part of it. "Generalization" 2 means that metadata is functionally the same as data. Here the DATA box represents the value and the METADATA box represents the label of label-value pairs, as well as the relationship of objects in Integrator to their respective label objects.

FIG. 2 is the UML diagram for the full I-object with its five most basic components; a version with six components would include Container Label above Master Label in the box on the right. The left column of Container Object, Master Object and Label-Value Pair boxes represent the three basic classes of objects in Integrator with their hierarchical relationship. The box to the right represents metadata, also represented as Master and Value Labels. The various links shown govern the relationships of these objects. The closed diamond on a link represents aggregation, so that such links demonstrate that the objects are definitive parts of the objects to which they aggregate. The open arrow head on links from container object to its alternate places means Generalization, so that combinations described in the text can be generalized to this basic UML. Thus, although the Value of a label-value pair is described as a string, the container object, the object reference and other data types generalize to the label-value pair.

FIG. 3 is a schematic diagram which depicts nesting of data in the three object hierarchy. On the left, the container object Person shows a portion of the application depicted in FIGS. 5 and 6, as a user might see it in Runtime View. On the right, the container object Model shows the same data nested in a series of boxes which represent the mutual syntax of container object, master object and label-value pair; note that the master object "Person" contains two label-value pairs, one "first name: John" and the second a child container object "Phone" with a single master object and a single label-value pair "phone number: 212-234-5678." In this way the three-fold hierarchy is repeated by instantiating a child container object with its master objects nested within a parent master object. This nesting is reiterated in compact form on the left, in the display of Person.

FIG. 4 is a screen shot of the Integrator start-up page, which results from running the algorithm "Initialize Kernel Master labels." There are two input parameters shown as check boxes in the container object "Initialize Kernel Master labels":
1. "M. 1. (Master labels) contain Labels themselves." "Checked" indicates that in the master object "Master label (2)", the container object "Label (3)" contains the Label objects themselves. "Not checked" indicates that "Label" Container contains intermediate objects with references to Label objects which are then located in separate Containers by type.
2. "Use M. 1. (Master labels) for Containers." Yes indicates that a Container object's "Container label" field will reference a Master label object, just like Master object's "Master label" field. No indicates that a Container object's "Container label" field will reference a Container label object, distinct from a Master label object. (See text for discussion of this distinction, which is referred to when we say there are 6 or 5 i-objects.)

The algorithm "Initialize Kernel Master labels" invokes "Allocate new . . . object" algorithms for Container, Master and Label-Value pair classes, shown as Java constructors as shown above. It establishes the necessary references between Kernel objects. After a successful execution 'initialized Kernel' flag is set to Yes on the Integrator instance and the references to the key Kernel artifacts are established which will be used by other algorithms. The I-objects shown below are called the "Kernel" objects because they reference themselves for the values of their labels. Other master label objects reference these Kernel objects for the values of their labels, as needed, such as "Master label" and "Text label name."

FIG. 5 is a schematic view of the Kernel of master label objects and their data, to provide certainty. The upper segment of the figure displays the hierarchical elements in text view, with indents showing lower levels of the hierarchy. The middle segment shows the Kernel in Developer View, with label values populated. A first master object (1) holds two label-value pairs, its UID and a reference to its master label, which is the child container object Master Label. This container object holds a second master object (2), again with a reference to its master label object Master Label, which is its container, and a third label-value with the value "Master label". This value object is referred to by labels that display this value. The algorithm that populates label values in the display is referred to this master object for this value. Master object (2) contains a fourth label-value pair, whose value is the child container object "Label" (3). It contains two master objects (4) and 5. Master object (4) has one value object "name" and master object (5) has two value objects: Label and a reference to child container object (6). Container object (6) has one master object, which is simply master object (4) repeated. At the bottom these same objects are depicted as stored in the underlying data structure with references to the terminal values of all data objects, whether they are displayed in label objects or value objects.

Figure 6:
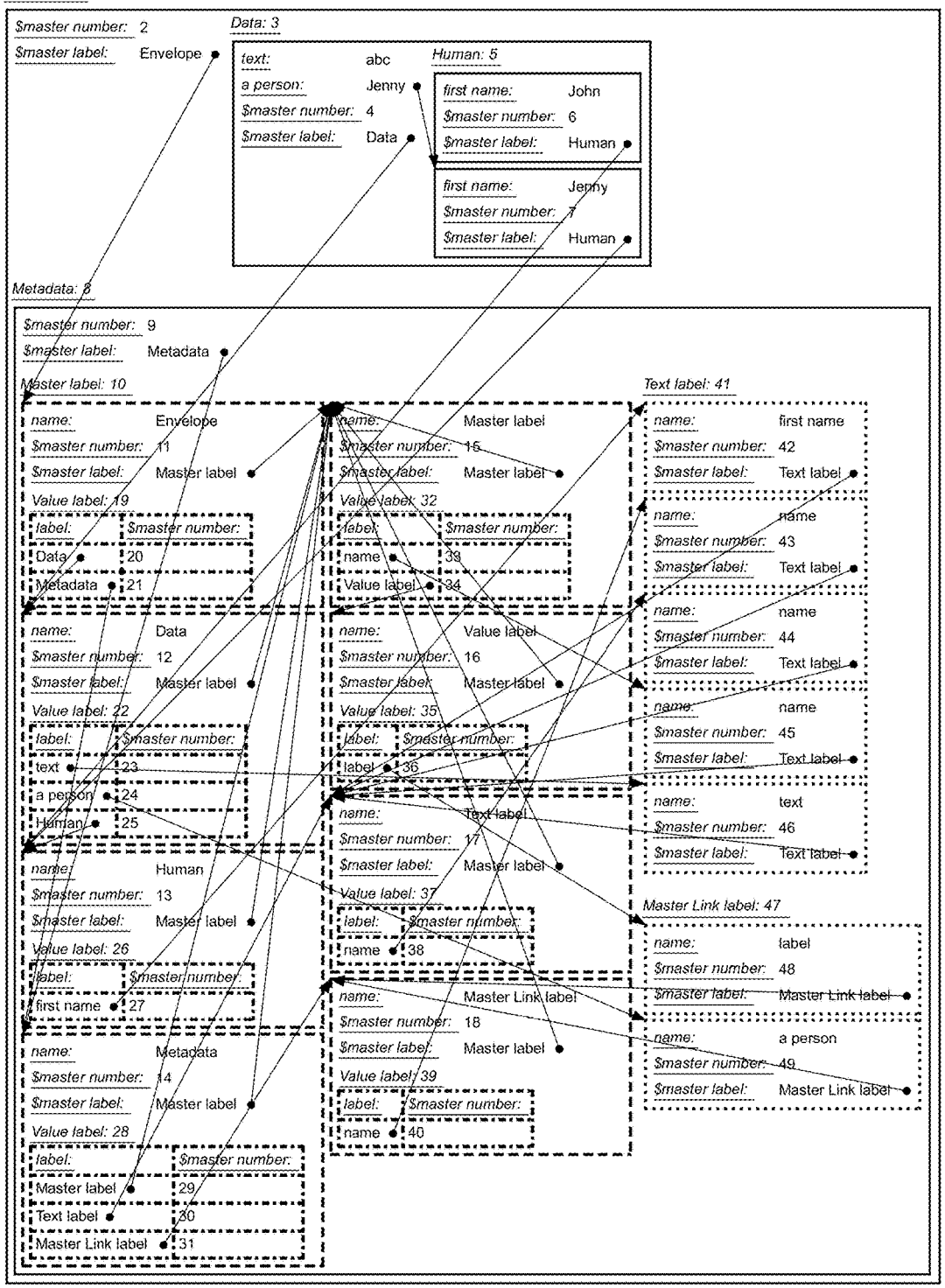
FIG. 6 is a screen shot of a sample Integrator data application, hereafter called "John and Jenny", where data are shown separately from their metadata. In this depiction the labels are populated with their values for ease of reading.

FIG. 6 is a schematic depiction of the example database "John and Jenny." shows an example of how six- or five-fold Integrator objects can be represented graphically while the I-objects also store the data of a database. The figure is shown with objects and their UID numbers, shown in parentheses in this written description, made visible for clarity of illustration. Labels $master number (UID) and $master label are ubiquitous and are supplied by the system itself. For clarity, Container Object references to their Master Label Objects are not shown as arrows in this diagram. Label Objects show their referenced values.

FIG. 6 illustrates the distinction between "data" objects above and "label objects" below. The box "Data (3)" approximates the Developer View. The box "Metadata (8)" contains the objects which hold the data required as metadata in the users' view, as well as internally for the metadata part of the schema. In the remainder of this description, we will examine these objects in detail and their relations to other objects. The outermost box shows a root container object "Envelope (1)," which contains one Master Object "Envelope (2)"; both share the Master Label Object "Envelope (11)". Master Object "Envelope (2)" contains two label-value pairs, whose values are the Child Container Objects labeled "Data (3)" and "Metadata (8)." These container object are shown as the two large boxes above and below within the outermost box. Note that the label-value pair here are displayed as the Label of the container object, i.e. Data 3 or Meatadata 8, with the child container object itself as the value. Each Child Container contains a single Master Object, (4) and (9) respectively; both Container Object and Master Object reference the same Master Label Objects "Data (12)" and "Metadata (14)" respectively. These Master Label Objects have a first label-value pair "name: Data" and "name: Metadata" and the values in these label-value pairs are displayed in the labels for these two Container Objects and Master Objects. The Master Object "Data (4)" contains three label-value pairs of different types: the Label "text" with the Value "abc", the Label "a person" with the Value "a reference to the Master Object "Jenny (7)"" and the Label "Human (5)" with the Value "a reference to a Child Container Object "Human (5)". These three different types of data are Text, Master Link and Child Container respectively.

Referring again to the Master Label Object "Data (12)," we find below the $ fields a single label-value pair whose Label is "Value label (22)" and whose Value is a Child Container Object, which holds three Master Objects shown as rows in grid format with dot-dash lines. Each Master Object is shown with a Value Object in the "label" column and its Master Object UID in the "$master number" column. The data shown in these three Value Objects are "text," "a person" and "Human," as displayed in the labels of the label-value pairs in Master Object "Data (4)" above. Note that to the right of each of these value objects there is a small arrow, indicating a reference. We can trace these references by the arrows to three separate objects which hold the actual Terminal Values for this data. Respectively, Master Object (46) with the data "text" in the value of its first label-value pair; Master Object (49) with the data "a person" in the same place, and Master Label Object (13) with the data "Human." As each datum is the name for a different type of data, these Terminal Values are found in different places by Type: as a Master Object in the Container Object "Text Label (41)," as a Master Object in the Container Object "Master Link label (47)" and as a Master Label Object "Human (13)," which also serves as the label object for the Child Container "Human (5) and its Master Objects (6) and (7).

The Master Object "Metadata (9)" holds three child containers as value objects, labeled: "Master Label (10)", "Text label (41)." and "Master link label (47)." Its Master Label Object "Metadata (14)" is configured the same way as Master Label Object "Data (12)," discussed above. It also has a Child Container Object "Value label (28)" which shows three Master Objects with the data for the labels of these Child Container Objects. The Terminal Value for each datum displayed is reached by reference to three Master Label Objects: "Master Label (15)," "Text label (17)" and "Master Link Label (18)." Master Label Object "Metadata (14)" is referenced by the three Container Objects of Master Object "Metadata (9)" by the Master Objects within these Container Objects and by the Master Objects within the Child Container Object "Value Label (28)" in the Master Label Object "Metadata (14)" without contradiction; the algorithm traversing the application simply follows the references at run time and returns the appropriate Terminal Value found to each label object.

Note that the Master Label Object "Master Label (15)" serves as the template for all Master Label Objects and also serves as its own template; the data its value objects hold is used for its own labels "name" and "Value label." All Integrator applications require this Master Label Object "Master Label (15)" with its label-value pair whose value is the Child Container Object "Value Label (32)." It is this kernel where the labels for all Master Label Objects reside and are available. As shown in FIGS. 4 and 5, these kernel master label objects are usually instantiated first when a root object is created. Here they have a higher object number, which is simply an artifact of how this figure was generated. The principle is the same.

Figure 7:
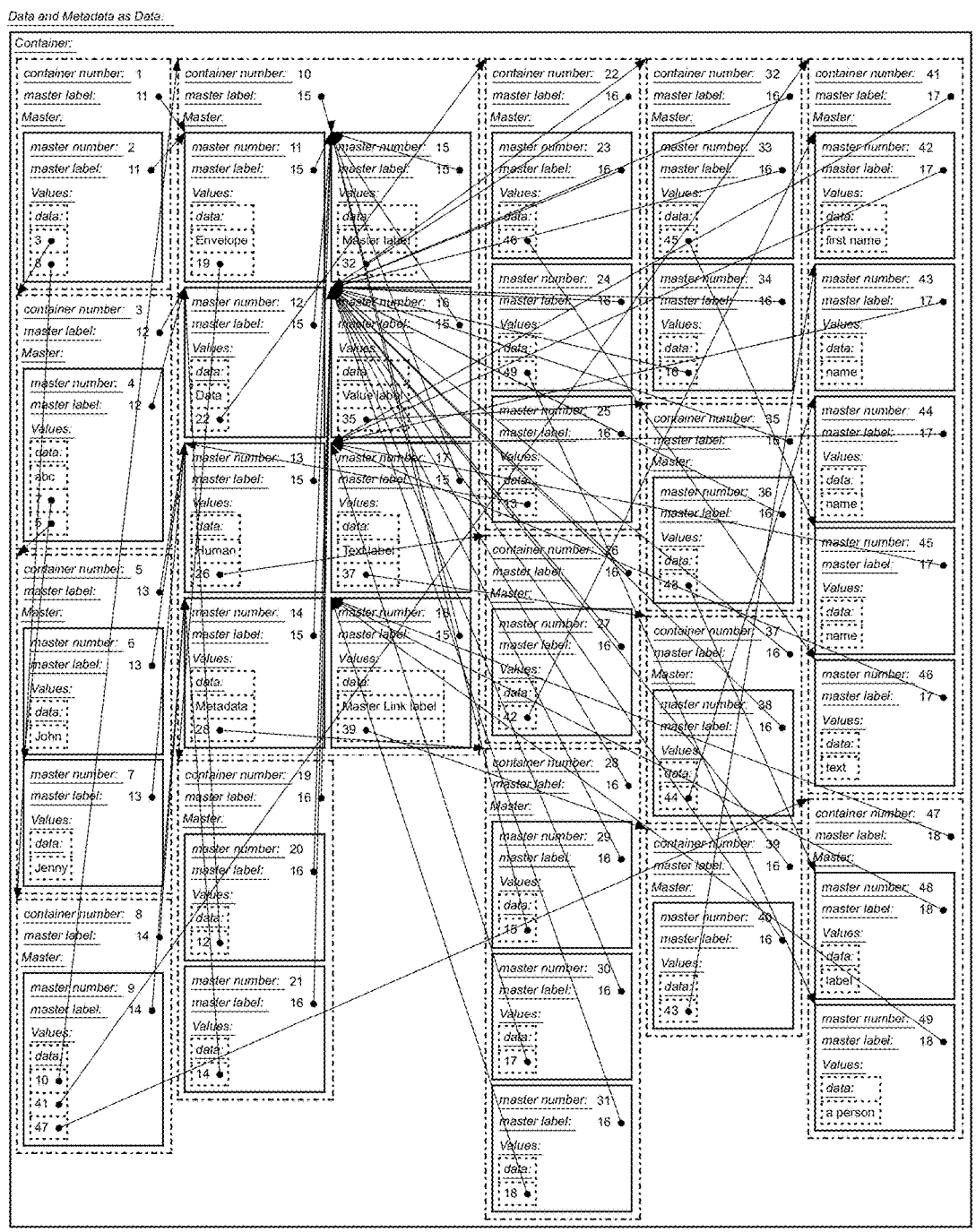
FIG. 7 is a screen shot of the same Integrator data application "John and Jenny" as FIG. 6, but here data and metadata are shown as they are stored in the underlying data structure in memory. References are stored in value objects and label objects, and data and metadata values are stored once to be retrieved for display. In this depiction only the system labels common to all objects are populated with their values for ease of reading; other label values are obtained by following references.

FIG. 7 is another schematic view of the "John and Jenny" database in FIG. 6, but in this case FIG. 7 illustrates storing both metadata and data as data in the basic three-fold object schema, without distinctions between data and metadata. This is how the references and terminal values are stored in memory. The numbers of the objects are the same as presented in FIG. 6. FIG. 7 depicts the references for every object as in FIG. 6, but without having the values shown in the labels. To keep FIG. 7 compact, Child Container Objects are called "Value" and the label for Value Objects is simply "data," and these two values are supplied by the program. We also omit master label objects for the values container number, master number, master, value and data, again in the interests of depiction.

In FIG. 7, the Root Container Object "Data and Metadata as Data" holds the container objects of the application, shown in dot-dash outline boxes. We locate the container object "Envelope (1)" with one Master Object (2) in the upper left. Both reference Master Label Object (11), which has two value objects. One is a terminal value with "Envelope" as the datum and one is a reference to Container Object (19); which illustrates how a Container Object can be the value of a label-value pair. Container Object (19) and its Master Objects (20) and (21) reference Master Label Object (16), which holds the Terminal Value "Value Label," the name of the Child Container Object in Master Object "Envelope (2)" in FIG. 6. The second datum in Master Object (16) is a reference to Container (35); its Master Object (36) holds a reference Master Object (48), whose Value Object contains the Terminal Value "label." Returning to Master Label Object (11) in FIG. 6 we see that, other than the label of the first label-value pair "name," it has just these two labels: "Value Label (19)" and "label". The value "name" is supplied by the Master Label Object "Master Label (15)" by references ending in Master Object 45. Returning to the Master Object (2) in FIG. 7, it has two data values, references to Container Objects (3) and (8). When we follow the arrows, we see they are simply Container Objects, in the same overall container "Data and metadata as data." So the hierarchical depiction of objects within other objects of FIG. 6 is simply a depiction, and when the distinction between data and metadata, or data objects and label objects if removed, all Container Objects are the same and occupy the same level in the hierarchy. Following the first data reference from Master Object (2), we move to Container Object (3), which has one Master Object (4) which holds three data values: "abc" as a Terminal Value, a reference to (7), which is the Master Object "Jenny" in FIG. 3, and a reference to the Container Object (5) which holds Master Objects (6) and (7). These two hold the Terminal Values respectively "John" and "Jenny." Here data is stored as data and retrieved by a chain of references to master which hold the Value Objects. Master Objects (6) and (7), as well as Container Object (5) reference their master label object (13), which contains the Terminal Value "Human" and a reference which leads to the Terminal Value "First name" in Master Object (42).

Following the second reference from Master Object (2), we move to Container Object (8) and its Master Object (9); both reference Master Label Object (14), which holds the Terminal Value "Metadata." It also holds a reference to Container Object (28) which holds three Master Objects (29), (30) and (31), which hold references to Master Objects (15), (17) and (18).

In this way the algorithm steps through the I-objects instantiated to populate labels and values with their respective data.

FIG. 8 is a compilation of three screen shots showing the Integrator system algorithm "Create a basic text label-value pair" with the same "John and Jenny" database discussed in FIGS. 5 and 6. The Developer View is depicted on the upper left, with the model, i.e. the full database, below. Because of space considerations, Kernel objects are not shown. The algorithm is shown in Drakon format in the center column, and the resulting database after the new label-value pair "last name: Schmidt" has been instantiated is shown on the right. Both data and metadata objects are shown, as the label-value pair is instantiated in both, as a value object in the data master objects and as a label object in the master label objects. The algorithm is invoked by a gesture with the cursor within the master object in which the new label-value pair is to be placed. The data type is specified in the gesture selected, in this case "text." It requires input of the form "name: data" which in this case is "last name: Schmidt." Then the algorithm locates the master label object of the master object where it was invoked, enters a new label object and then, using the list of master objects referencing this master label object, installs the label-value pair on every master object as a value object. In the master object where the gesture was made, the value is saved as the input value, while in sibling master objects the value is null. The result is seen on the right. Master label object (8), in the Metadata column lower right, has a new master object (14) in its child container object "Label" and the master objects all have the label-value pair instantiated, with a label that references master object (14). This example illustrates that the algorithm can accomplish this modification simply by traversing, following references and iterating over sibling objects. Other data and metadata modification algorithms follow an analogous process. Moreover, since the data and metadata are fully instantiated and present within the application at the end of the algorithm, the modification is displayed in the same fashion as any application, with no need to recompile or reconfigure the output algorithms.

FIG. 9 is a screen shot of an example of the Global Properties container of interaction-specific data available on every label object, which contains the data required for system functions such as depicting the graphical interface, adjusting to different display types, authorization of users and their access, internationalization, and other house keeping tasks. As discussed above, generalization means that lower levels of objects refer to the higher levels for the values of shared data, such as Global Properties. In this way, a change in a parameter for Properties at the root container label object is propagated throughout the application, which applies primarily to matters such as Display Type, i.e. PC or iPhone, or Internationalization. When a parameter in Properties is changed from the default value on an object, then only that label-value pair of Properties is stored on the corresponding label object. The change will propagate to Properties on lower levels of the hierarchy nested below this object, unless the next level is reset to the default. An example of changing display properties in a View by changing the parameters of Global Properties on a label object is shown in FIG. 27.

Figure 10:
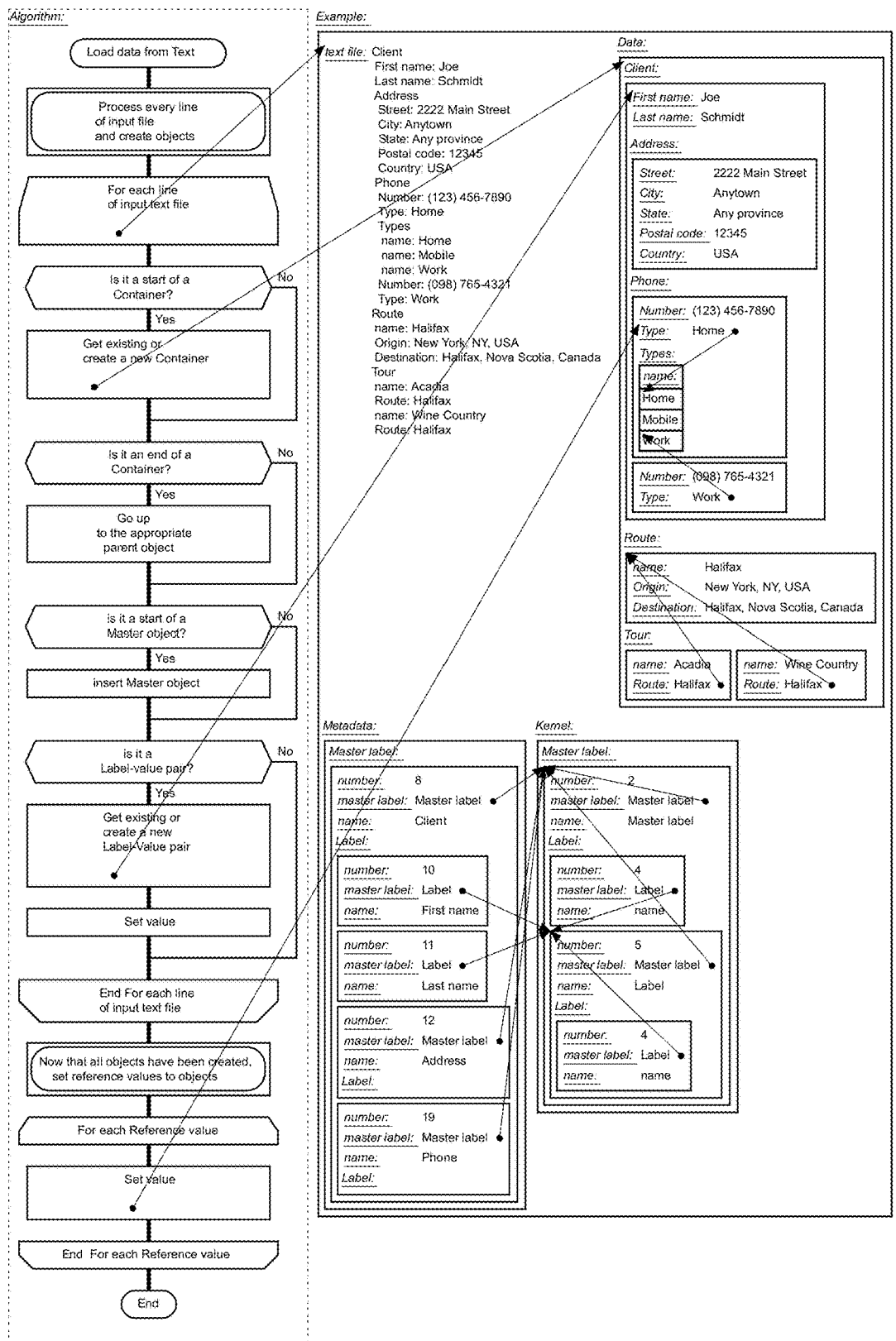
FIG. 10 is a structured diagram showing how the "Load data from text" algorithm generates an Integrator application from a structured text. Only the first master label object for "Client" is shown for clarity.

FIG. 10 is a compilation of screen shots illustrating the algorithm "Load data from Text," which instantiates an Integrator application by parsing a text document. The algorithm is shown in Drakon format on the left. In the upper center column, the text file is shown, with intends to indicate hierarchy of objects. The right hand column shows the data in Integrator. Below, in the Metadata displayed, only the master label object (8) for "Client" is shown, for reasons of space, but the label objects are instantiated in an analogous fashion. In this example, the code in the algorithm determined the object type, following the question "Is it a . . . ", from the line of input text by counting the number of indents. Other methods of parsing a text file to determine a hierarchical relationship are known and can be applied. The key point is that the database is instantiated from beginning to end by the algorithm and is fully functional. Each line of the text has had appropriate I-objects created and instantiated by the software alone.

FIG. 11 is a compilation of screen shots depicting the master algorithm "Load data from Relational Database" in Drakon notation which generates a new Integrator application from an existing database. The Master algorithm calls a series of other algorithms, shown by name in the rectangles with double end bars. The illustration here depicts the entire process as a single skewer of steps, where only the first box is shown on this page. The remaining algorithms are depicted in successive figures. The first step is opening a connection to the target database. Data required for the connection is stored in Integrator format and available to the code which opens the connection. Once the database is connected, the master object Table is populated by a list of tables as value objects, by name.

FIG. 12 is a compilation of screen shots which shows how the algorithm "Get Tables and Columns" obtains target database metadata and structure First, an SQL or other query obtains the list of target database metadata. The Integrator algorithm "Get tables and columns" loads this metadata into a pseudo-Integrator format. Each brand of target database will have its own format to obtain this list of metadata, so the formula used in the "Load table information" action will vary by brand. However, in principle this is no different than parsing a text file and instantiating an Integrator database. The parameters for parsing brands of relational databases are available and will be stored in Integrator format.

FIG. 13 is a compilation of screen shots which shows the algorithm "Create data structures," which utilizes these metadata on the tables, child tables, and columns in a similar fashion to the structured text conversion shown in FIG. 10 to generate a comparable Integrator structure of iObjects, including Master Label Objects. In the figure, the Integrator data structure created is shown on the lower left in the container object called "Empty containers." On the right is the original target database structure, without the table Phone type, to save space. Tables have been converted into nested I-objects and the Foreign Keys used to tie data between tables is now either extraneous, as "Phone" is now a child container object within Person, or preserved, as in the case of PHONE_TYPE, which is instantiated as a separate container object referenced by each master object in "Phone." The algorithm "Create Data Structures then calls the subroutines "Populate object" which instantiates the label-value pairs and the child containers on foreign keys. The subroutine "Create reference" then instantiates the label-value pairs with references to the child objects created from the foreign keys.

FIG. 14 is a compilation of screen shots showing how Integrator will populate the new database with values, once the structure is complete. The algorithm "Load data from databases into Containers" makes a query to obtain the actual data and uses it to populate the Value Objects. Note that a new master object is generated for every row in the target database tables, populated with the appropriate label-value pairs using the Master Label Object as a template, and then Value Objects for that item are populated. Finally, the algorithm "Set data references" traces references from Foreign Keys and Child Tables in the target database and instantiates them. The resulting functional Integrator application is shown below as "Data import result." Object IDs are shown to demonstrate completeness. The last step in converting a relational database is to adjust the display, which is demonstrated by FIGS. 26 and 27 below.

FIG. 15 is a compilation of screen shots which shows a synthetic software file written in Java code and then transformed into Drakon with natural language displayed. The natural language translation to English must be done manually. A database is always accompanied by software to store, manipulate and retrieve the data. In the following figures we show how Integrator stores a software file as data in I-objects, retrieves a new software file, parses the code and converts it to Drakon format for ease of understanding. Each line of code and associated attributes, such as a natural language translation, are stored as data in master objects in Integrator. An output algorithm extracts the lines of code from this database and re-creates an executable file at runtime.

FIG. 16 is a screenshot which shows the algorithm depicted in FIG. 15 stored as data in Integrator format at the top, in the container object "Algorithm," with the associated Master Label Objects below in the container object "Metadata." Note that the outline information for the Drakon diagram is stored on the Master Label Objects. The opening lozenge "Algorithm" is stored in master object 51, referencing its master label object 18 where the form of the lozenge is stored. Master object 51 has the label-value pair "Sequence" as a child container 54. This child container holds the IF operator as well as the actions C, D and E that flow from that. Lozenge for "The End" is stored as a separate master object 64. Each line of code in the original Java file is stored in a value object in a master object.

FIG. 17 is a schematic which shows how operators required for programming are displayed as Integrator objects with the Drakon boxes. On the left, we see a synthetic algorithm with operators displayed in context. On the right, we see these operators organized by category; rare operators are named on the lower right without corresponding boxes. The box shapes are stored as values in master label objects; other values such as software code are stored as values on these master label objects. This set of operators is complete for the Java language; when other languages are implemented new operators can be added in analogous fashion. The objects depicted are also implemented in the Integrator Drakon editor.

FIG. 18 is a screen shot of the algorithm "Reverse code in Java file." The same method is applicable in other languages. There are 3 nested algorithms. Starting at the beginning, the Java file is parsed by a Java library; for each declared type, the type is determined. Whenever a Constructor or Method is encountered, the routine "reverse algorithm" is called, which then steps through the algorithm and calls "reverse operator." This final algorithm assigns a type and master label object to each action or operator. When the process is complete, the reversed algorithm is stored in the database in I-objects and is available as a Drakon depiction, with each line of Java stored in a value object and shown in the Drakon outline. FIG. 14 depicts a simple Java file reversed into Drakon format by this algorithm, with the English translation of java shown, while FIG. 15 shows how it is stored in I-objects.

FIG. 19 is a compilation of screen shots which shows an example of using data objects as variable names in algorithms, and implementing software operators from a look-up table. Normally a variable in a software algorithm is defined as a class and type in the code. Then at runtime the values the variable take are sought in the database and used in an arithmetic or logical expression by the algorithm. The interaction between the code and the database are fixed in this software, as the variable usually refers to universal metadata such as the name of a column in a table to obtain the value required. In Integrator code can be generated by reference to an existing value object. In this artificial example, the label-value pairs were created in a master object on the upper right within the container object "Data object." The EZ Code operator "Set" was chosen from the menu, so an empty label-value pair was inserted along with the child container object "=". The cursor was placed in the first label value pair and the value "x" was clicked. Setting the cursor in the child container object, menu items "Get", "Java" and "Get" were chosen. Each was populated by pointing and clicking, the "Java" from a table of Java operators. In turn, the Java code shown was generated by the code stored on the master label object for each operator and the resulting Java code is displayed. The master label objects for the oval algorithm name box and the "End" box supply the code to open and close the algorithm. At runtime, the UID of each label is replaced by the current data from that value object. In this figure we see that variables x, y and z in the algorithm are present only by reference to their label-value pair. The process is amenable to many variations and can lead to automatic population of the code in a flowchart. At the bottom of the figure, the instructions to the user to generate this figure or others like it are shown in Drakon format.

FIG. 20 is a compilation of screen shots which shows the use of universal variables by pointing at the label-value pairs in the database to indicate the variable. Integrator permits the side-by-side graphical display of data and algorithms. In this example, an artificial database, with container objects A and B, is shown to the right of the algorithm. In an actual programming situation, one can create a limited view of the real data, such as through the Find command, to perform the same function. The same example as in FIG. 19 is worked using variables x, y and z. In this example, the master label objects of these labels are shown and the UID for the master label objects is in fact displayed in the code for retrieval at runtime.

FIG. 21 is a screen shot illustrating the use of iteration in an EZ Code example. The container object Check displays a series of check amounts, which are sequentially subtracted from the balance. A runtime variable Iterator is instantiated by the program automatically and it points to one check after another. The details of a banking system are left out of this example for simplicity. The details of the EZ Code arithmetic in the box "Subtract amount from balance" are also not shown. The Java generated automatically at the bottom is correct.

FIG. 22 is a compilation of screen shots showing the algorithm which generates Java code from an EZ coding Drakon flowchart. In the figures above, we have shown the steps in generating an EZ Code flowchart by selecting boxes for the Drakon flowchart from a menu and populating the variables and operators by pointing at label-value pairs in the database or at a chart of Java operators. This figure displays the algorithm "Generate algorithm" which transformed the EZ Code flowcharts into the Java code, as shown above. The series of routines invokes the EZ code object's generate code, which is stored originally n the master label object for each EZ Code object. The Java file saved is complete, because the algorithm incorporates the code from the opening and closing boxes as well as the code generated by each intervening box.

FIG. 23 is a screen shot of the Drakon depiction of the code-retrieval algorithm which generates an executable file from code stored as data in I-objects; these are not the EZ Code routines shown above, but software files which have been reversed and stored in Integrator format, as shown in FIGS. 15 and 16. In the upper left column we see the master algorithm as a single skewer. It calls a number of subroutines, also depicted. The algorithm traverses the I-objects, identifies their type by reference to their master label object, and initiates the appropriate action for each type of line of code. As it encounters a series of operators, it implements them using "generate Action, Call" and when it encounters a branching operator, it implements it using the appropriate subroutine. When the subroutines have completed and the line added to the Java file, the subroutine "enhance operator" is called; this subroutine and code enhancement in general are shown in FIG. 24. The result is an executable Java file saved in the memory.

FIG. 24 is a compilation of screen shots which show the algorithm which both enhances code to interact with the Integrator database during a run and also stores intermediate values of variables. In the upper left we see the subroutine called during the code-retrieval algorithm "generate sequence of operators" depicted in FIG. 23, lower left. After an operator has been turned into Java code, the subroutine "enhance operator" is called and the algorithms and database modifications it implements are displayed here. There are two enhancements shown, "hilite" which colors the Drakon box being executed for the time indicated in the value object, and "store runtime values" which creates a child container object "Runtime values" within the master object of each line of code, and then master objects associated with the algorithm being run store values generated by the algorithm during execution. These values are stored in label-value pairs, which in the case of universal variables, reference their label-value pairs in the database After each run the intermediate values are stored as an instance with a time and date stamp.

Figure 25:
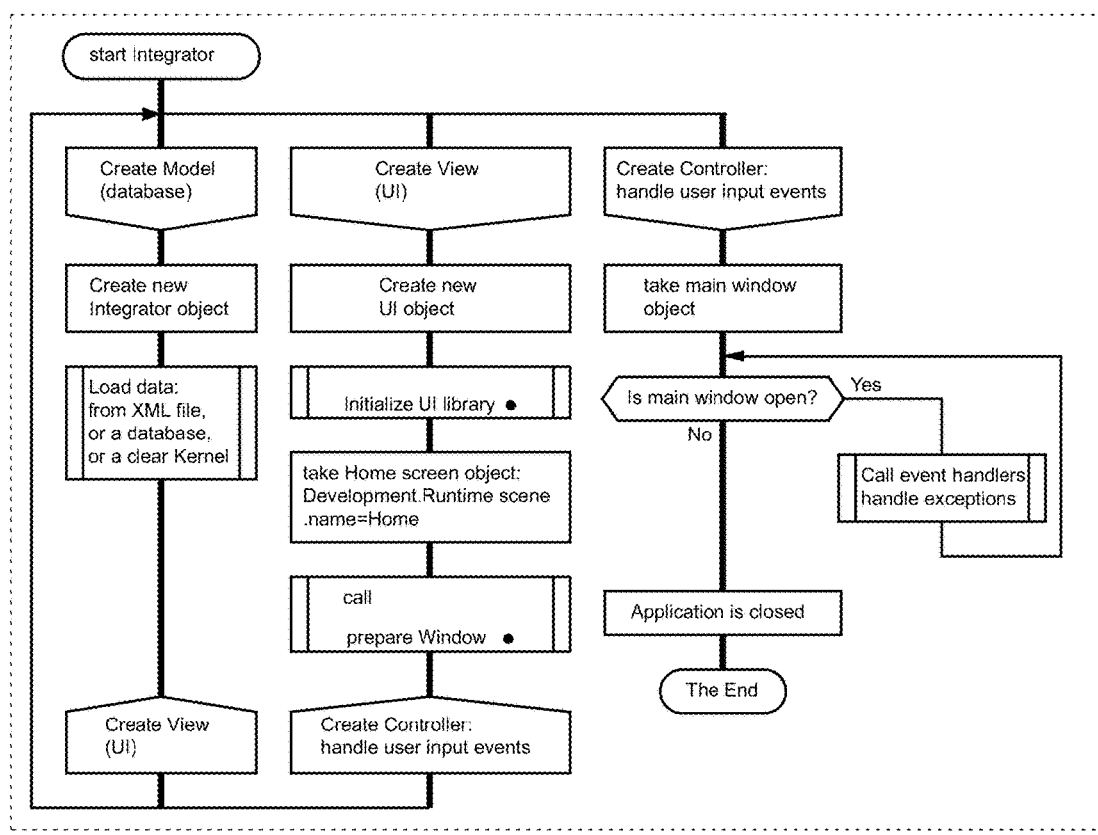
FIG. 25 is a flowchart depicting an algorithm that generates the graphical display for any Integrator application.

FIG. 25 is a screen shot of the display algorithm, which is how Integrator implements the classic model-view-controller (MVC) system for the user interface. "Larix" is another name for Integrator. Event handlers, right-hand column, respond to user input, using the position of the cursor on the screen to locate the object in the model. Such input includes gestures invoked by buttons, voice or swiping touch sensitive screen. Invoking a gesture turns control over to the algorithm involved, which then responds to user input. "Return" causes the algorithm to run and then present the screen again. In each case, the model remains the same, save for the modifications made. The display algorithm gives a "window" into the model. The window is created from the UI objects, which are generated from the model using the parameters in Properties. Some of the aspects of this process are shown in subsequent figures.

FIG. 26 is a compilation of screen shots which show how Integrator uses the built-in grid system provided on the display by the operating system to generate the hierarchically nested graphical output in the Bag format. On the left is the Container UI with the master objects for rendering. The screen is divided into a set of nested boxes, each with their own border pattern for illustration, which reflects the hierarchy of the iObjects. Patterns are stored in the Properties container on each Master Label Object, and the boxes themselves are drawn using the operating system coordinates for the screen, so box properties are simply parameters, in pixels or other units, in the Properties container. Integrator computes dimensions required and resizes boxes automatically; these dimensions can be "tweaked" in the Properties container. Grid displays can also be used, like conventional tables, and are controlled in an analogous fashion. Grid parameters are also in the Properties container and can be tweaked to show or hide columns, adjust dimensions and so on. The data for display within these computed boxes is shown in the middle area of the figure, along with it's metadata.

FIG. 27 is a compilation of screen shots which depicts modifying the appearance of the display of the example database "John and Jenny" shown in FIGS. 5 and 6. The display font is changed and labels suppressed in the View "Runtime" by modifying parameters in the Properties. In the upper left, the display is shown as it appears on-screen, using the "Runtime" view. In the "Data" column to the right, the first entry "Joe" is shown in "Big Picture" view, which shows all label values and the structural detail. In the right-most column is the Master Label Object for the "Person" objects, with some of the Properties attributes visible in its container object; these can be displayed by a hot-key. At the top of the Properties container object there is a choice of which view to display. In the column Window, the View is set for "Runtime" display, yielding what we see on the upper left. The properties for Runtime are retrieved through the reference from Properties of "first name" in the Window to the appropriate properties under Label in the master label object for "first name" on the lower right.

"Properties" share the aggregation aspect, which is to say that Properties are implemented hierarchically. In this instance, inspecting the Metadata column, we see that the Properties for "Big Picture" shows only a "show label" text box, while for "Runtime" the "show label" box is not checked. Below that we also see font parameters in the text label object 332 for "first name". The "Font" container object is shown for View "Runtime" because the font size is changed, while other attributes continue to use the same font as the Properties for the container object "Data" and therefore no font information is displayed. There is nothing novel about assigning a different font to different text, but in this case we have a hierarchical inheritance for all Properties except for one, which is only changed for a particular View. Objects "contained" in an object with altered properties will display those, so if, for example, we had two sets of people in the database, "Person" and "Employee," then they could be distinguished by their fonts when a search brings them up.

FIG. 28 is a compilation of screen shots which shows the algorithm which creates a new application as a root container object in Integrator. The input is the name of the new application, in this example "Person." The Kernel objects are shown on the left, with labels populated above and as references below. The algorithm in the center instantiates a new master label object, with the name as input, then a new container object and populates it with an empty master object. The result is a root container object which is not nested in a master object as a value. This root container can be saved independently and will open as a complete Integrator application, using the initiation algorithm "Initialize Kernel Master labels" depicted in FIG. 4.

FIG. 29 is a schematic diagram which depicts this empty root container with different system label-value pairs displayed. All other container and master objects have a label-value pair whose value is the UID of their parent object. Objects are nested recursively and hierarchically and all objects have a parent object except the root container object. In this figure we see that the data for the container object (1) has a null value for its Parent master object, while the master object and label-value pair do have values for their parent objects.

FIG. 30 is a screenshot which displays the UML of an I-object in Integrator graphical format. Previously this was shown in FIG. 2 in UML graphical format. The container object Class shows each basic object as a master object with a name and two child container objects Attribute and Relationship. "Attribute" shows the contents of the object, while "Relationship" holds master objects which list the general characteristics of Aggregation and Relationship of the object. The container object Metadata shows the two subclasses Master Label and Label in the same format. Container label object is not shown for reasons of space.

The Following Figures Display Variants of the Kernel Objects:

FIG. 31 is a compilation of screen shots which depicts an instance of the kernel objects where master object 4 is shown twice, once contained in the child container object 3 as a sibling of master object 5, and once in child container object 6. We see in the Model depiction on the right that master object 4 holds two references to its parent objects 3 and 6; whichever one was instantiated second will be shown simply by reference to the first instance, but during the instantiation of the second, the additional parent reference is instantiated in the first instance. These two objects are referenced for their data "name" by master label objects for one instance and by label objects for the other.

Figure 32:
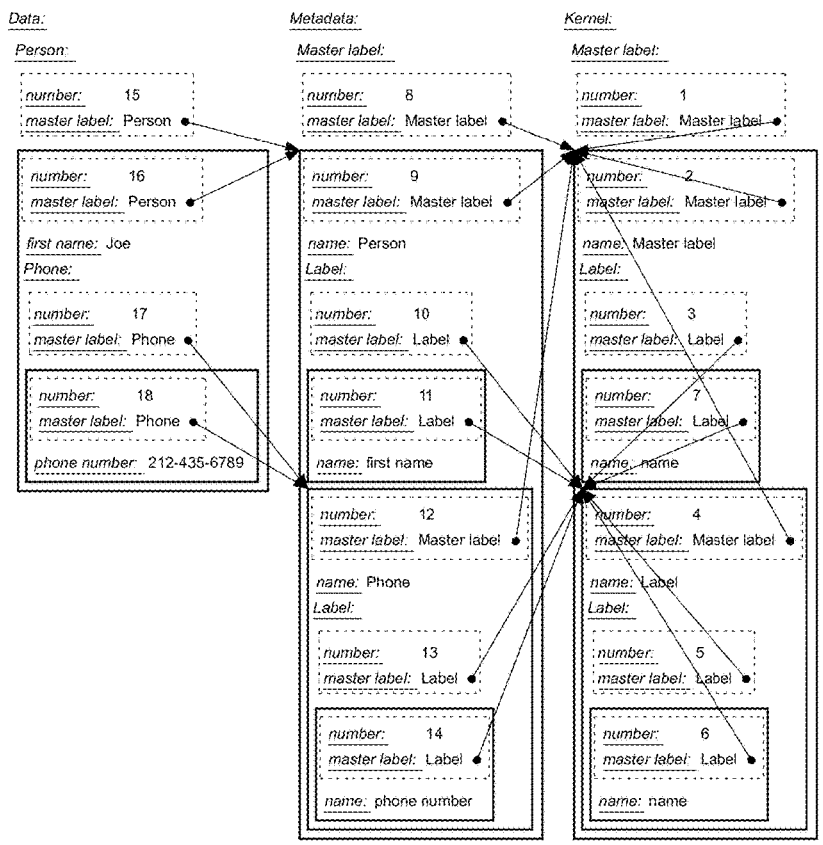
FIG. 32 is a screen shot of a variation on the Kernel, where Master labels are logically connected as a simple list.
Figure 32:
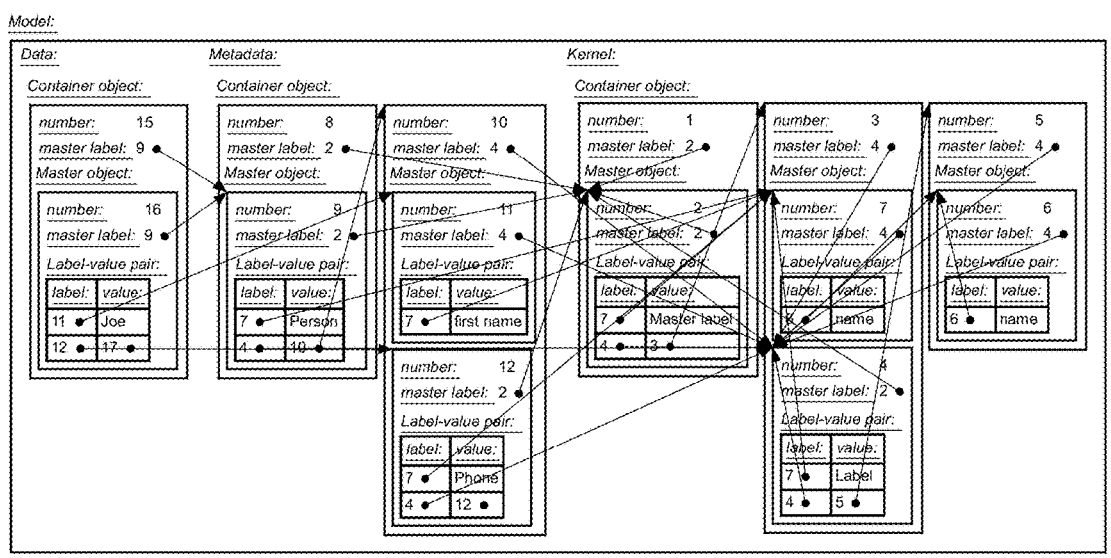

FIG. 32 is a compilation of screen shots which depicts a data instance Person, its label objects and the Kernel where the master label object of a child container object Phone is nested within the master label object Person, and in a similar fashion the master label object Label is nested within master label object Master Label. This depicts the kernel as a tree, with child container objects as branches of a master object. The method is convenient for applications with deep hierarchies of nesting. There are two masters objects 6 & 7 with the same data "name," different than in FIG. 31.

Figure 33:
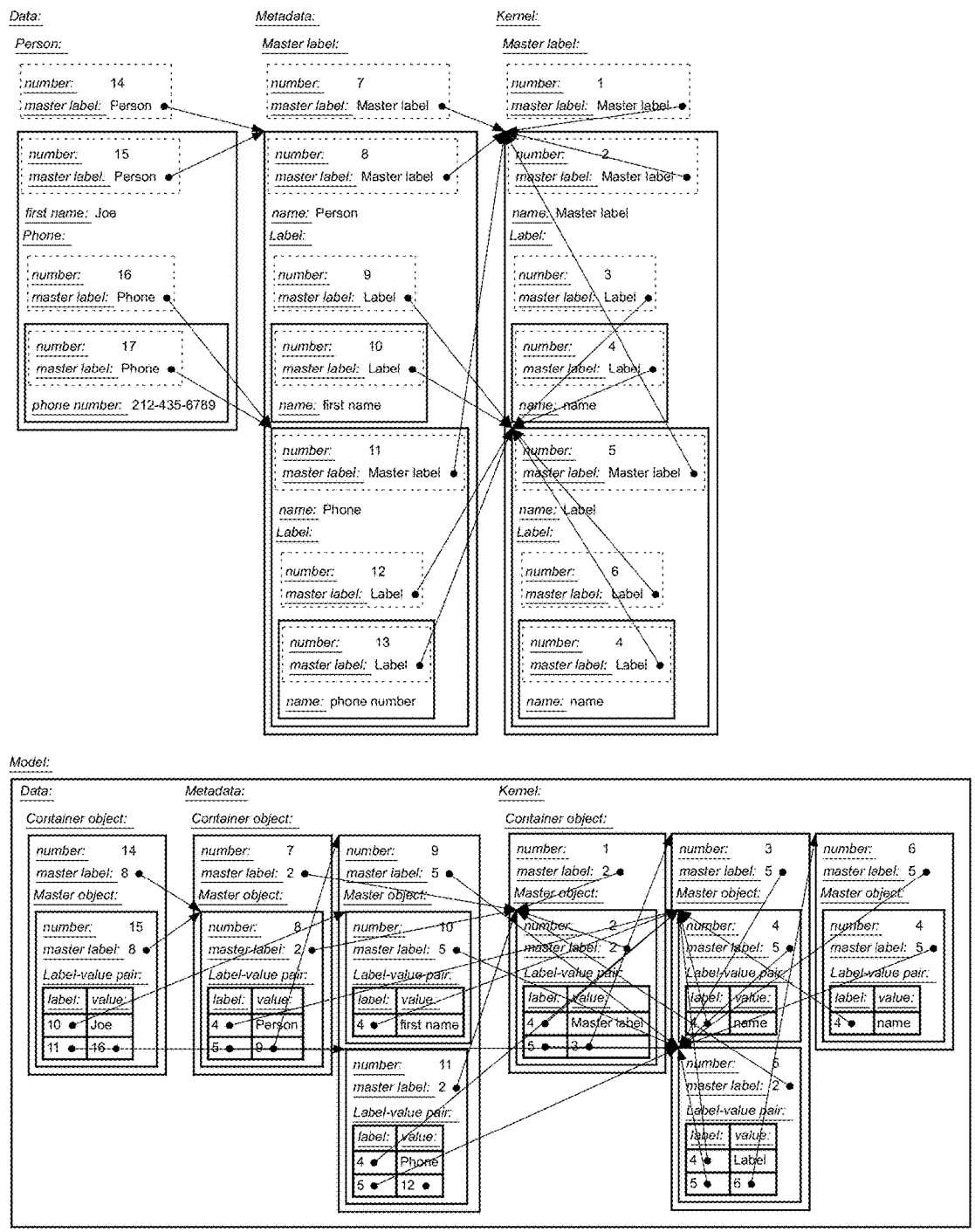
FIG. 33 is a screen shot of a variation on the Kernel, where master object 4 with value object "name"

FIG. 33 is a compilation of screen shots which depicts the same data instance Person as FIG. 32, but with duplicate master object 4 with data "name" as shown in FIG. 31.

Figure 34:
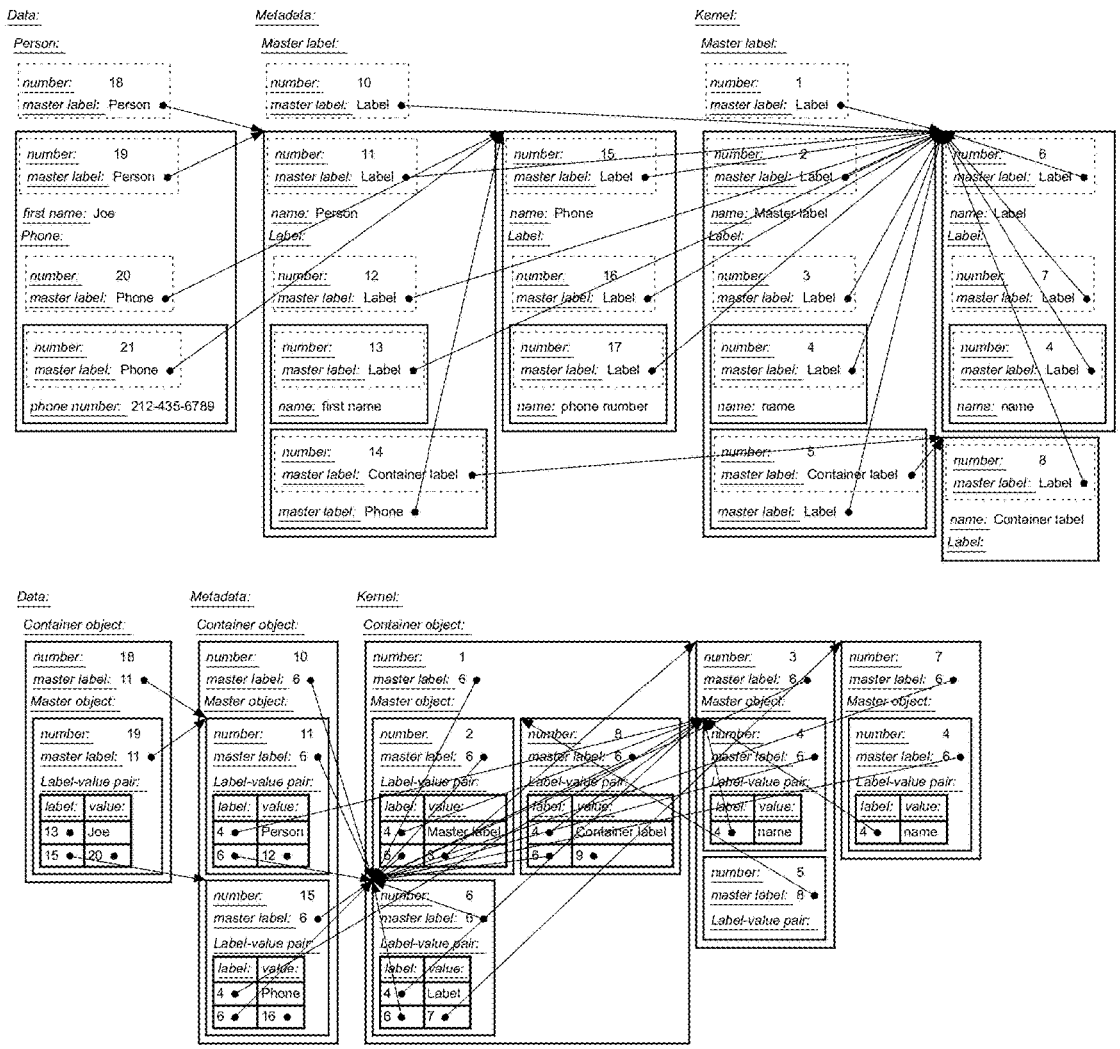
FIG. 34 is a screen shot of an Integrator UML in Integrator notation showing how metadata and data are connected.

FIG. 34 is a screen shot which depicts the same data instance Person, but in this instance master label objects are not arranged hierarchically but as a list. The master label object 11 Person and the master label object 17 are both master objects within the container object Master Label. As a result, the child container object 23 Phone references container label object 16 for its name value, and in turn this container label object 16 references master label object 17, so that "Phone" has one terminal value in master object 17. By inspection one can see that every label value used in the master objects of Person is available within the container object Label of their master label object.

Figure 35:
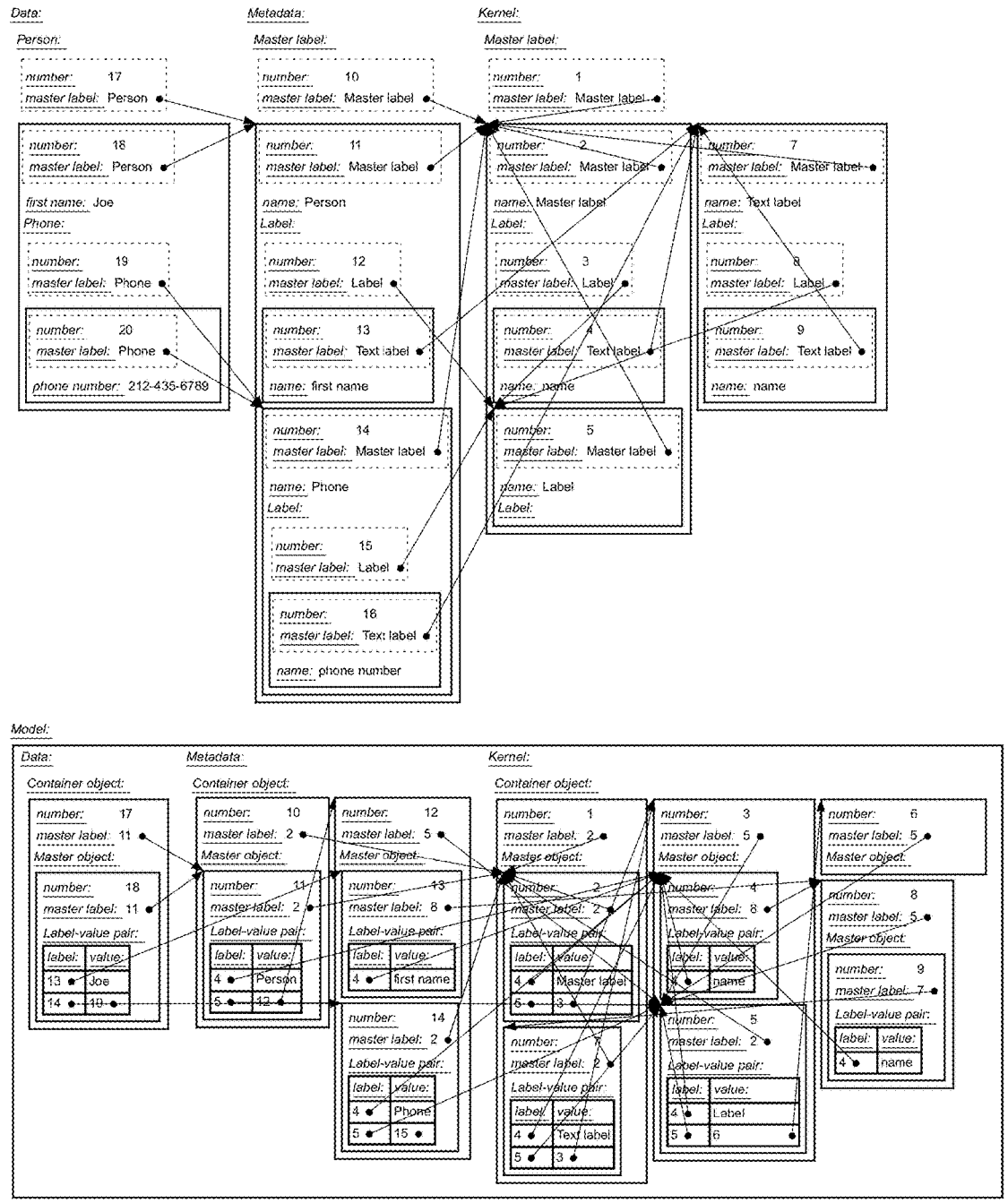
FIG. 35 is a screen shot of an alternative depiction of the Kernel where "Label" appears as a child container object within the master object "Master Label," while "Text label" appears a separate master object.

FIG. 35 is a compilation of screen shots which depicts another organization of the Kernel for the instance Person. In this case, master object "Label (5)" appears in the child container object Label (3) within the master object "Master Label," while "Text label (7)" appears a separate master object. Because master object (5) references master label object (2) Master Label, it contains an empty child container object Label. The label "name" is held in two separate master objects 4 and 9. The main difference is that the use of "name" within (9), held in the master label object (7) Text Label, is for label value objects that label text values such as "first name". The "name" within (4), held in master label object (2) Master Label is used for the label value objects of the "name" of the master label object and for their master objects, such as "Person" and "Phone."

FIG. 36 is a screen shot which depicts the familiar database "John and Jenny" in grid format, with two master objects within the container object "Person." Each bin in the grid displays the value object of a label-value pair, and the label value is shown as the column heading.

FIG. 37 is a screen shot which depicts a single container object with two sets of sibling master objects, and two grids which display their label-value pairs.

Figure 38:
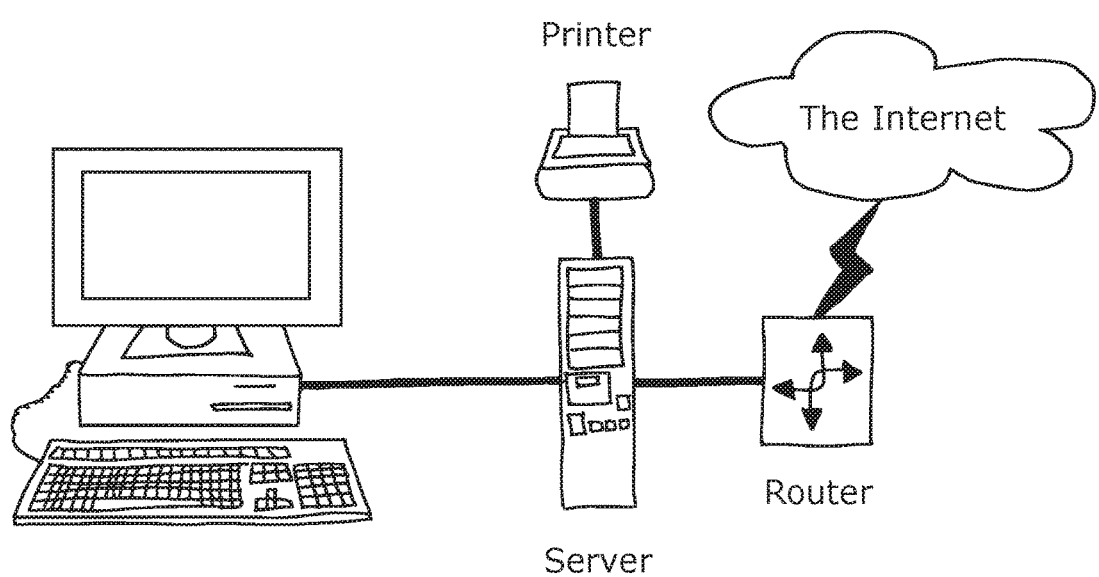
FIG. 38 is a schematic of how an Integrator application generated on a personal computer is then published on the internet, and this application has a web page generated by the Integrator GUI algorithm which is fully interactive.

FIG. 38 is a schematic showing a personal computer being used to publish an Integrator application to the Internet. The GUI algorithm can provide the html required to render an active screen of an interactive Integrator application as demonstrated on our website www.integratorsoft.com.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A database system operating on a computer, the system comprising:
   a hierarchical structure of container objects, master objects, and label-value pairs; wherein (a) user-added data items and (2) user-added program source code items are each stored as instances of the label-value pairs;
   wherein each of the label-value pairs includes a label object and a value object, the label-value pairs are logically collected into instances of the master objects, and
   the master objects are logically collected into instances of the container objects;
   such that (a) at least some of the labels of the label-value pairs that contain data items and (b) at least some of the labels of the label-value pairs that contain program source code items resolve to values of other label-value pairs; and
   wherein the structure is normalized such that at run time, there is essentially only one Terminal Value for all instances of the label-value pairs that address a given item of metadata;
   further comprising electronics configured to
   (a) parse different lines of the source code for variable names that comprise values used for labels in corresponding label-value pairs and
   (b) replaces the variable names within the source code by references to value objects in the corresponding label-value pairs; and
   wherein the program source code is stored as a script in, and executed from, the interaction-specific properties data container object associated with the label object of the first instance of a label-value pair.

2. The system of claim 1, wherein, a label object of a first instance of one of the label-value pairs references a value object of a second instance of another of the label value pairs.

3. The system of claim 2, wherein at least some of the label objects or value objects are sibling objects, which share the same labels, and which reference the same label-value pairs.

4. The system of claim 1, wherein the value object of a first instance of one of the label-value pairs comprises source code.

5. The system of claim 1, wherein the value object of a first instance of one of the label-value pairs comprises a reference to another label value pair.

6. The system of claim 1, wherein the value object of a first instance of one of the label-value pairs comprises a reference to one of the container objects.

7. The system of claim 1, wherein the value object of the a first instance of one of the label-value pairs comprises the output of a computer software program at run time, and the computation utilizes the current values of other data.

8. The system of claim 1, further comprising a kernel, in which a label object of a first instance of one of the label-value pairs references a value object of the same one of the label-value pairs.

9. The system of claim 1, wherein at least some of the master objects are sibling master objects, each of which reference a single value object.

10. The system of claim 1, wherein at least ten of the label objects are normalized to at least First Normal Form.

11. The system of claim 1, wherein the value object of a first one of the label value pairs references the value object of a second one of the label value pairs, and at run time the value object of a second one of the label value pairs is shown as the value object of a first one of the label value pairs.

12. The system of claim 1, wherein at least one of the container objects has a first label that resolves to a first value of an instance of the label-value pairs.

13. The system of claim 1, wherein at least one of the master objects has a first label that resolves to a first value of an instance of the label-value pairs.

14. The system of claim 1, further comprising electronics configured to enforce adding at least one of the user-added data items using label objects that reference a terminal value.

15. The system of claim 1, further comprising a table having rows and cells that correspond to some of the master objects and label-value pairs, respectively.

16. The system of claim 1, wherein at least one of the container objects comprises a first table having rows and cells that correspond to first sets of the master objects and label-value pairs, respectively, and a second table having rows and cells that correspond to second sets of the master objects and label-value pairs, respectively.

17. The system of claim 1, wherein an instance of the container objects is a root container that stores an entire application, and does not contain a reference to its parent object.

18. The system of claim 1, wherein a first instance of the container objects stores software and data for a first application, and a second instance of the container objects stores software and data for a second, different application.

19. The system of claim 1, wherein an instance of the container objects stores different lines of source code as instances of the value objects within different instances of the master objects.

20. The system of claim 19, wherein the master object further stores data associated with the source code.

21. The system of claim 19, wherein the stored data comprises an intermediate value derived during execution of the source code.

22. The system of claim 19, wherein the different master objects have types corresponding to operators of respective lines of the source code.

23. The system of claim 19, wherein the electronics is further configured to traverse the instance of the container object, and replace the references with values in the value objects they point to.

24. The system of claim 19, further comprising electronics configured to traverse the instance of the container object, retrieve, assemble, and execute lines of the source code.

25. The system of claim 1, wherein the master objects inherit interaction-specific properties from their respective master label objects, and the interaction-specific properties direct at least rendering, authorization, and data sourcing functions.

26. The system of claim 25 where values of the interaction-specific properties are computed according to a computer software program at run time, and the computation utilizes the current values of other data.

27. The system of claim 1, further comprising a third master object that references its own value object.

28. The system of claim 1, wherein first and second ones of the master objects have identical master object structures.

29. The system of claim 28, further embodying additional ones of the master objects having identical master object structures to the first and the second ones of the master objects.

30. The system of claim 1, wherein a first one of the label objects and a first one of the value object pairs, and a second one of the label objects and a second one of the value object pairs, have identical label-value pair structures.

31. The system of claim 1, wherein at least some of the label objects comprise interaction-specific data.

32. The system of claim 31, wherein at least some of the interaction-specific data is used to direct displaying of information on a display device.

33. The system of claim 31, wherein the interaction-specific data comprises at least one of: an application identifier, an execution environment property, an authorization, run-time requirement, and a function identifier.

* * * * *